(12) United States Patent
Lazzara et al.

(10) Patent No.: US 11,772,771 B2
(45) Date of Patent: Oct. 3, 2023

(54) VEHICLE CONFIGURATION WITH AERODYNAMIC SHAPING TO REDUCE DRAG, AND VEHICLE AND METHOD FOR THE SAME

(71) Applicant: The Boeing Company, Chicago, IL (US)

(72) Inventors: David S. Lazzara, Newport Beach, CA (US); Dino L. Roman, Lake Forest, CA (US)

(73) Assignee: The Boeing Company, Arlington, VA (US)

( * ) Notice: Subject to any disclaimer, the term of this patent is extended or adjusted under 35 U.S.C. 154(b) by 21 days.

(21) Appl. No.: 17/680,252

(22) Filed: Feb. 24, 2022

(65) Prior Publication Data
US 2023/0264801 A1   Aug. 24, 2023

(51) Int. Cl.
*B64D 29/04*    (2006.01)
*B64C 1/00*    (2006.01)

(52) U.S. Cl.
CPC ............ *B64C 1/0009* (2013.01); *B64D 29/04* (2013.01)

(58) Field of Classification Search
CPC .............................. B64C 1/0009; B64D 29/04
See application file for complete search history.

(56) References Cited

U.S. PATENT DOCUMENTS

| 4,953,812 | A | 9/1990 | Van der Hoeven | |
|---|---|---|---|---|
| 4,976,396 | A | 12/1990 | Carlson et al. | |
| 6,543,718 | B2 * | 4/2003 | Provost | B64C 11/001 244/12.4 |
| 9,611,034 | B1 * | 4/2017 | Suciu | B64D 27/20 |
| 10,933,970 | B2 | 3/2021 | Harrison et al. | |
| 2013/0336781 | A1 * | 12/2013 | Rolt | B64C 9/16 415/208.1 |
| 2020/0331591 | A1 * | 10/2020 | Page | B64D 27/14 |
| 2022/0033067 | A1 * | 2/2022 | Page | F02K 1/46 |

* cited by examiner

*Primary Examiner* — Tye William Abell

(57) ABSTRACT

There is provided a vehicle configuration to reduce drag in a fluid stream. The vehicle configuration has a vehicle body. The vehicle configuration further has at least one auxiliary body coupled to, and positioned a distance from, the vehicle body, to form a channel between the at least one auxiliary body and the vehicle body. The vehicle configuration further has one or more exterior profiles of one or more of, the vehicle body and the at least one auxiliary body. The one or more exterior profiles are positioned in proximity to the channel, and are shaped with an aerodynamic shaping, so that the one or more exterior profiles each comprises one or more concave shape portions. When a fluid flow from the fluid stream flows through the channel, the drag resulting from fluid flow interactions between the vehicle body and the at least one auxiliary body is reduced.

20 Claims, 28 Drawing Sheets

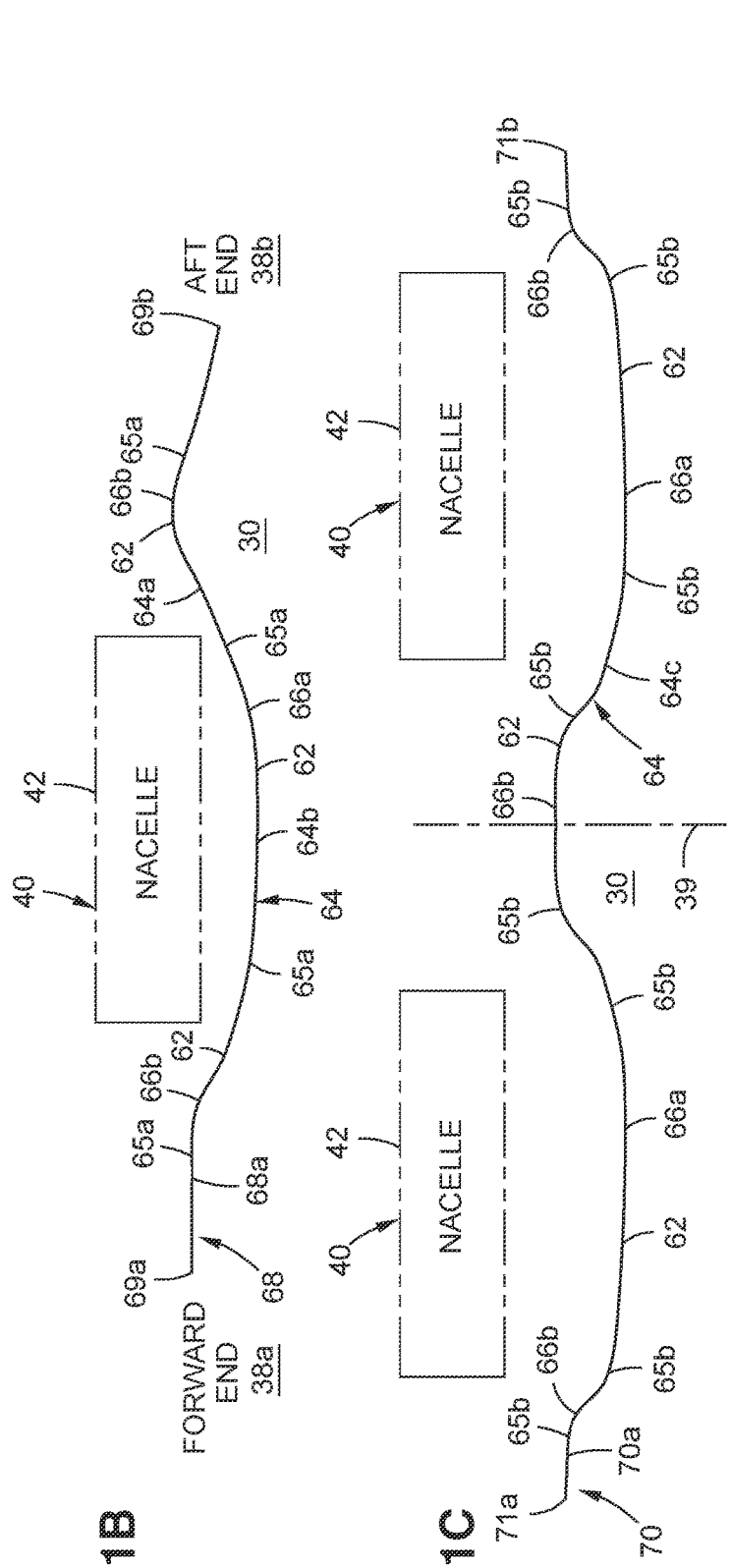
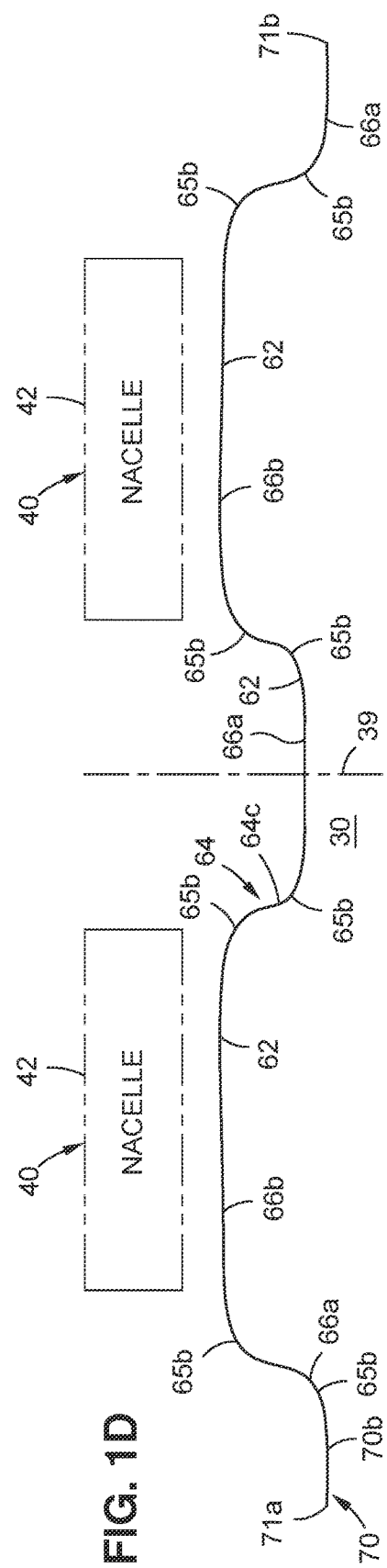
FIG. 1B
FIG. 1C
FIG. 1D

```
┌─────────────────────────────────────────────────────────────────────────────┐
│                    VEHICLE 10    │ AIR VEHICLE 10a │                         │
│ ┌──────────────────┬──────┬──────────────────────┬────────────────────────┐ │
│ │ BWB AIRCRAFT (AC) 28 │ AC 72 │ COMMERCIAL AC 72a, 72b │ MILITARY AC 72c │ │
│ ├──────────────────┴──────┴──────────────────────┴────────────────────────┤ │
│ │ LAUNCH VEHICLE 86 │ ROCKET-PROPELLED VEHICLE 88 │ SPACECRAFT 90 │ PAI 91 │ │
│ ├─────────────────────────────────────────────────────────────────────────┤ │
│ │        VEHICLE CONFIGURATION 12 │ AERODYNAMIC SHAPED VEHICLE CONFIG. 12a │ │
│ │ ┌─────────────────────────────────────────────────────────────────────┐ │ │
│ │ │        VEHICLE BODY 30 │ AERO SHAPED VEHICLE BODY 30a             │ │ │
│ │ │ AIRFRAME 31│FUSELAGE 32│WING(S) 34│MAIN BODY 92│UPPER SURF. 36│OUTER SURF. 37│
│ │ └─────────────────────────────────────────────────────────────────────┘ │ │
│ │ ┌─────────────────────────────────────────────────────────────────────┐ │ │
│ │ │ DISTANCE 50│OPTIMAL DISTANCE 50a│STRUCT. ATTACHMENT ELEMENT 46│PYLON 48 │ │
│ │ │ CHANNEL 52│FLOW CHANNEL 52a│FLUID FLOW CHANNEL 52b│AIR FLOW CHANNEL 52c │ │
│ │ └─────────────────────────────────────────────────────────────────────┘ │ │
│ │ ┌─────────────────────────────────────────────────────────────────────┐ │ │
│ │ │        AUXILIARY BODY 40 │ AERO SHAPED AUXILIARY BODY 40a          │ │ │
│ │ │ NACELLE 42│ENGINE NACELLE 42a│TOP-MOUNTED NACELLE 42b│FUEL TANK 96 │ │ │
│ │ │ POD 98│SENSOR POD 98a│BOOSTER 100│MISSILE 102│LOWER SURF. 54│SIDE SURF. 94│
│ │ └─────────────────────────────────────────────────────────────────────┘ │ │
│ │ ┌─────────────────────────────────────────────────────────────────────┐ │ │
│ │ │ AERODYNAMIC (AERO) SHAPING 14│AFT AERO SHAPING 14a│AERO SHAPED CONTOUR 80│
│ │ │                                                    │ 3D SHAPE 82      │ │ │
│ │ │ EXTERIOR PROFILE 60│LONG. CONTOUR(S) 68│LAT. CONTOUR(S) 70│CONCAVE-DOWN│ │ │
│ │ │ CONCAVE SHAPE PORTION(S) 62│CONCAVE-UP PORTION(S) 66a│PORTION(S) 66b│ │ │
│ │ │ CONCAVITY 64│OPPOSITE CONCAVITIES 64a│CURVATURE INFLECTION POINT(S) 104│
│ │ │ 3D MODEL 106│OPTIMIZATION APPROACH 108│SHAPE OPT. (SO) 109│INITIAL SO 109a│
│ │ └─────────────────────────────────────────────────────────────────────┘ │ │
│ └─────────────────────────────────────────────────────────────────────────┘ │
└─────────────────────────────────────────────────────────────────────────────┘
┌─────────────────────────────────────────────────────────────────────────────┐
│ FLUID STREAM 20│FLUID FLOW (FF) 56│COMPRESSIBLE FF 56a│FLUID 114│FF INTERACTIONS 118│
│ AIR STREAM 22│AIR FLOW (AF) 58│COMPRESSIBLE AF 58a│UPSTREAM AF 58b│EXHAUST AF 58c│
│ AIR 116│AF INTERACTIONS 120│AF PATHS 58d│CHANNEL FLOW (CF) 53│OPTIMIZED CF 53a│
│ RECIRCULATION FF 56b│SEPARATED FF 56c│RECIRCULATION AF 58e│SEPARATED AF 58f│
│ TRANSONIC SPEED 24│SUBSONIC SPEED 26│SUPERSONIC SPEED 27│
└─────────────────────────────────────────────────────────────────────────────┘
┌─────────────────────────────────────────────────────────────────────────────┐
│ DRAG 16│REDUCED (RED.) DRAG 16a│INTERFERENCE DRAG 18│RED. INTERFERENCE DRAG 18a│
│ COMPRESSIBILITY DRAG 112│REDUCED COMPRESSIBILITY DRAG 112a│
│ SHOCK WAVE 122│STRENGTH 124│REDUCED SHOCK WAVE STRENGTH 124a│
│ AFT RECIRCULATION 126│AFT RECIRCULATION ZONES 126a│REDUCED AFT RECIRC. 126b│
└─────────────────────────────────────────────────────────────────────────────┘
```

FIG. 2

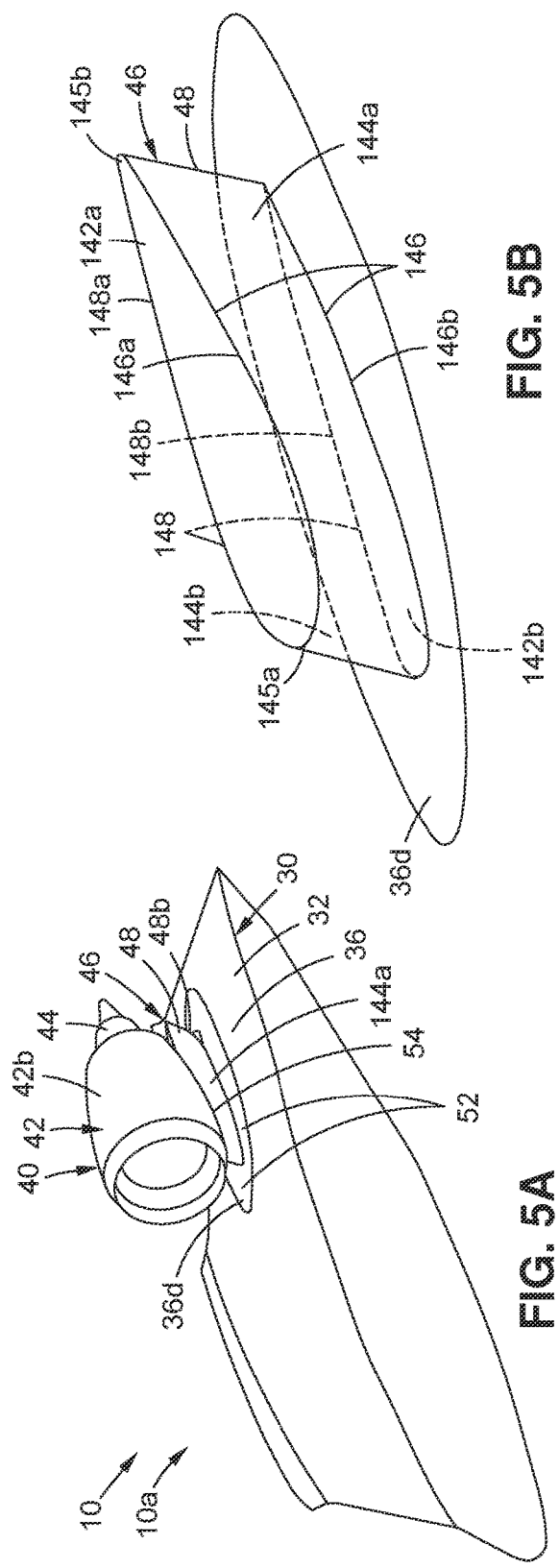
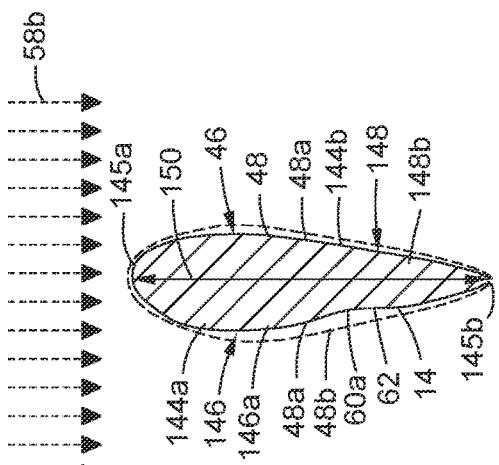
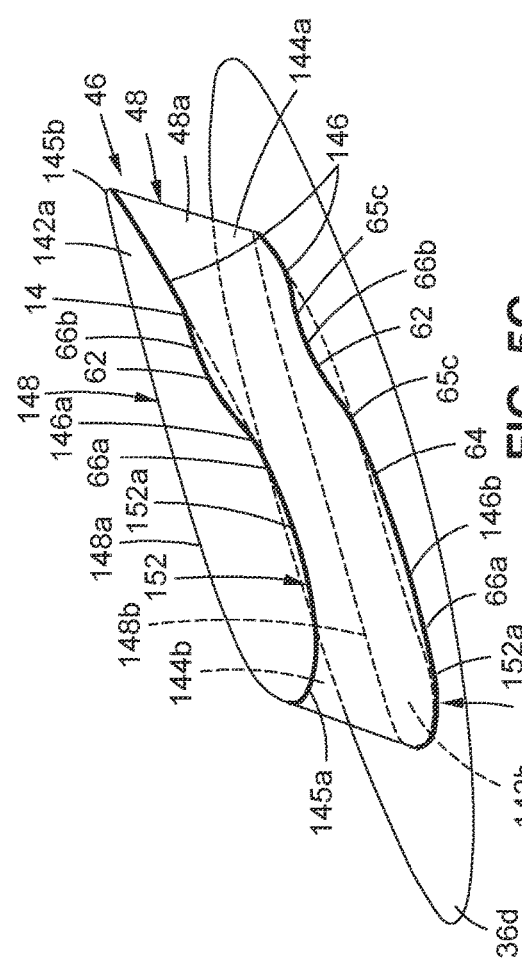
FIG. 5A
FIG. 5B
FIG. 5C
FIG. 5D

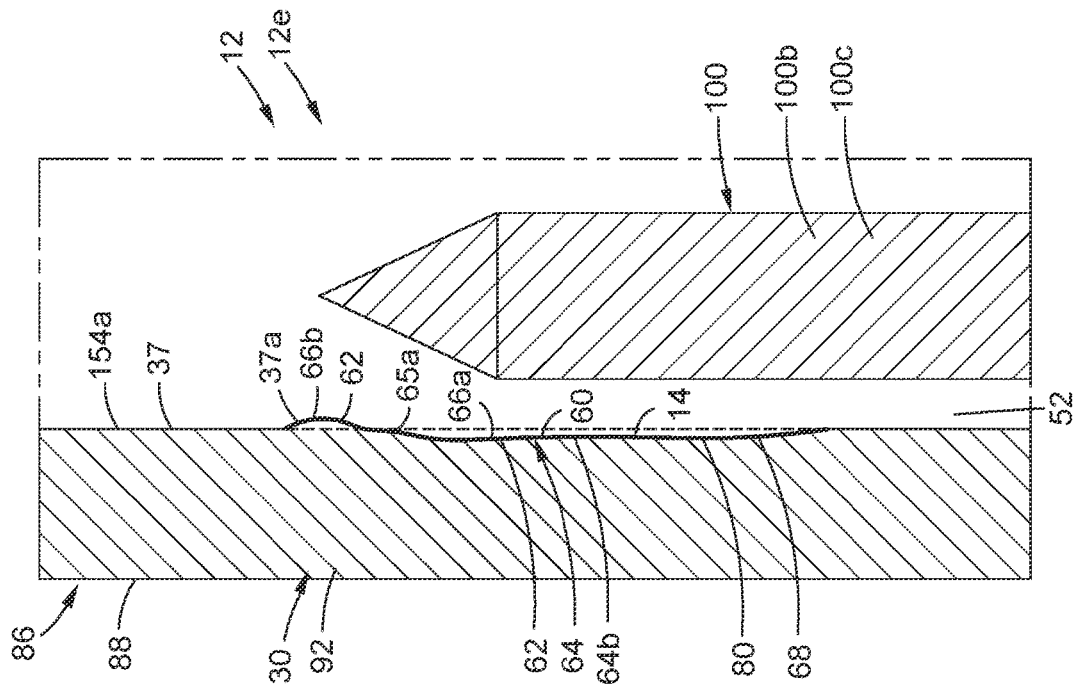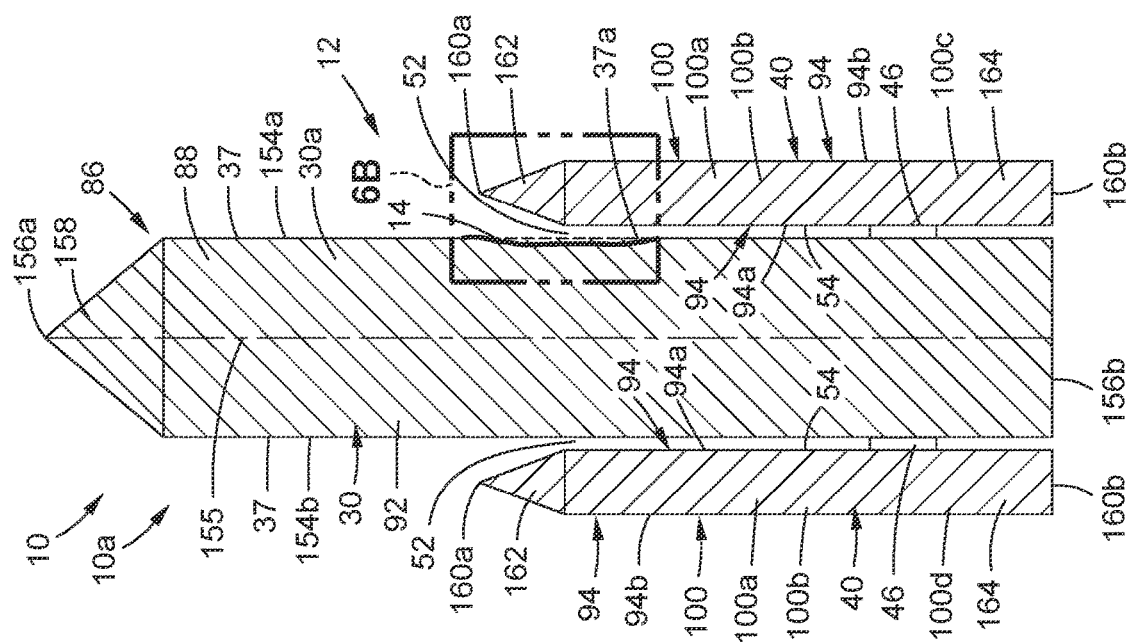

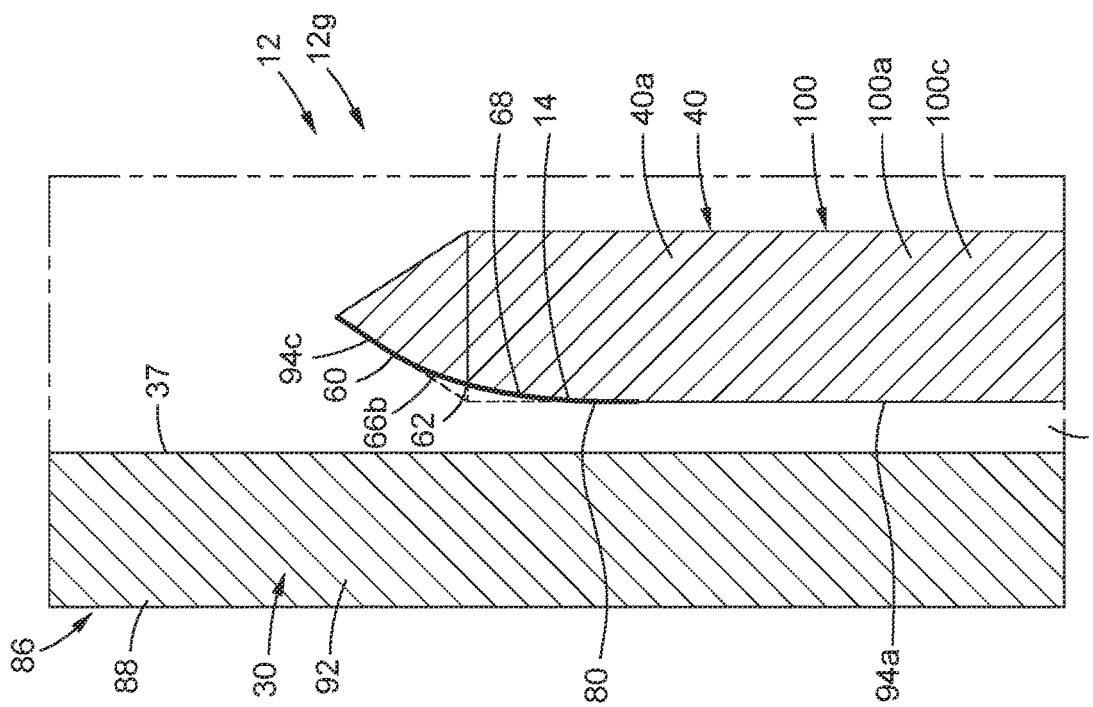
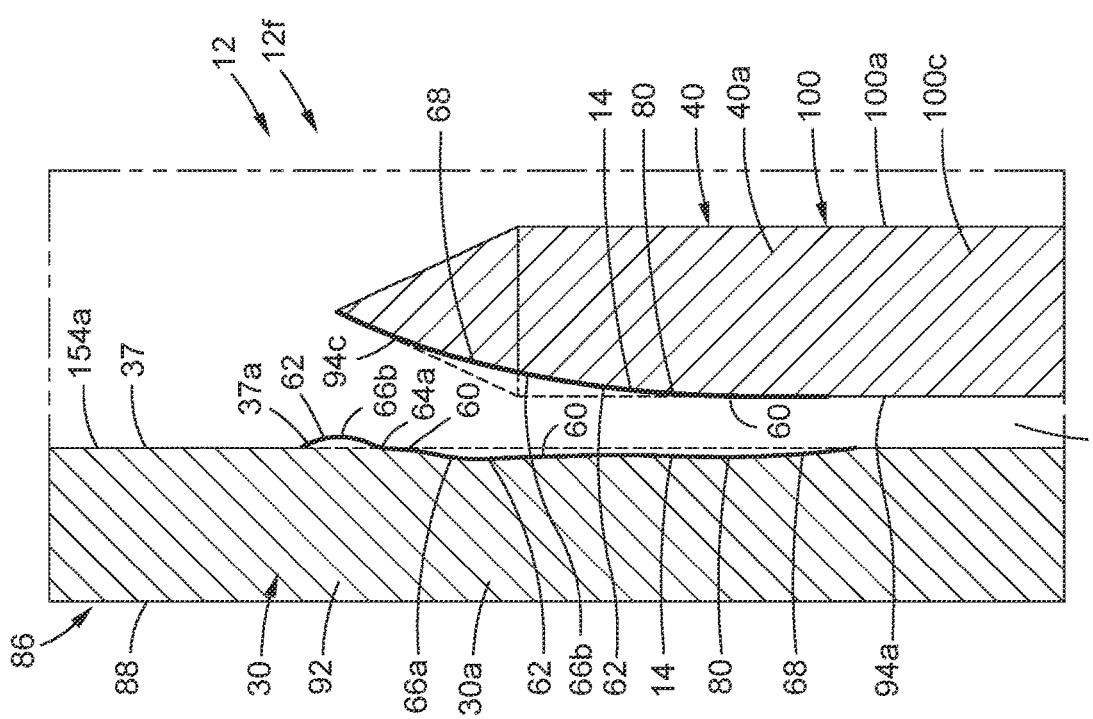

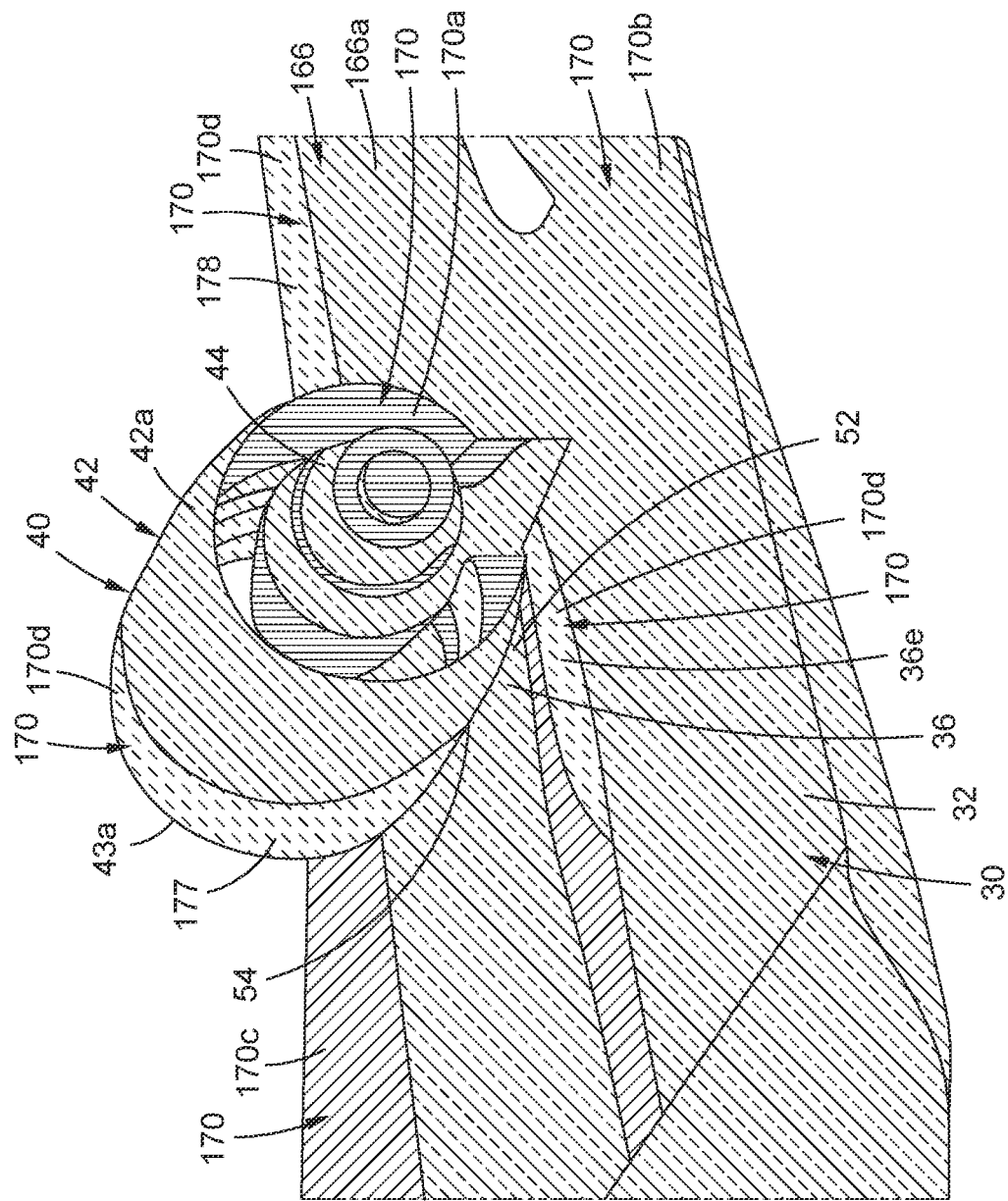
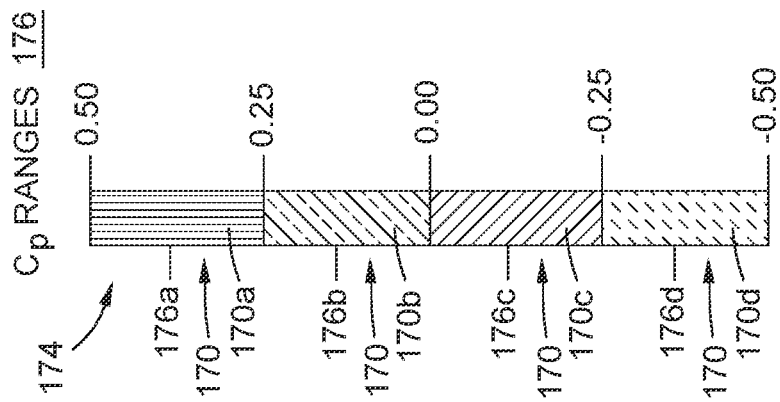
FIG. 7A

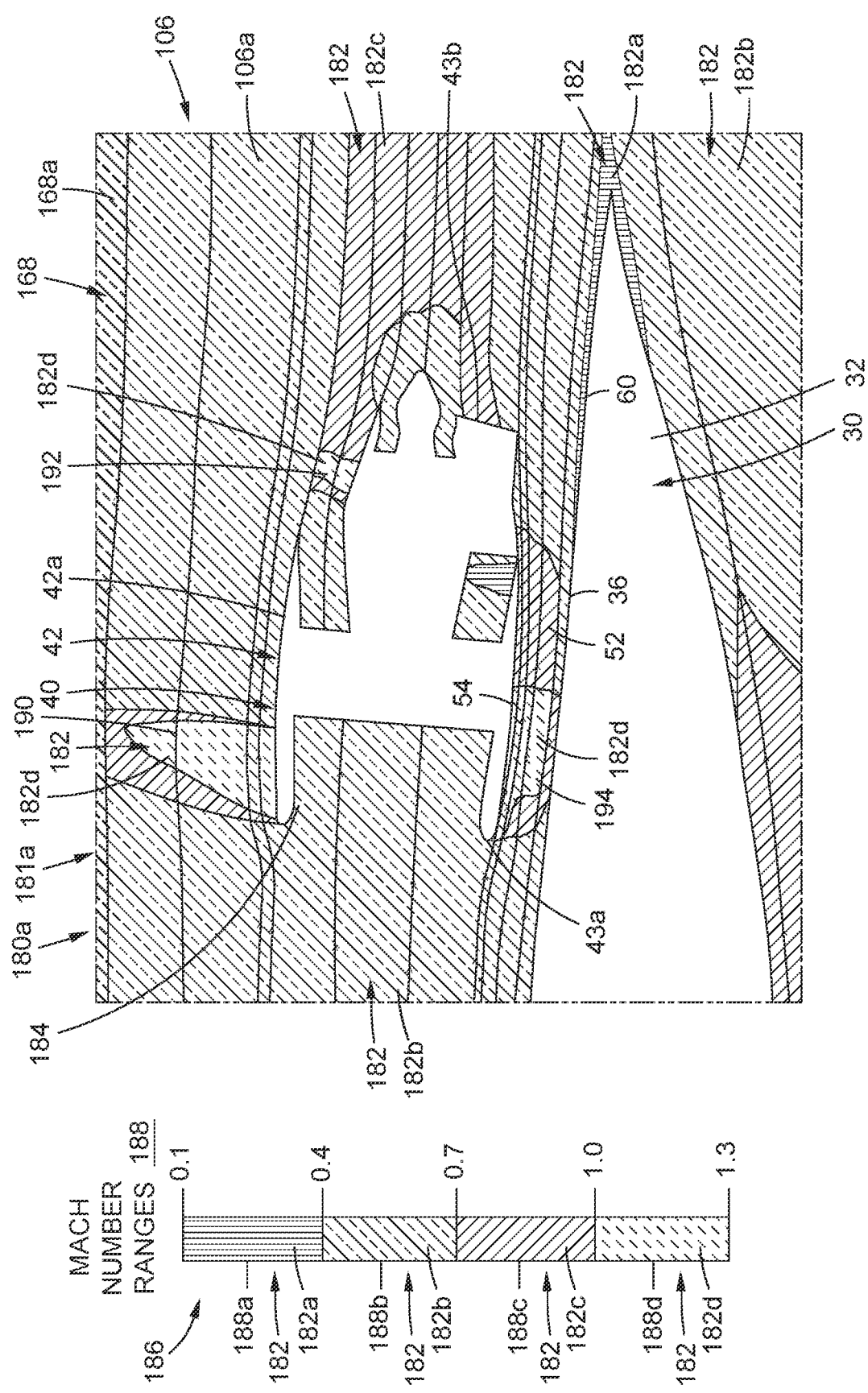

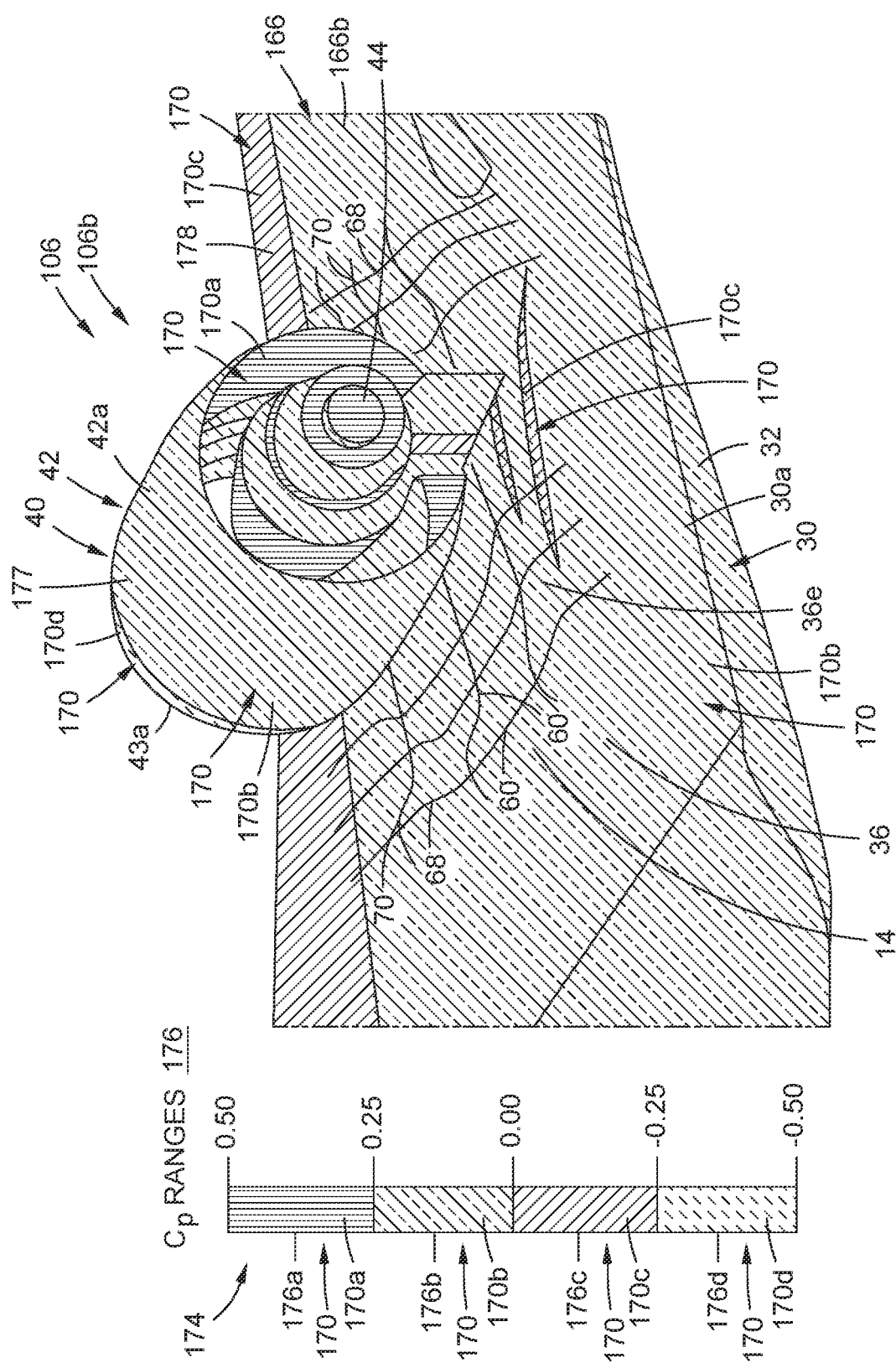

VEHICLE CONFIGURATION WITH AERODYNAMIC SHAPING TO REDUCE DRAG, AND VEHICLE AND METHOD FOR THE SAME

FIELD

The disclosure relates generally to design configurations for vehicles, and relates more particularly, to vehicle design configurations with aerodynamic shaping for air vehicles, such as blended wing body (BWB) aircraft and other air vehicles, to reduce drag, the occurrence of shocks or shock waves, and the occurrence of aft recirculation and structural fatigue.

BACKGROUND

In certain air vehicles, such as blended wing body (BWB) aircraft, launch vehicles, military or commercial aircraft, or other air vehicles, various auxiliary bodies, such as nacelles, for example, engine nacelles, or fuel tanks, pods, boosters, missiles, or other auxiliary bodies may be top-mounted, bottom-mounted, or side-mounted on a vehicle body, including a fuselage or wings. A channel or gap may be created between a lower surface of the top-mounted, bottom-mounted, or side-mounted auxiliary body and an upper surface, or outer surface, of the vehicle body facing the lower surface. Under certain operating conditions of the air vehicle, for example, flying at transonic, subsonic, or supersonic speeds or velocities, air flow interactions between the auxiliary body and the vehicle body may create shock waves or shocks within the channel that generate drag, for example, interference drag, and may further result in aft recirculation and aft recirculation zones, or separated air, formed in an exhaust air stream. Increased interference drag and increased aft recirculation may lead to decreased aerodynamic performance and a lower flight efficiency of the air vehicle.

One known design solution for military, commercial, and/or BWB aircraft to avoid interference drag involves removing the channel or gap between a top-mounted engine nacelle and a vehicle body, for example, embedding a lower portion of the engine nacelle into a top surface of the vehicle body, to create a boundary layer ingestion design, where the top surface of the vehicle body is an internal mold line for air flow entering an engine inlet. However, with the boundary layer ingestion design, low velocity boundary layer air may be ingested by the engine inlet, which may result in lower thrust. Moreover, with the boundary layer ingestion design, a mixture of low velocity boundary layer air and high velocity free stream air may be ingested by the engine inlet, which may result in a non-uniform flow pattern at the engine fan face that may affect engine performance and may result in increased fuel consumption and structural fatigue.

Accordingly, there is a need for a vehicle configuration and method that do not remove the channel or gap between the auxiliary body and the vehicle body, while still reducing drag in the channel or gap, during flight at transonic, subsonic, or supersonic speeds or velocities, that reduce the occurrence of shocks or shock waves and aft recirculation, or separated air, in an exhaust air stream, that increase aerodynamic performance and flight efficiency of the air vehicle, and that provide additional advantages over known vehicle configurations and methods.

SUMMARY

Example implementations of the present disclosure provide a vehicle configuration and a method for reducing drag and aft recirculation. As discussed in the below detailed description, versions of the vehicle configuration and method may provide significant advantages over known vehicle configurations and methods.

In a version of the disclosure, there is provided a vehicle configuration to reduce drag in a fluid stream. The vehicle configuration comprises a vehicle body. The vehicle configuration further comprises at least one auxiliary body coupled to, and positioned a distance from, the vehicle body, to form a channel between the at least one auxiliary body and the vehicle body.

The vehicle configuration further comprises one or more exterior profiles of one or more of, the vehicle body, and the at least one auxiliary body. The one or more exterior profiles are positioned in proximity to the channel, and are shaped with an aerodynamic shaping, so that the one or more exterior profiles each comprises one or more concave shape portions. When a fluid flow from the fluid stream flows through the channel, the drag resulting from fluid flow interactions between the vehicle body and the at least one auxiliary body is reduced.

In another version of the disclosure, there is provided a vehicle. The vehicle comprises a vehicle configuration to reduce drag in an air stream.

The vehicle configuration comprises a vehicle body. The vehicle configuration further comprises at least one auxiliary body coupled to, and positioned a distance from, the vehicle body, to form a channel between the at least one auxiliary body and the vehicle body. An air flow from the air stream comprises a compressible air flow moving at one of, transonic speed, subsonic speed, or supersonic speed through the channel.

The vehicle configuration further comprises one or more exterior profiles of one or more of, the vehicle body, and the at least one auxiliary body. The one or more exterior profiles are positioned in proximity to the channel, and are shaped with an aerodynamic shaping, so that the one or more exterior profiles each comprises one or more concave shape portions. When the air flow from the air stream flows through the channel, the drag resulting from air flow interactions between the vehicle body and the at least one auxiliary body is reduced.

In another version of the disclosure, there is provided a method to reduce drag of a vehicle in a fluid stream. The method comprises providing a vehicle configuration for the vehicle. The vehicle configuration comprises a vehicle body. The vehicle configuration further comprises at least one auxiliary body coupled to, and positioned a distance from, the vehicle body, to form a channel between the at least one auxiliary body and the vehicle body. The vehicle configuration further comprises one or more exterior profiles of one or more of, the vehicle body, and the at least one auxiliary body, the one or more exterior profiles positioned in proximity to the channel.

The method further comprises shaping the one or more exterior profiles with an aerodynamic shaping, so that the one or more exterior profiles each comprises one or more concave shape portions. The one or more exterior profiles comprise one or more of, a longitudinal contour with a longitudinal concavity, and a lateral contour with a lateral concavity. The method further comprises reducing, with the vehicle configuration having the one or more exterior profiles shaped with the aerodynamic shaping, the drag resulting from fluid flow interactions between the vehicle body and the at least one auxiliary body, when a fluid flow from the fluid stream flows through the channel.

The features, functions, and advantages that have been discussed can be achieved independently in various versions of the disclosure or may be combined in yet other versions, further details of which can be seen with reference to the following description and drawings.

BRIEF DESCRIPTION OF THE DRAWINGS

The disclosure can be better understood with reference to the following detailed description taken in conjunction with the accompanying drawings, which illustrate preferred and exemplary versions, but which are not necessarily drawn to scale. The drawings are examples and not meant as limitations on the description or claims.

FIG. 1B is a schematic illustration of a side view of a longitudinal contour of FIG. 1A;

FIG. 1C is a schematic illustration of a rear view of a first lateral contour of FIG. 1A;

FIG. 1D is a schematic illustration of a rear view of a second lateral contour of FIG. 1A;

FIG. 2 is an illustration of a functional block diagram showing exemplary versions of a vehicle having exemplary versions of a vehicle configuration of the disclosure;

FIG. 5A is a schematic illustration of a front perspective partial view of an air vehicle showing a pylon suspending and attaching a nacelle above a vehicle body;

FIG. 5B is a schematic illustration of a front perspective view of the pylon of FIG. 5A with no aerodynamic shaping;

FIG. 5C is a schematic illustration of a front perspective view of the pylon of FIG. 5A shaped with a version of aerodynamic shaping of the disclosure;

FIG. 5D is a schematic illustration of a top view of the pylon showing the aerodynamic shaping of FIG. 5C, compared to no aerodynamic shaping of FIG. 5B;

FIG. 6A is a schematic illustration of a front partial view of an exemplary launch vehicle with an outer surface portion of a vehicle body having aerodynamic shaping of the disclosure;

FIG. 6B is a schematic illustration of a close-up partial front view of the launch vehicle of box 6B of FIG. 6A, showing the outer surface portion of the vehicle body having the aerodynamic shaping;

FIG. 6C is a schematic illustration of a close-up partial front view of the launch vehicle of FIG. 6B, showing both the outer surface portion of the vehicle body and a side surface portion of an auxiliary body having aerodynamic shaping of the disclosure;

FIG. 6D is a schematic illustration of a close-up partial front view of the launch vehicle of FIG. 6B, showing only a side surface portion of an auxiliary body having aerodynamic shaping of the disclosure, and showing the outer surface portion of the vehicle body with no aerodynamic shaping;

FIG. 7A is an illustration of a back perspective view of an original non-optimized three-dimensional (3D) model, showing pressure coefficient ($C_P$) results of a flow simulation;

FIG. 7B is an illustration of a cross-sectional side view through a symmetry plane of the original non-optimized three-dimensional (3D) model of FIG. 7A, showing Mach number contour results of a flow simulation;

FIG. 8A is an illustration of a back perspective view of a shape optimized three-dimensional (3D) model, showing pressure coefficient ($C_P$) results of a flow simulation after shape optimization;

Figure 1A:
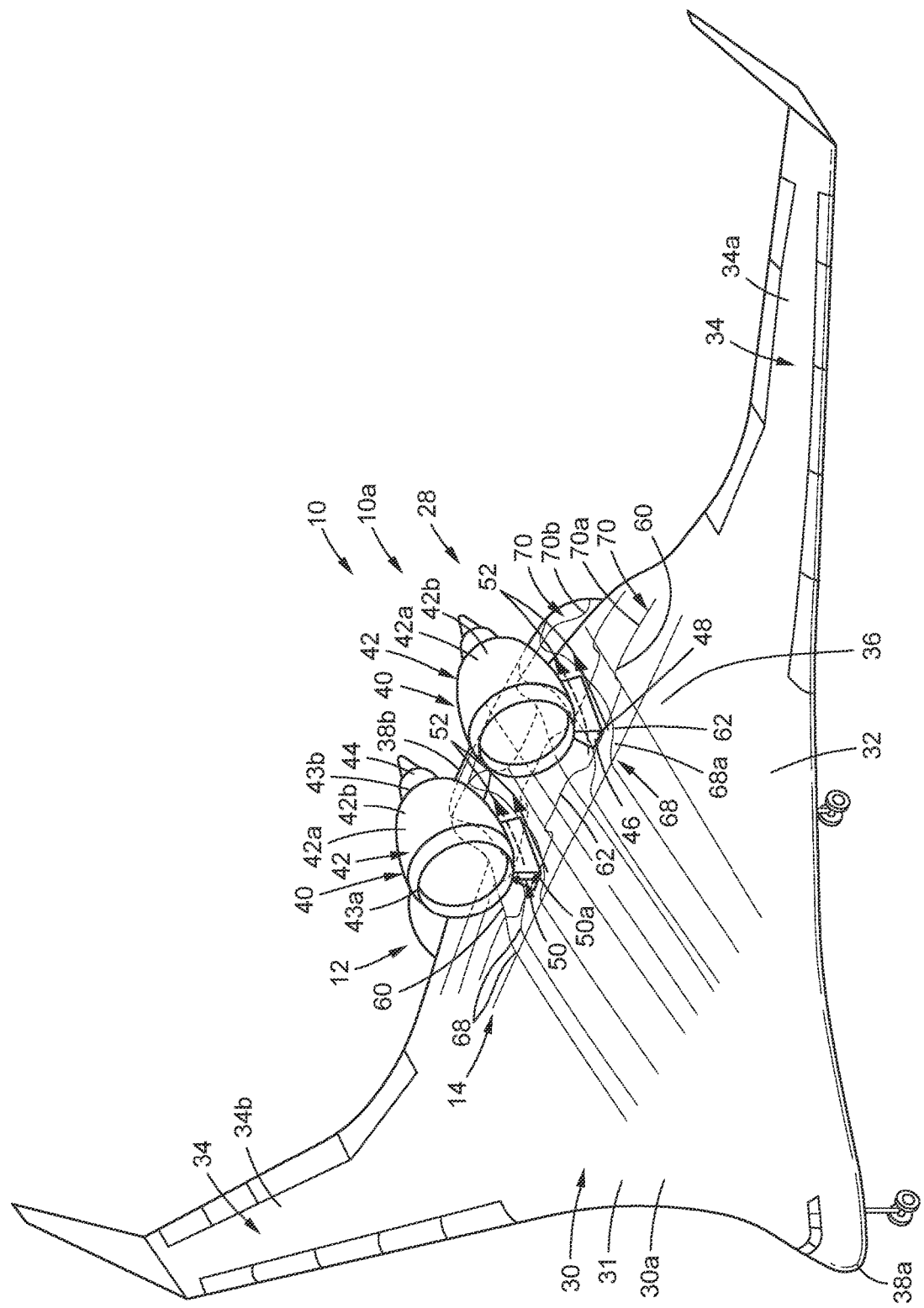
FIG. 1A is an illustration of a front perspective view of an exemplary blended wing body (BWB) aircraft with a version of a vehicle configuration having aerodynamic shaping of the disclosure.

The figures shown in this disclosure represent various aspects of the versions presented, and only differences will be discussed in detail.

DETAILED DESCRIPTION

Disclosed versions will now be described more fully hereinafter with reference to the accompanying drawings, in which some, but not all of the disclosed versions are shown. Indeed, several different versions may be provided and should not be construed as limited to the versions set forth herein. Rather, these versions are provided so that this disclosure will be thorough and fully convey the scope of the disclosure to those skilled in the art.

This specification includes references to "one version" or "a version". The instances of the phrases "one version" or "a version" do not necessarily refer to the same version. Particular features, structures, or characteristics may be combined in any suitable manner consistent with this disclosure.

As used herein, "comprising" is an open-ended term, and as used in the claims, this term does not foreclose additional structures or steps.

As used herein, "configured to" means various parts or components may be described or claimed as "configured to" perform a task or tasks. In such contexts, "configured to" is used to connote structure by indicating that the parts or components include structure that performs those task or tasks during operation. As such, the parts or components can be said to be configured to perform the task even when the specified part or component is not currently operational (e.g., is not on).

As used herein, the terms "first", "second", etc., are used as labels for nouns that they precede, and do not imply any type of ordering (e.g., spatial, temporal, logical, etc.).

As used herein, an element or step recited in the singular and preceded by the word "a" or "an" should be understood as not necessarily excluding the plural of the elements or steps.

As used herein, the phrase "one or more of", when used with a list of items, means only one of each item in the list may be needed, and different combinations of one or more of the listed items may be used. In other words, "one or more of" means any one, or combination of items, and number of items may be used from the list, but not all of the items in the list are required. The item may be a particular object, a thing, or a category.

Now referring to the Figures, FIGS. 1A, 1E-1G show various exemplary versions of vehicles 10, such as air vehicles 10a, each having a vehicle configuration 12 with aerodynamic shaping 14, to reduce drag 16 (see FIG. 2), such as interference drag 18 (see FIG. 2), in a fluid stream 20 (see FIG. 2), such as an air stream 22 (see FIG. 2), to obtain a reduced drag 16a (see FIG. 2), such as a reduced interference drag 18a (see FIG. 2). During flight, the vehicles 10 are designed to fly through the fluid stream 20, such as the air stream 22, moving at transonic speed 24 (see FIG. 2), or transonic velocity, or moving at subsonic speed 26 (see FIG. 2), or subsonic velocity, or moving at supersonic speed 27 (see FIG. 2), or supersonic velocity. Further, during flight simulations, a three-dimensional (3D) model 106 (see FIGS. 2, 8A) of the vehicle configuration 12 of the vehicle 10, is designed for analysis at transonic speed 24 or subsonic speed 26. As used herein, "transonic speed" means a speed near the speed of sound in air, or about 741 miles per hour at sea level, and typical speeds for vehicles, such as aircraft, flying at transonic speed, are greater than 250 miles per hour and less than 760 miles per hour, and having a Mach number approximately equal to 1 (one). As used herein, "subsonic speed" means a speed very much less than the speed of sound in air, and typical speeds for vehicles, such as aircraft, flying at subsonic speed, are less than 250 miles per hour, and having a Mach number of much less than 1 (one). As used herein, "Mach number" or "M" means a dimensionless quantity in fluid dynamics representing the ratio of flow velocity past a surface to the local speed of sound. As used herein, "supersonic speed" means a speed of an object that exceeds the speed of sound (Mach 1), and for objects traveling in dry air of a temperature of 20° C. (68° F.) at sea level, this speed is approximately 343.2 m/s (meters per second) (1,126 ft/s (feet per second); 768 mph (miles per hour); 667.1 kn (knots); 1,236 km/h (kilometers per hour)).

Now referring to FIG. 1A, FIG. 1A is an illustration of a front perspective view of an exemplary version of a vehicle 10, such as an air vehicle 10a, in the form of a blended wing body (BWB) aircraft 28 with a version of the vehicle configuration 12 of the disclosure having aerodynamic shaping 14. As shown in FIG. 1A, the BWB aircraft 28 comprises a vehicle body 30, or airframe 31, including a fuselage 32, and wings 34 smoothly blended with the fuselage 32. The wings 34 include a first wing 34a (see FIG. 1A) and a second wing 34b (see FIG. 1A). The vehicle body 30 has an upper surface 36 (see FIG. 1A). The vehicle 10, such as the BWB aircraft 28, has a forward end 38a (see FIG. 1A), an aft end 38b (see FIG. 1A), and a centerline 39 (see FIGS. 1C-1D).

As shown in FIG. 1A, the BWB aircraft 28 further comprises at least one auxiliary body 40, such as two auxiliary bodies 40, each attached and suspended above the upper surface 36 of the vehicle body 30, near the aft end 38b of the BWB aircraft 28. As further shown in FIG. 1A, in one version, the auxiliary bodies 40 each comprise a nacelle 42, such as an engine nacelle 42a, for example, a top-mounted nacelle 42b, that houses an engine 44. As shown in FIG. 1A, the nacelle 42 has a leading edge 43a and a trailing edge 43b. Each auxiliary body 40, such as the nacelle 42, is in structural communication with the vehicle body 30, via a structural attachment element 46 (see FIG. 1A), such as a pylon 48 (see FIG. 1A). As shown in FIG. 1A, each auxiliary body 40, such as the nacelle 42, is positioned a distance 50, such as an optimal distance 50a, from the upper surface 36 of the vehicle body 30, to form a channel 52, or gap, such as an air gap, between a lower surface 54 of the auxiliary body 40 and the upper surface 36 of the vehicle body 30, on each side of each auxiliary body 40, such as the nacelle 42. As used herein, "optimal distance" means a distance or height between an upper surface or outer surface of a vehicle body and a lower surface of an auxiliary body, where the distance or height is less than a distance or height that creates a large nose-down pitching moment induced by thrust of the auxiliary body, such as a nacelle, and is greater than a distance or height that creates a highly constricted channel flow in a channel between the vehicle body and the auxiliary body, and is preferably a threshold distance, or height below which shocks, such as shock waves, will form in the channel flow and aft recirculation will occur behind the channel flow. The distance or height threshold depends on the vehicle flight speed, Mach number, and Reynolds number, the length of the vehicle ahead of the auxiliary body, the vehicle boundary layer height at the start of the constricted channel, and the vehicle angle of attack. The distance or height threshold is determined with computational fluid dynamics (CFD) modeling or testing and in a non-linear way is relative to the vehicle surface shaping, physical scale, flight speed, flight altitude, the entrance Mach number of the channel flow, and the boundary layer height at the entrance and throughout the channel, and the boundary layer height at the entrance and throughout the channel flow. In short, the optimal distance is a distance with an upper limit constrained by not adversely affecting the vehicle's performance due to large trim drag penalties resulting from excessive pitching moment due to the height of the auxiliary body, and with a lower limit constrained by excessive interference drag coming from the channel flow between the vehicle body and the auxiliary body. A nose-down pitching moment is a torque about a center of gravity that may cause a nose of a vehicle to move downward. The channels 52, or gaps, are configured to receive fluid flow 56 (see FIG. 2), such as air flow 58 (see FIG. 2), through the channel 52.

As shown in FIG. 1A, in this version, the vehicle body 30 is shaped with the aerodynamic shaping 14 to obtain an aerodynamic shaped vehicle body 30a, or shape optimized vehicle body. The vehicle configuration 12 comprises the vehicle body 30, and the auxiliary bodies 40 coupled to, and positioned the distance 50, such as the optimal distance 50a, from, the vehicle body 30, to form the channel 52, between the auxiliary bodies 40 and the vehicle body 30. The vehicle configuration 12 further comprises one or more exterior profiles 60 (see FIG. 1A) of one or more of, the vehicle body 30 and the auxiliary body 40. As shown in FIG. 1A, the vehicle configuration 12 comprises multiple exterior profiles 60 on the vehicle body 30. The exterior profiles 60 are positioned in proximity to the channel 52, where proximity to the channel 52 means, along the length of the channel 52, parallel to the channel 52, perpendicular to the length of the channel 52, lateral to the length of the channel 52, extending in front of, or forward of, the channel 52, extending in back of, or aft of, the channel 52, and/or extending from each side of the channel 52. Each exterior profile 60 on the vehicle body 30 may extend forward of the leading edge 43a (see FIG. 1A) of the auxiliary body 40, such as the nacelle 42, or may extend aft of the trailing edge 43b (see FIG. 1A) of the auxiliary body 40, such as the nacelle 42, or may extend inboard or outboard from the sides of the auxiliary body 40, such as the nacelle 42.

The exterior profiles 60 are shaped with the aerodynamic shaping 14, such as externally shaped, so that each exterior profile 60 comprises one or more concave shape portions 62 and has a concavity 64 (see FIGS. 1B-1D). The concave shape portions 62 alternate, in series, in opposite concavities 64a (see FIGS. 1B-1D), or opposite directions. The concave shape portions 62 comprise one or more concave-up portions 66a (see FIGS. 1B-1D) and one or more concave-down portions 66b (see FIGS. 1B-1D). The concave shape portions 62 may be the same size, and have the same height, or the concave shape portions 62 may be of different sizes and different heights.

As shown in FIG. 1A, the exterior profiles 60 shaped with the aerodynamic shaping 14 comprise longitudinal contours 68 formed longitudinally in a longitudinal direction and along the sides of the auxiliary bodies 40 of the vehicle 10. Each longitudinal contour 68 has one or more concave shape portions 62, and where the longitudinal contour 68 has two or more concave shape portions 62, the two or more concave shape portions 62 and the concavity 64 are reversed from the concave-up portion 66a (see FIG. 1B) to the concave-down portion 66b (see FIG. 1B), longitudinally and in series. The concavity 64 of each longitudinal contour 68 comprises a longitudinal concavity 64b (see FIG. 1B) that changes at locations 65a (see FIG. 1B). The longitudinal contours 68 blend into the original surface of the vehicle body 30, as the longitudinal contours 68 get successively farther away from the auxiliary bodies 40, such as the nacelles 42.

As shown in FIG. 1A, the exterior profiles 60 shaped with the aerodynamic shaping 14 further comprise lateral contours 70 formed laterally in a lateral direction. Each lateral contour 70 has one or more concave shape portions 62, and where the lateral contour 70 has two or more concave shape portions 62, the two or more concave shape portions 62 and the concavity 64 reverse from the concave-up portion 66a (see FIGS. 1C, 1D) to the concave-down portion 66b (see FIGS. 1C, 1D), laterally and in series. The concavity 64 (see FIGS. 1C, 1D) of each lateral contour 70 comprises a lateral concavity 64c (see FIGS. 1C, 1D) that changes at locations 65b (see FIGS. 1C, 1D). As further shown in FIG. 1A, the lateral contours 70 intersect with, or cross, the longitudinal contours 68 on the upper surface 36 of the vehicle body 30. The lateral contours 70 blend into the original surface of the vehicle body 30, as the lateral contours 70 get farther away from the auxiliary body 40, such as the nacelle 42.

Now referring to FIG. 1B, FIG. 1B is a schematic illustration of a side view of a longitudinal contour 68, such as a first longitudinal contour 68a, of FIG. 1A. FIG. 1B shows the auxiliary body 40, such as the nacelle 42, positioned above the longitudinal contour 68, such as the first longitudinal contour 68a, formed on the upper surface 36 of the vehicle body 30. As shown in FIG. 1B, the longitudinal contour 68, such as the first longitudinal contour 68a, has a first end 69a facing towards the forward end 38a (see FIG. 1A) of the vehicle 10 (see FIG. 1A), and has a second end 69b facing towards the aft end 38b (see FIG. 1A) of the vehicle 10. As further shown in FIG. 1B, the longitudinal contour 68, such as the first longitudinal contour 68a, has concave shape portions 62 where the concavity 64, such as the longitudinal concavity 64b, is reversed from a concave-down portion 66b, to a concave-up portion 66a, and to another concave-down portion 66b, longitudinally and in series. The longitudinal concavity 64b of the longitudinal contour 68 changes at locations 65a (see FIG. 1B). The specific series of concave-down portions 66b and concave-up portion 66a shown in FIG. 1B is merely an example of one type of series for the longitudinal contour 68, and another vehicle body 30 and auxiliary body 40 combination may have a different series of concave-down portions 66b and/or concave-up portions 66a.

Now referring to FIG. 1C, FIG. 1C is a schematic illustration of a rear view of a lateral contour 70, such as a first lateral contour 70a, of FIG. 1A. FIG. 1C shows the auxiliary bodies 40, such as the nacelles 42, on each side of the centerline 39 of the vehicle 10 (see FIG. 1A), and the nacelles 42 are positioned above the lateral contour 70, such as the first lateral contour 70a, formed on the upper surface 36 of the vehicle body 30. As shown in FIG. 1C, the lateral contour 70, such as the first lateral contour 70a, has a first end 71a facing towards the first wing 34a (see FIG. 1A), or left wing, of the vehicle 10 (see FIG. 1A), from the rear view, and has a second end 71b facing towards the second wing 34b (see FIG. 1A), or right wing, of the vehicle 10, from the rear view. As further shown in FIG. 1C, the lateral contour 70, such as the first lateral contour 70a, has concave shape portions 62 where the concavity 64, such as the lateral concavity 64c, is reversed from a concave-down portion 66b, to a concave-up portion 66a, to another concave-down portion 66b, to another concave-up portion 66a, and to another concave-down portion 66b, laterally and in series. The lateral concavity 64c of the first lateral contour 70a changes at locations 65b (see FIG. 1C). The specific series of concave-down portions 66b and concave-up portions 66a shown in FIG. 1C is merely an example of one type of series for the lateral contour 70, and another vehicle body 30 and auxiliary body 40 combination may have a different series of concave-down portions 66b and/or concave-up portions 66a.

Now referring to FIG. 1D, FIG. 1D is a schematic illustration of a rear view of a lateral contour 70, such as a second lateral contour 70b, of FIG. 1A. FIG. 1D shows the auxiliary bodies 40, such as the nacelles 42, on each side of the centerline 39 of the vehicle 10 (see FIG. 1A), and the nacelles 42 are positioned above the lateral contour 70, such as the second lateral contour 70b, formed on the vehicle body 30. As shown in FIG. 1D, the lateral contour 70, such as the second lateral contour 70b, has the first end 71a facing towards the first wing 34a (see FIG. 1A), or left wing, of the vehicle 10 (see FIG. 1A), from the rear view, and has the second end 71b facing towards the second wing 34b (see FIG. 1A), or right wing, of the vehicle 10, from the rear view. As further shown in FIG. 1D, the lateral contour 70, such as the second lateral contour 70b, has concave shape portions 62 where the concavity 64, such as the lateral concavity 64c, is reversed from a concave-up portion 66a, to a concave-down portion 66b, to another concave-up portion 66a, to another concave-down portion 66b, and to another concave-up portion 66a, laterally and in series. The lateral concavity 64c of the second lateral contour 70b changes at locations 65b (see FIG. 1D). The specific series of concave-up portions 66a and concave-down portions 66b shown in FIG. 1D is merely an example of one type of series for the lateral contour 70, and another vehicle body 30 and auxiliary body 40 combination may have a different series of concave-up portions 66a and/or concave-down portions 66b.

Figure 1E:
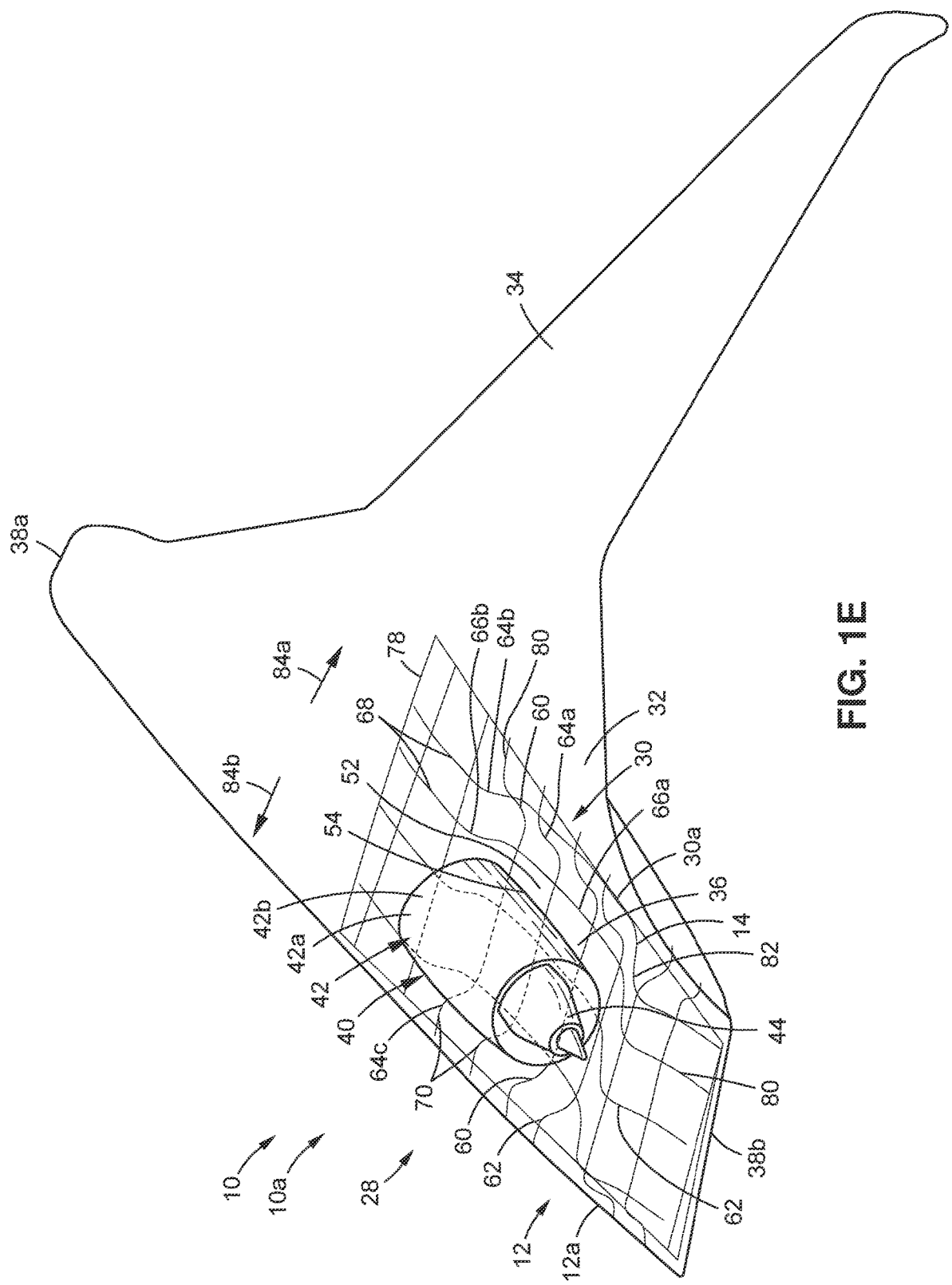
FIG. 1E is an illustration of a back perspective partial view of an exemplary blended wing body (BWB) aircraft with a version of a vehicle configuration having aerodynamic shaping of the disclosure, and showing longitudinal contours and lateral contours on a vehicle body portion.

Now referring to FIG. 1E, FIG. 1E is an illustration of a back perspective partial view of an exemplary vehicle 10, such as an air vehicle 10a, for example, in the form of the blended wing body (BWB) aircraft 28, with a version of the vehicle configuration 12, such as an aerodynamic shaped vehicle configuration 12a, having aerodynamic shaping 14 of the disclosure. In this version, the vehicle body 30 is shaped with the aerodynamic shaping 14, to obtain the aerodynamic shaped vehicle body 30a (see FIG. 1E), or shape optimized vehicle body. FIG. 1E shows the aerodynamic shaping 14 on a vehicle body portion 30b of the vehicle body 30, such as the fuselage 32. FIG. 1E further shows the wing 34, the forward end 38a, the aft end 38b, and the auxiliary body 40 of the BWB aircraft 28.

As shown in FIG. 1E, the auxiliary body 40 is attached to, and suspended above, the upper surface 36 of the vehicle body 30 near the aft end 38b of the BWB aircraft 28. As further shown in FIG. 1E, the auxiliary body 40 comprises the nacelle 42, such as the engine nacelle 42a, for example, the top-mounted nacelle 42b, that houses the engine 44. FIG. 1E further shows the channel 52 formed between the lower surface 54 of the auxiliary body 40 and the upper surface 36 of the vehicle body 30.

FIG. 1E shows the vehicle configuration 12 with exterior profiles 60, shaped with the aerodynamic shaping 14, comprising longitudinal contours 68 with the longitudinal concavity 64b, and comprising lateral contours 70 with the lateral concavity 64c, on the vehicle body portion 30b of the vehicle body 30. The exterior profiles 60 comprising the longitudinal contours 68 and the lateral contours 70 comprise concave shape portions 62 alternating, in series, in opposite concavities 64a, or opposite directions. As shown in FIG. 1E, the concave shape portions 62 include the concave-up portions 66a and the concave-down portions 66b. With the longitudinal contours 68, the concave shape portions 62 and the longitudinal concavity 64b are reversed from the concave-up portion 66a to the concave-down portion 66b longitudinally. With the lateral contours 70, the concave shape portions 62 and the lateral concavity 64c are reversed from the concave-up portion 66a to the concave-down portion 66b laterally.

As shown in FIG. 1E, in this version, the vehicle body 30 is shaped with the aerodynamic shaping 14 on the upper surface 36 of the vehicle body portion 30b, indicated with a box 78 showing the longitudinal contours 68 and the lateral contours 70 in the area where the aerodynamic shaping 14 occurs. The aerodynamic shaping 14 provides longitudinal contours 68 and lateral contours 70 that are aerodynamic shaped contours 80 (see FIG. 1E), each having the exterior profile 60 and a three-dimensional (3D) shape 82 (see FIG. 1E). Successive aerodynamic shaped contours 80 and exterior profiles 60 comprising the longitudinal contours 68 and the lateral contours 70 gradually wash out, or get less pronounced, and blend into the original upper surface 36 of the vehicle body 30, extending from the channel 52 outward in an outboard direction 84a and extending from the channel 52 inward in an inboard direction 84b. The aerodynamic shaping 14 washes out, or gets less pronounced, and blends into the original upper surface 36 of the vehicle body 30, as the aerodynamic shaping 14 moves in the outboard direction 84a and the inboard direction 84b, with the aerodynamic shaping 14 being at a maximum height at the channel 52 and near the centerline of the auxiliary body 40, such as the nacelle 42.

Figure 1F:
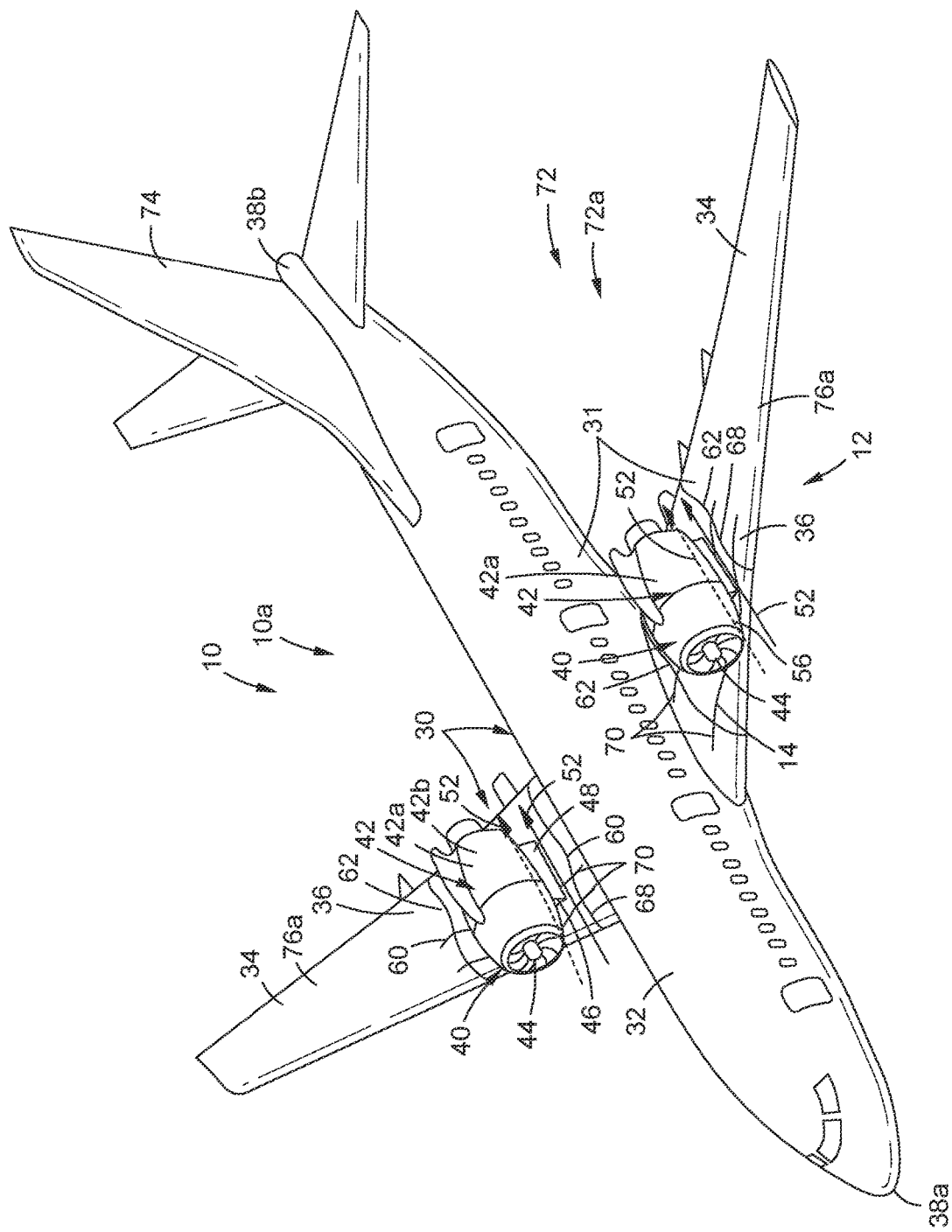
FIG. 1F is an illustration of a front perspective view of an exemplary aircraft with top-mounted nacelles having a version of a vehicle configuration with aerodynamic shaping of the disclosure.

Now referring to FIG. 1F, FIG. 1F is an illustration of a front perspective view of an exemplary vehicle 10, such as an air vehicle 10a, in the form of an aircraft 72, such as a commercial aircraft 72a, with top-mounted nacelles 42b, and with another version of a vehicle configuration 12 of the disclosure having aerodynamic shaping 14. As shown in FIG. 1F, the commercial aircraft 72a comprises a vehicle body 30, or airframe 31, including the fuselage 32, wings 34 attached to the fuselage 32, and a tail 74, or empennage. The vehicle 10, such as the commercial aircraft 72a, has the forward end 38a (see FIG. 1F) and the aft end 38b (see FIG. 1F).

As shown in FIG. 1F, the commercial aircraft 72a further comprises two auxiliary bodies 40, each attached and suspended above a respective wing 34 of the vehicle body 30 of the commercial aircraft 72a. As further shown in FIG. 1F, in one version, the auxiliary bodies 40 each comprise the nacelle 42, such as the engine nacelle 42a, for example, the top-mounted nacelle 42b, that houses the engine 44. Each auxiliary body 40, such as the nacelle 42, is in structural communication with the upper surface 36 of the vehicle body 30, for example, an upper surface 76a of the wing 34, via the structural attachment element 46 (see FIG. 1F), such as the pylon 48 (see FIG. 1F). Each auxiliary body 40, such as the nacelle 42, is positioned a distance 50 (see FIG. 2), such as an optimal distance 50a (see FIG. 2), from the upper surface 36 of the vehicle body 30, such as the upper surface 76a of the wing 34, to form channels 52, or gaps, between the lower surface 54 of the auxiliary body 40 and the upper surface 36 of the vehicle body 30, such as the upper surface 76a of the wing 34, on each side of the auxiliary body 40, such as the nacelle 42.

As shown in FIG. 1F, the vehicle configuration 12 comprises the exterior profiles 60 comprising the longitudinal contours 68 and the lateral contours 70 shaped with the aerodynamic shaping 14, so that the exterior profiles 60 comprises concave shape portions 62 each having concavity 64 (see FIG. 2). The concave shape portions 62 alternate, in series, in opposite concavities 64a (see FIG. 1B), or opposite directions. The concave shape portions 62 include one or more concave-up portions 66a (see FIG. 1B), and one or more concave-down portions 66b (see FIG. 1B). As shown in FIG. 1F, the longitudinal contours 68 are formed longitudinally in a longitudinal direction, and each longitudinal contour 68 has concave shape portions 62, where the longitudinal concavity 64b (see FIG. 1B) is reversed from the concave-up portion 66a to the concave-down portion 66b, longitudinally and in series. The concavity 64 of each longitudinal contour 68 comprises the longitudinal concavity 64b that changes in locations 65a (see FIG. 1B).

As further shown in FIG. 1F, the exterior profiles 60 shaped with the aerodynamic shaping 14 further comprise lateral contours 70 formed laterally in a lateral direction, and each lateral contour 70 has concave shape portions 62, where the lateral concavity 64c (see FIG. 1C) is reversed from the concave-up portion 66a (see FIG. 1C) to the concave-down portion 66b (see FIG. 1C), laterally and in series. The concavity 64 of each lateral contour 70 comprises the lateral concavity 64c that changes in locations 65b (see FIG. 1C). As further shown in FIG. 1F, the lateral contours 70 intersect with, or cross, the longitudinal contours 68.

Figure 1G:
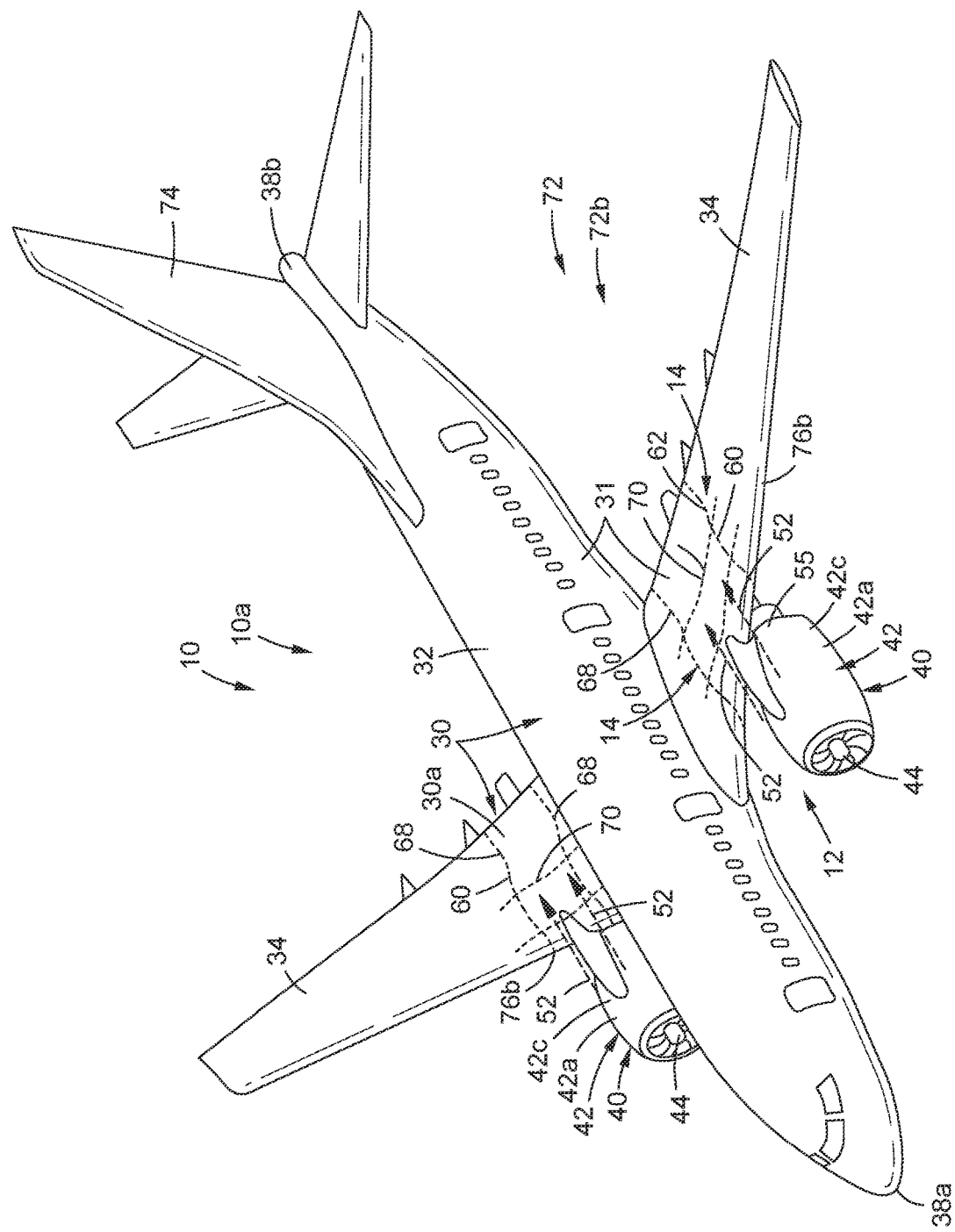
FIG. 1G is an illustration of a front perspective view of an exemplary aircraft with bottom-mounted nacelles having a version of a vehicle configuration with aerodynamic shaping of the disclosure.

Now referring to FIG. 1G, FIG. 1G is an illustration of a front perspective view of an exemplary vehicle 10, such as an air vehicle 10a, in the form of the aircraft 72, such as a commercial aircraft 72b, with bottom-mounted nacelles 42c, and with yet another version of a vehicle configuration 12 of the disclosure having aerodynamic shaping 14. As shown in FIG. 1G, the commercial aircraft 72b comprises the vehicle body 30, or airframe 31, including the fuselage 32, wings 34 attached to the fuselage 32, and the tail 74, or empennage. The vehicle 10, such as the commercial aircraft 72b, has the forward end 38a (see FIG. 1G) and the aft end 38b (see FIG. 1G).

As shown in FIG. 1G, the commercial aircraft 72b further comprises two auxiliary bodies 40, each attached and suspended partially below the respective wing 34 of the vehicle body 30 of the commercial aircraft 72b. As further shown in FIG. 1G, in one version, each auxiliary body 40 comprises the nacelle 42, such as the engine nacelle 42a, for example, the bottom-mounted nacelle 42c, that houses the engine 44. Each auxiliary body 40, such as the nacelle 42, is attached to a lower surface 76b (see FIG. 1G) of the wing 34 of the vehicle body 30. Each auxiliary body 40, such as the nacelle 42, is positioned a distance 50 (see FIG. 2) from the wing 34 of the vehicle body 30, to form the channels 52, between an upper surface 55 of the auxiliary body 40 and the lower surface 76b of the wing 34 of the vehicle body 30. As shown in FIG. 1G, the vehicle configuration 12 comprises the exterior profiles 60 comprising the longitudinal contours 68 and the lateral contours 70 shaped with the aerodynamic shaping 14, so that the exterior profiles 60 comprise concave shape portions 62 alternating, in series, in opposite concavities 64a (see FIG. 2), or opposite directions. In this version, the wings 34 of the vehicle body 30 are shaped with the aerodynamic shaping 14 to obtain the aerodynamic shaped vehicle body 30a (see FIG. 1G), or shape optimized vehicle body.

Now referring to FIG. 2, FIG. 2 is an illustration of a functional block diagram showing exemplary versions of a vehicle 10 having exemplary versions of a vehicle configuration 12 of the disclosure. The blocks in FIG. 2 represent elements, and lines connecting the various blocks do not imply any particular dependency of the elements. Furthermore, the connecting lines shown in the various Figures contained herein are intended to represent example functional relationships and/or physical couplings between the various elements, but it is noted that other alternative or additional functional relationships or physical connections may be present in versions disclosed herein. One or more of these blocks may be combined, divided, or combined and divided into different blocks when implemented in an illustrative example. Further, the illustrations of the vehicle 10 and the vehicle configuration 12 in FIG. 2 are not meant to imply physical or architectural limitations to the manner in which illustrative examples may be implemented. Other components in addition to, or in place of, the ones illustrated may be used. Some components may be unnecessary.

In one version of the disclosure, there is provided a vehicle configuration 12 (see FIG. 2), with aerodynamic shaping 14, to reduce drag 16 (see FIG. 2), such as interference drag 18 (see FIG. 2), in a fluid stream 20 (see FIG. 2), such as an air stream 22 (see FIG. 2). In another version of the disclosure, there is provided a vehicle 10 (see FIG. 2) having the vehicle configuration 12.

As shown in FIG. 2, the vehicle 10 preferably comprises an air vehicle 10a. As further shown in FIG. 2, the vehicle 10 may comprise a blended wing body (BWB) aircraft 28, an aircraft 72, such as a commercial aircraft 72a, 72b (see also FIGS. 1F, 1G), or a military aircraft 72c, a launch vehicle 86, such as a rocket-propelled vehicle 88, a spacecraft 90, or another suitable vehicle. The aerodynamic shaping 14 is particularly suitable for a propulsion airframe integration (PAI) 91 (see FIG. 2) of a top-mounted nacelle 42b (see FIG. 2) with a pylon 48 (see FIG. 2) on a BWB aircraft 28.

As further shown in FIG. 2, the vehicle configuration 12, such as an aerodynamic shaped vehicle configuration (CONFIG.) 12a, or shape optimized vehicle configuration, comprises the vehicle body 30, such as an aerodynamic (AERO) shaped vehicle body 30a. As further shown in FIG. 2, the vehicle body 30, in one version, such as for the BWB aircraft 28 and aircraft 72, comprises an airframe 31, including a fuselage 32, one or more wings 34, a tail 74 (see FIG. 1F), or other suitable structures. The vehicle body 30, in another version, such as for the launch vehicle 86 comprises a main body 92 (see FIGS. 2, 6A), or another suitable body structure.

As further shown in FIG. 2, the vehicle configuration 12, such as the aerodynamic shaped vehicle configuration 12a, comprises at least one auxiliary body 40, or one or more auxiliary bodies 40, each positioned, or offset, a distance 50, such as an optimal distance 50*a*, from the vehicle body 30, to form a channel 52, or gap, between the auxiliary body 40 and the vehicle body 30. In one version, such as for the BWB aircraft 28 (see FIG. 1A) and aircraft 72, the lower surface 54 of the auxiliary body 40 is positioned opposite to, and faces, the upper surface 36 of the vehicle body 30. In another version, such as for the launch vehicle 86 (see FIG. 6A), the rocket-propelled vehicle 88 (see FIG. 6A), or the spacecraft 90, the lower surface 54 (see FIG. 2), such as a side surface 94 (see FIGS. 2, 6A) of the auxiliary body 40 is positioned opposite to, and faces, an outer surface 37 (see FIGS. 2, 6A), or exterior surface, of the vehicle body 30. When the at least one auxiliary body 40 is shaped with the aerodynamic shaping 14 and shape optimization 109 (see FIG. 2), at least one aerodynamic (AERO) shaped auxiliary body 40*a* (see FIG. 2), or shape optimized auxiliary body, is obtained.

As further shown in FIG. 2, the auxiliary body 40 may comprise a nacelle 42, an engine nacelle 42*a*, a top-mounted nacelle 42*b*, a fuel tank 96, a pod 98, such as a sensor pod 98*a*, a booster 100, a missile 102, or another suitable body coupled to, and in proximity to, the vehicle body 30. As shown in FIG. 1C, the auxiliary body 40 may also comprise a bottom-mounted nacelle 42*c*. The auxiliary body 40 is in structural communication, for example, via a structural (STRUCT.) attachment element 46 (see FIG. 2), such as a pylon 48 (see FIG. 2), with the vehicle body 30. The pylon 48 may also be shaped with the aerodynamic shaping 14 (see FIG. 2), as discussed in further detail below with respect to FIGS. 5C-5D. As shown in FIG. 5C, the pylon 48 has an outboard exterior profile 146 and an inboard exterior profile 148, where one or more of, the outboard exterior profile 146 and the inboard exterior profile 148, may be shaped with the aerodynamic shaping 14.

Where the auxiliary body 40 comprises the nacelle 42, the nacelle 42, in one version, as shown in FIGS. 1A, 1F, is suspended above the vehicle body 30. In another version, as shown in FIG. 1G, the nacelle 42 is suspended below the vehicle body 30, such as below the wing 34.

As further shown in FIG. 2, the vehicle configuration 12, such as the aerodynamic shaped vehicle configuration 12*a*, comprises the exterior profile 60 of one or more of, the vehicle body 30 and the auxiliary body 40, shaped, such as externally shaped, with the aerodynamic shaping 14, so that the exterior profile 60 comprises one or more concave shape portions 62 (see FIG. 2). As discussed above, the aerodynamic shaping 14 provides aerodynamic shaped contours 80 (see FIG. 2), each having the exterior profile 60 and the three-dimensional (3D) shape 82 (see FIG. 2). As shown in FIG. 2, the aerodynamic shaping 14 includes longitudinal (LONG.) contours 68 and lateral (LAT.) contours 70.

As discussed above, where the exterior profile 60 comprises two or more concave shape portions 62, the two or more concave shape portions 62 alternate, in series, in opposite concavities 64*a* (see FIG. 2), or directions. As shown in FIG. 2, the concave shape portions 62 include one or more concave-up portions 66*a*, and/or one or more concave-down portions 66*b*. The concave shape portions 62 and the concavity 64 are reversed from the concave-up portion 66*a* to the concave-down portion 66*b* longitudinally, and reversal of the concavity 64 also occurs laterally between the exterior profiles 60. Each exterior profile 60 also has one or more curvature inflection points 104 (see FIGS. 1, 4A).

As further shown in FIG. 2, the vehicle configuration 12 and the aerodynamic shaping 14 may be modeled with a computer modeling software, program, or system, such as a CAD (computer-aided design) software program, for example, a parametric CAD software program, or computational fluid dynamics (CFD) mesh morphing using parametric or non-parametric mesh morphing tools, to obtain a three-dimensional (3D) model 106 (see FIG. 2). Other suitable modeling software programs or systems may also be used. Further, the 3D model 106 and the aerodynamic shaping 14 may be optimized with an optimization approach 108 (see FIG. 2) or process, or method, to perform shape optimization 109 (see FIG. 2), including, for example, an initial shape optimization 109*a* (see FIG. 2). The 3D model 106 with the aerodynamic shaping 14 may then be optimized and analyzed and tested through flow simulations using a computational fluid dynamics (CFD) design optimization software program, or another suitable flow simulation software or program, to optimize the aerodynamic shaping 14 of the vehicle body 30 and the auxiliary body 40 forming the channel 52, leading to optimal fluid flow 56, such as air flow 58, in the channel 52, that results in the reduction of drag 16, such as interference drag 18, and/or reduced likelihood of structural fatigue, and/or to optimize the aerodynamic shaping 14 of the structural attachment element 46, such as the pylon 48, discussed below with respect to FIGS. 5C-5D. The amount of aerodynamic shaping 14 made to one or more exterior profiles 60 of a vehicle 10 may be particular to the auxiliary body 40, such as the nacelle 42, used with the vehicle 10, and the amount of the aerodynamic shaping 14 may be different for different vehicles.

In one version, only the exterior profile 60 of the upper surface 36, or the outer surface 37, of the vehicle body 30 is shaped, such as externally shaped, with the aerodynamic shaping 14, to obtain the aerodynamic shaped vehicle body 30*a* (see FIG. 2), or shape optimized vehicle body. In another version, only the exterior profile 60 of the lower surface 54 of the auxiliary body 40 is shaped with the aerodynamic shaping 14, to obtain the aerodynamic shaped auxiliary body 40*a* (see FIG. 2), or shape optimized auxiliary body. In another version, both the exterior profile 60 of the upper surface 36, or the outer surface 37, of the vehicle body 30, and the exterior profile 60 of the lower surface 54 of the auxiliary body 40 are shaped, such as externally shaped, with the aerodynamic shaping 14. Further, if the structural attachment element 46, such as the pylon 48, is present, the structural attachment element 46, such as the pylon 48, may be shaped, such as externally shaped, with the aerodynamic shaping 14, alone, or in combination with one of, the aerodynamic shaped vehicle body 30*a*, the aerodynamic shaped auxiliary body 40*a*, or both the aerodynamic shaped vehicle body 30*a* and the aerodynamic shaped auxiliary body 40*a*. The aerodynamic shaping 14 of the pylon 48 is discussed in further detail below with respect to FIGS. 5C-5D. Further, the exterior profile 60 of the vehicle body 30 may be shaped at a location aft of the auxiliary body 40 with the aerodynamic shaping 14, such as in the form of aft aerodynamic shaping 14*a* (see FIG. 2).

The vehicle configuration 12 with the aerodynamic shaping 14 is designed to reduce drag 16 (see FIG. 2), such as interference drag 18 (see FIG. 2), in a fluid stream 20 (see FIG. 2), such as an air stream 22 (see FIG. 2), to obtain a reduced drag 16*a* (see FIG. 2), such as a reduced interference drag 18*a* (see FIG. 2). The interference drag 18 may include compressibility drag 112 (see FIG. 2). Further, the vehicle configuration 12 with the aerodynamic shaping 14 is designed to reduce compressibility drag 112, to obtain a reduced compressibility drag 112*a* (see FIG. 2).

As used herein, "interference drag" means drag that is generated when a fluid flow or air flow across a component of a vehicle, for example, an aircraft, is forced to mix with the fluid flow or air flow across an adjacent or proximal component, for example, a nacelle and a fuselage, or a nacelle and a wing. As fluid flow, or air flow, flows around the different vehicle or aircraft components, and mixes, localized shock waves, or shocks, and regions of recirculating air flow are formed, creating a drag sum greater than a drag that the vehicle or aircraft components would have by themselves. Interference drag may include compressibility drag, skin-friction drag, pressure drag, and drag from air recirculation.

With the aerodynamic shaping 14 of the vehicle 10, when the fluid flow (FF) 56 (see FIG. 2) of fluid 114 (see FIG. 2), such as the air flow (AF) 58 (see FIG. 2) of air 116 (see FIG. 2), from the fluid stream 20, such as the air stream 22, flows through the channel 52, the drag 16, such as the interference drag 18, resulting from fluid flow interactions 118 (see FIG. 2), or mixing, such as air flow interactions 120 (see FIG. 2), or mixing, between the vehicle body 30 and the auxiliary body 40 is reduced.

The fluid flow 56, such as an air flow 58, from the fluid stream 20, such as the air stream 22, comprises a compressible fluid flow 56*a* (see FIG. 2), such as a compressible air flow 58*a* (see FIG. 2), moving at one of, transonic speed 24 (see FIG. 2), subsonic speed 26 (see FIG. 2), or supersonic speed 27 (see FIG. 2), through the channel 52. As shown in FIG. 2, the channel 52 provides a flow channel 52*a*, for example, a fluid flow channel 52*b*, or an air flow channel 52*c*, between the auxiliary body 40 and the vehicle body 30, configured to allow channel flow 53, such as fluid flow 56, for example, air flow 58, to flow through the channel 52. As further shown in FIG. 2, the channel flow 53 may be optimized with the optimization approach 108 to obtain an optimized channel flow 53*a*. The optimization approach 108, or process, provides for shape optimization 109 (see FIG. 2) along the channel 52, of the exterior profile 60 of one or more of, the vehicle body 30, the auxiliary body 40, and the pylon 48, if present. As further shown in FIG. 2, prior to the air flow 58 flowing into the channel 52, the air flow 58 is in the form of upstream air flow (AF) 58*b*, and after the air flow 58 flows through the channel 52 and exits the channel 52, the air flow 58 is in the form of exhaust air flow (AF) 58*c*. The vehicle body 30 has an air flow (AF) path 58*d* (see FIG. 2) in the channel 52, and the auxiliary body 40 has an air flow path 58*d* in the channel 52, when air flow 58 flows through the channel 52.

To avoid a shock wave 122 (see FIG. 2) or to reduce a strength 124 (see FIG. 2) of the shock wave 122 that may be created within the channel 52 between the vehicle body 30 and the auxiliary body 40, during flight of the vehicle 10 at transonic speed 24, or velocity, or subsonic speed 26, or velocity, or supersonic speed 27, or velocity, the exterior profile 60 of one or more of, the vehicle body 30 and the auxiliary body 40, and optionally, the pylon 48, if present, are shaped with the aerodynamic shaping 14. Thus, the aerodynamic shaping 14 of the exterior profile 60 of one or more of, the vehicle body 30 and the auxiliary body 40, and optionally, the pylon 48, if present, results in a reduced shock wave strength 124*a* (see FIG. 2).

Further, the exterior profile 60 of the vehicle body 30, such as a vehicle body aft surface 30*e* (see FIG. 8B), of the exterior profile 60 of the upper surface 36 of the vehicle body 30, may be shaped aft of the auxiliary body 40 with the aerodynamic shaping 14, such as the aft aerodynamic shaping 14*a*, to reduce aft recirculation 126 (see FIG. 2) and aft recirculation zones 126*a* (see FIG. 2) of recirculation fluid flow (FF) 56*b* (see FIG. 2), or separated fluid flow (FF) 56*c* (see FIG. 2), for example, recirculation air flow (AF) 58*e* (see FIG. 2), or separated air flow (AF) 58*f* (see FIG. 2), formed aft of the auxiliary body 40. The aerodynamic shaping 14, such as the aft aerodynamic shaping 14*a*, of the exterior profile 60 of the vehicle body 30 aft of the auxiliary body 40 results in reduced aft recirculation (RECIRC.) 126*b* (see FIG. 2). As used herein, "recirculation" means fluid flow or air flow that moves and curls back on itself, relative to the direction of the fluid flow or air flow far upstream, because it is moving through the channel between the auxiliary body and the vehicle body at transonic speeds, or subsonic speeds, or supersonic speeds.

Figure 3A:
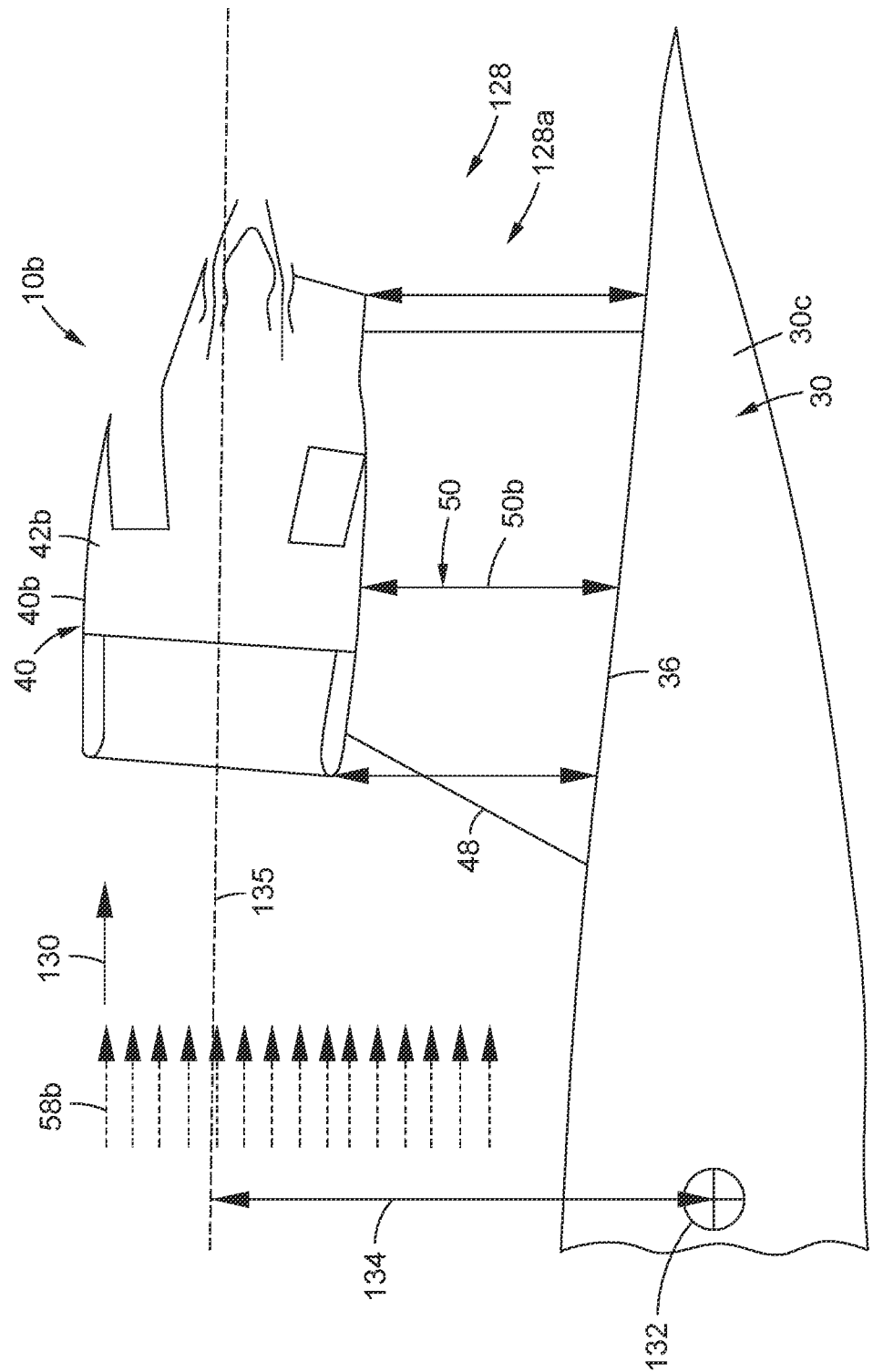
FIG. 3A is a schematic illustration of a side view of an unshaped vehicle configuration with a top-mounted nacelle mounted a high distance above a vehicle body.
Figure 3B:
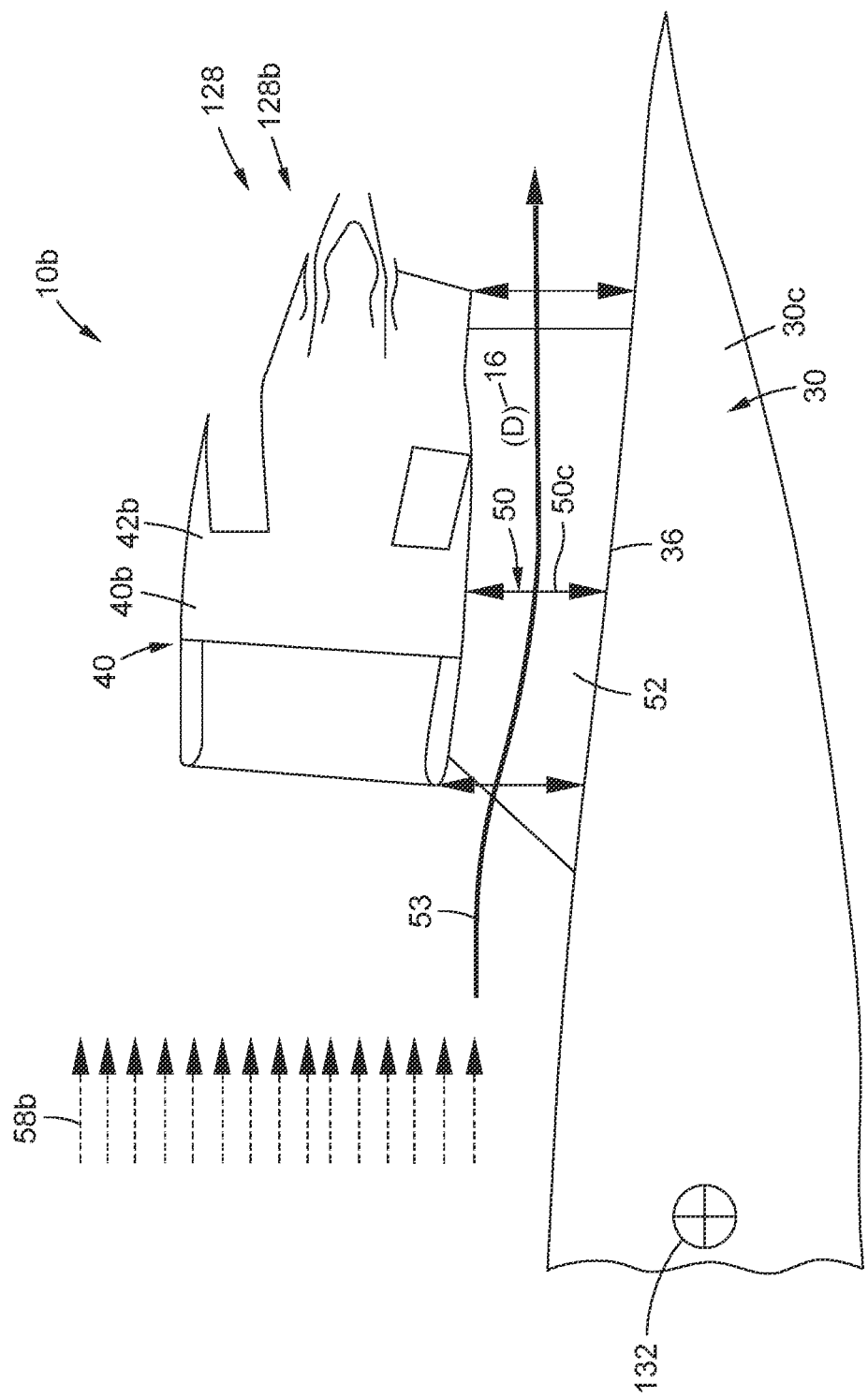
FIG. 3B is a schematic illustration of a side view of another unshaped vehicle configuration with a top-mounted nacelle mounted an intermediate distance above a vehicle body, that introduces a channel air flow and interference drag.
Figure 3C:
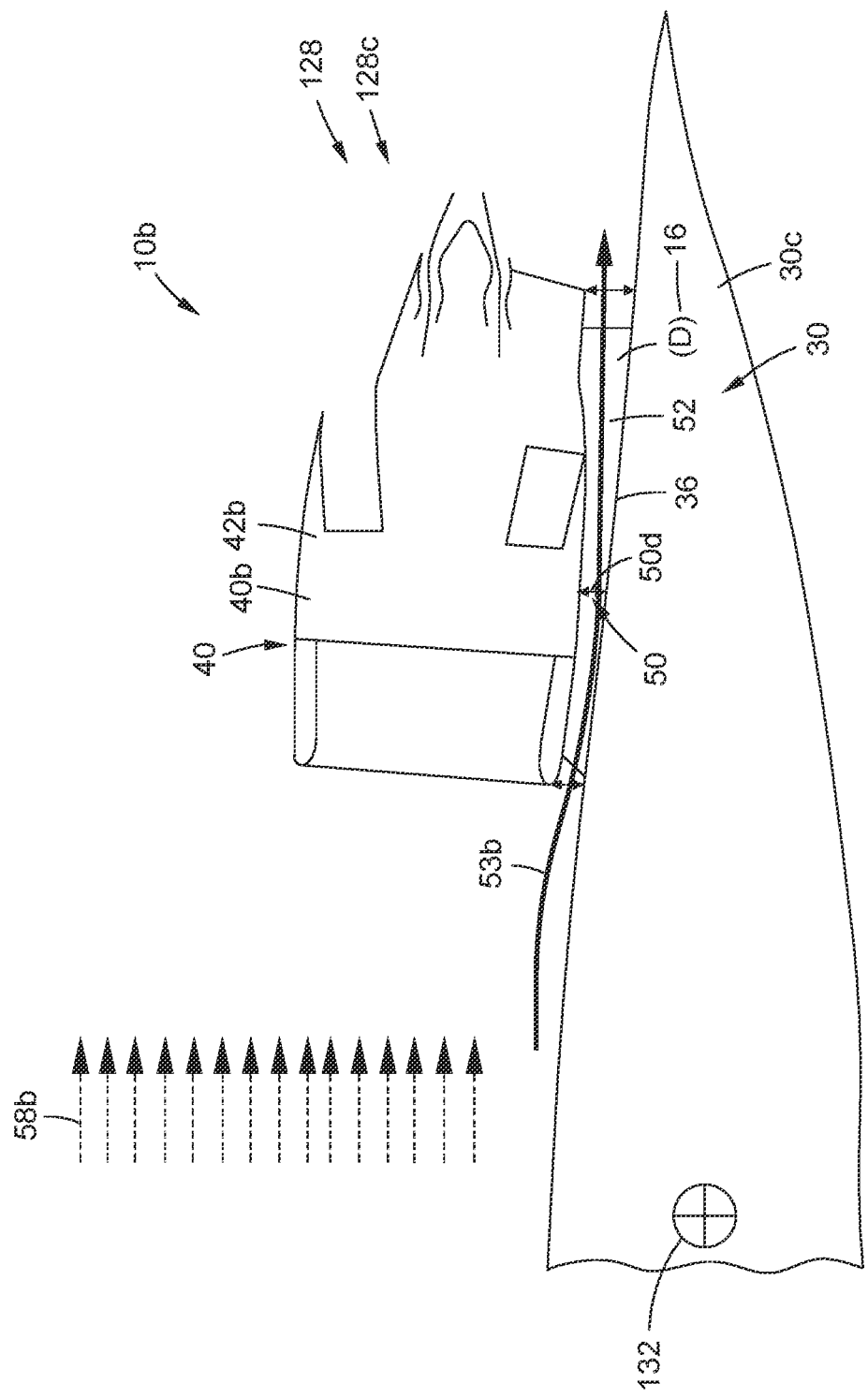
FIG. 3C is a schematic illustration of a side view of yet another unshaped vehicle configuration with a top-mounted nacelle mounted a short distance above a vehicle body, that introduces a highly-constricted channel air flow and interference drag.

Now referring to FIGS. 3A-3C, FIGS. 3A-3C show various unshaped vehicle configurations 128, or non-optimized vehicle configurations, of an unshaped vehicle 10*b*, or a non-optimized vehicle, with no aerodynamic shaping 14 (see FIG. 2). Associated issues may result from such unshaped vehicle configurations 128. FIGS. 3A-3C show the auxiliary body 40, such as an unshaped auxiliary body 40*b*, or non-optimized auxiliary body, in the form of a top-mounted nacelle 42*b*, with no aerodynamic shaping 14 (see FIG. 4C), mounted, via a pylon 48, above an upper surface 36, of the vehicle body 30, such as an unshaped vehicle body 30*c*, or non-optimized vehicle body, with no aerodynamic shaping 14 (see FIG. 4A). FIGS. 3A-3C further show upstream air flow 58*b* flowing in a forward-to-aft direction 130 toward the top-mounted nacelle 42*b*, and further show a center of gravity 132.

FIG. 3A shows a schematic illustration of a side view of the unshaped vehicle configuration 128, such as a first unshaped vehicle configuration 128*a*, of the unshaped vehicle 10*b*, with no aerodynamic shaping 14 (see FIG. 2), and having the auxiliary body 40, such as the unshaped auxiliary body 40*b*, or non-optimized auxiliary body, in the form of the top-mounted nacelle 42*b*, mounted a distance 50, such as a high distance 50*b*, above the upper surface 36, of the vehicle body 30, such as the unshaped vehicle body 30*c*, or non-optimized vehicle body. FIG. 3A shows a center of gravity 132, a thrust moment arm 134, the upstream air flow 58*b*, and a thrust line 135 extending longitudinally through the top-mounted nacelle 42*b*. To decouple an added drag effect of the top-mounted nacelle 42*b* on the vehicle body 30, the top-mounted nacelle 42*b* is displaced, or positioned, a high distance 50*b* above the vehicle body 30. However, higher displacement may create a large nose-down pitching moment induced by thrust of the top-mounted nacelle 42*b*, which may make it difficult to trim the unshaped vehicle 10*b* across a flight envelope (i.e., operational limits that a vehicle, such as an aircraft, is safe to fly in), and more particularly, during takeoff of the unshaped vehicle 10*b*.

FIG. 3B shows a schematic illustration of a side view of another unshaped vehicle configuration 128, such as a second unshaped vehicle configuration 128*b*, of the unshaped vehicle 10*b*, having no aerodynamic shaping 14 (see FIG. 1A), and having the auxiliary body 40, such as the unshaped auxiliary body 40*b*, or non-optimized auxiliary body, in the form of the top-mounted nacelle 42*b*, mounted a distance 50, such as an intermediate distance 50*c*, above the upper surface 36, of the vehicle body 30, such as the unshaped vehicle body 30*c*, or non-optimized vehicle body. The second unshaped vehicle configuration 128*b* introduces a channel flow 53 and drag (D) 16, such as interference drag 18 (see FIG. 2). FIG. 3B shows introduction of the channel flow 53 in the channel 52 formed between the auxiliary body 40 and vehicle body 30. As shown in FIG. 3B, to avoid a nose-down pitching moment, the auxiliary body 40, such as the unshaped auxiliary body 40*b*, or non-optimized auxiliary body, in the form of the top-mounted nacelle 42b, is lowered closer to the vehicle body 30, such as the unshaped vehicle body 30c, or non-optimized vehicle body. As the top-mounted nacelle 42b approaches the vehicle body 30, the respective air flow paths 58d (see FIG. 2) for both the top-mounted nacelle 42b and the vehicle body 30 begin to couple and channel flow 53 occurs, along with the introduction of drag (D) 16, such as interference drag 18. FIG. 3B further shows the upstream air flow 58b and the center of gravity 132.

FIG. 3C shows a schematic illustration of a side view of yet another unshaped vehicle configuration 128, such as a third unshaped vehicle configuration 128c, of the unshaped vehicle 10b, having no aerodynamic shaping 14 (see FIG. 2), and having the auxiliary body 40, such as the unshaped auxiliary body 40b, or non-optimized auxiliary body, in the form of the top-mounted nacelle 42b, mounted a distance 50, such as a short distance 50d, above the upper surface 36, of the vehicle body 30, such as the unshaped vehicle body 30c, or non-optimized vehicle body. The third unshaped vehicle configuration 128c introduces a constricted channel flow 53b in the channel 52 and drag (D) 16, such as interference drag 18 (see FIG. 2). When the unshaped auxiliary body 40b, or non-optimized auxiliary body, in the form of the top-mounted nacelle 42b, is positioned too close to the vehicle body 30, such as the unshaped vehicle body 30c, or non-optimized vehicle body, although the nose-down pitching moment is reduced, drag 16, such as interference drag 18, may grow very quickly due to the constricted channel flow 53b, and a resulting performance degradation may lead to unfulfilled mission requirements, such as range. FIG. 3C further shows the upstream air flow 58b and the center of gravity 132.

Now referring to FIGS. 4A-4D, FIGS. 4A-4D show a vehicle 10 having various vehicle configurations 12 of the disclosure with aerodynamic shaping 14. FIGS. 4A-4D show the auxiliary body 40, such as the nacelle 42, in the form of the top-mounted nacelle 42b, mounted, via the pylon 48, at a distance 50, such as an optimal distance 50a, above the upper surface 36 of the vehicle body 30, for example, the fuselage 32. FIGS. 4A-4D further show upstream air flow 58b flowing in a forward-to-aft direction 130 toward the top-mounted nacelle 42b, and show a center of gravity 132 of the vehicle 10. FIGS. 4A-4D further show the channel flow 53 through the channel 52 between the lower surface 54 of the auxiliary body 40 and the upper surface 36 of the vehicle body 30.

FIGS. 4A-4D further show three locations 136 having a channel height 138 that is sufficient or effective to obtain a reduced shock wave strength 124a (see FIG. 2) and a reduced aft recirculation 126b (see FIG. 2). FIGS. 4A-4D show a location 136, such as a first location 136a, with a channel height 138, such as a first channel height 138a, between a leading edge lower surface portion 54a, or highlight, of the auxiliary body 40, such as the top-mounted nacelle 42b, and an upper surface first portion 36a of the vehicle body 30. FIGS. 4A-4D show a location 136, such as a second location 136b, with a channel height 138, such as a second channel height 138b, between a maximum diameter point lower surface 54b of the auxiliary body 40, such as the top-mounted nacelle 42b, and an upper surface second portion 36b of the vehicle body 30. FIGS. 4A-4D show a location 136, such as a third location 136c, with a channel height 138, such as a third channel height 138c, between a trailing edge lower surface 54c of the auxiliary body 40, such as the top-mounted nacelle 42b, and an upper surface third portion 36c of the vehicle body 30.

Figure 4A:
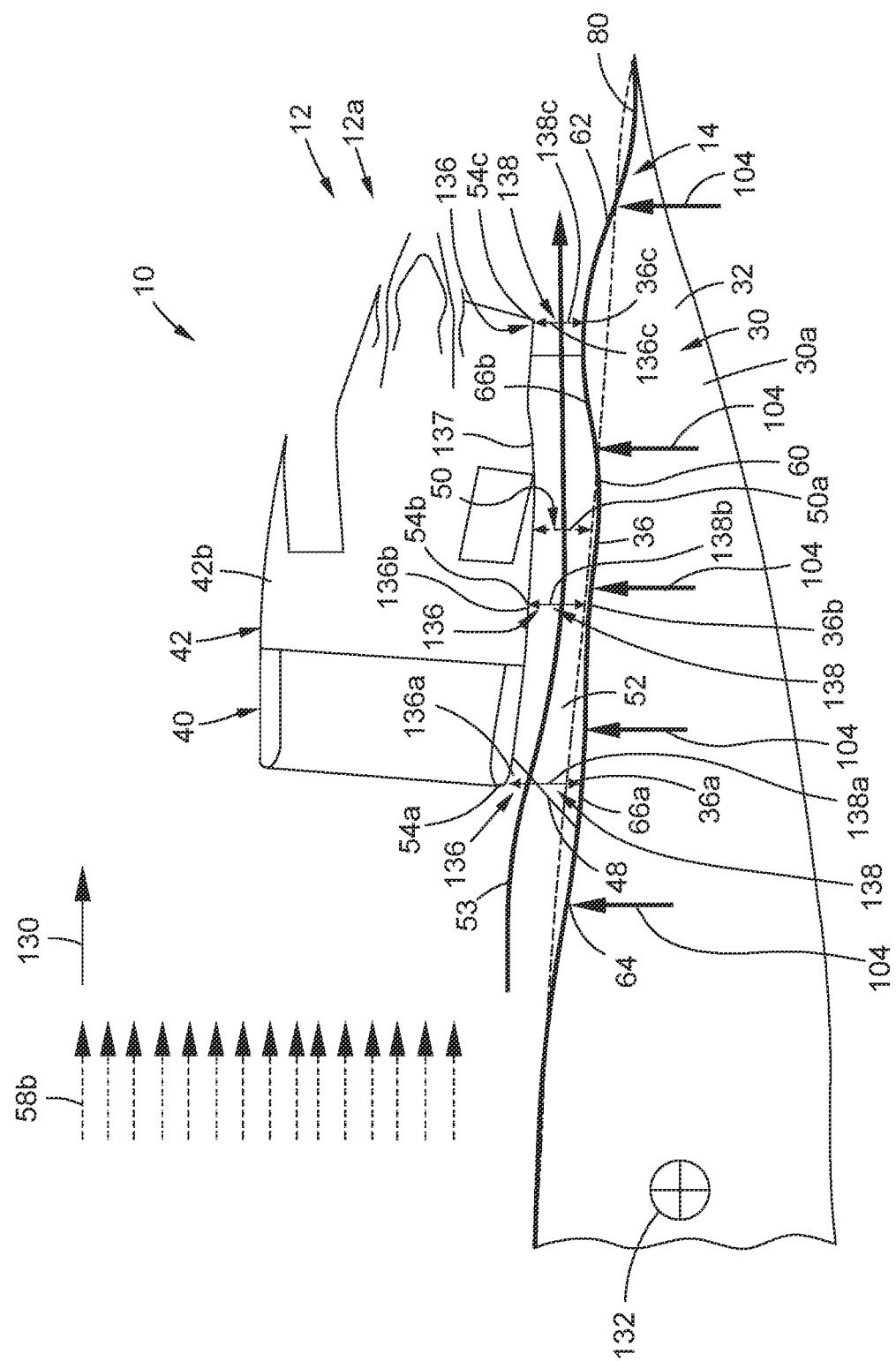
FIG. 4A is a schematic illustration of a side view of a version of an aerodynamic shaped vehicle configuration of the disclosure, having aerodynamic shaping of an upper surface of a vehicle body.

Now referring to FIG. 4A, FIG. 4A is a schematic illustration of a side view of a version of a vehicle configuration 12, such as an aerodynamic shaped vehicle configuration 12a, of the disclosure, having the auxiliary body 40, such as the nacelle 42, for example, the top-mounted nacelle 42b, mounted, via the pylon 48, a distance 50, such as an optimal distance 50a, above the vehicle body 30, for example, the fuselage 32, and having aerodynamic shaping 14 of the upper surface 36 of the vehicle body 30, to obtain an aerodynamic shaped vehicle body 30a, or shape optimized vehicle body.

FIG. 4A shows the exterior profile 60 of the upper surface 36 of the vehicle body 30 shaped, such as externally shaped, with the aerodynamic shaping 14 to have concave shape portions 62 alternating, in series, in opposite concavities 64a (see FIG. 1B), or opposite directions, and an aerodynamic shaped contour 80. The concave shape portions 62 include one or more concave-up portions 66a and one or more concave-down portions 66b. FIG. 4A further shows curvature inflection points 104, denoted by arrows, along the exterior profile 60. The curvature inflection points 104 indicate where the concavity 64 is reversed from the concave-up portion 66a to the concave-down portion 66b, longitudinally along the exterior profile 60. Longitudinal spacing of the curvature inflection points 104 depends on contours 137 (see FIG. 4A) of the lower surface 54 of the auxiliary body 40, such as the top-mounted nacelle 42b, and Mach number of the upstream air flow 58b. Further, z displacement 220 (see FIG. 11D) between the lower surface 54 of the auxiliary body 40, such as the top-mounted nacelle 42b, and the upper surface 36 of the vehicle body 30 varies longitudinally and with Mach number of the upstream air flow 58b, with at least the three locations 136 having the channel heights 138 that provide a height distribution through the channel 52 that is sufficient, or effective, to obtain reduced shock wave strength 124a (see FIG. 2) and reduced aft recirculation 126b (see FIG. 2).

FIG. 4A further shows the three locations 136 having the channel height 138 that is sufficient, or effective, to obtain reduced shock wave strength 124a (see FIG. 2) and reduced aft recirculation 126b (see FIG. 2) with the aerodynamic shaping 14. In one version, a maximum aerodynamic shaping height to be carved out, or removed, from the upper surface 36 of the vehicle body 30 may be determined by calculating and using the greater of, either a difference between the first channel height 138a and the second channel height 138b, and maintaining the difference between the second channel height 138b and the third channel height 138c to be similar. This is applicable to the versions of the aerodynamic shaped vehicle body 30a, in FIGS. 4A and 4B, as well as an initial shape optimized vehicle body 30d of FIG. 4D.

FIG. 4A further shows the upstream air flow 58b, the center of gravity 132 of the vehicle 10, and the channel flow 53 through the channel 52. The aerodynamic shaping 14 and shape optimization 109 (see FIG. 2) of the upper surface 36 of the vehicle body 30 optimize the channel flow 53 and result in reduced drag 16a (see FIG. 2), such as reduced interference drag 18a (see FIG. 2), and reduced aft recirculation 126b (see FIG. 2), and reduced likelihood of structural fatigue.

Figure 4B:
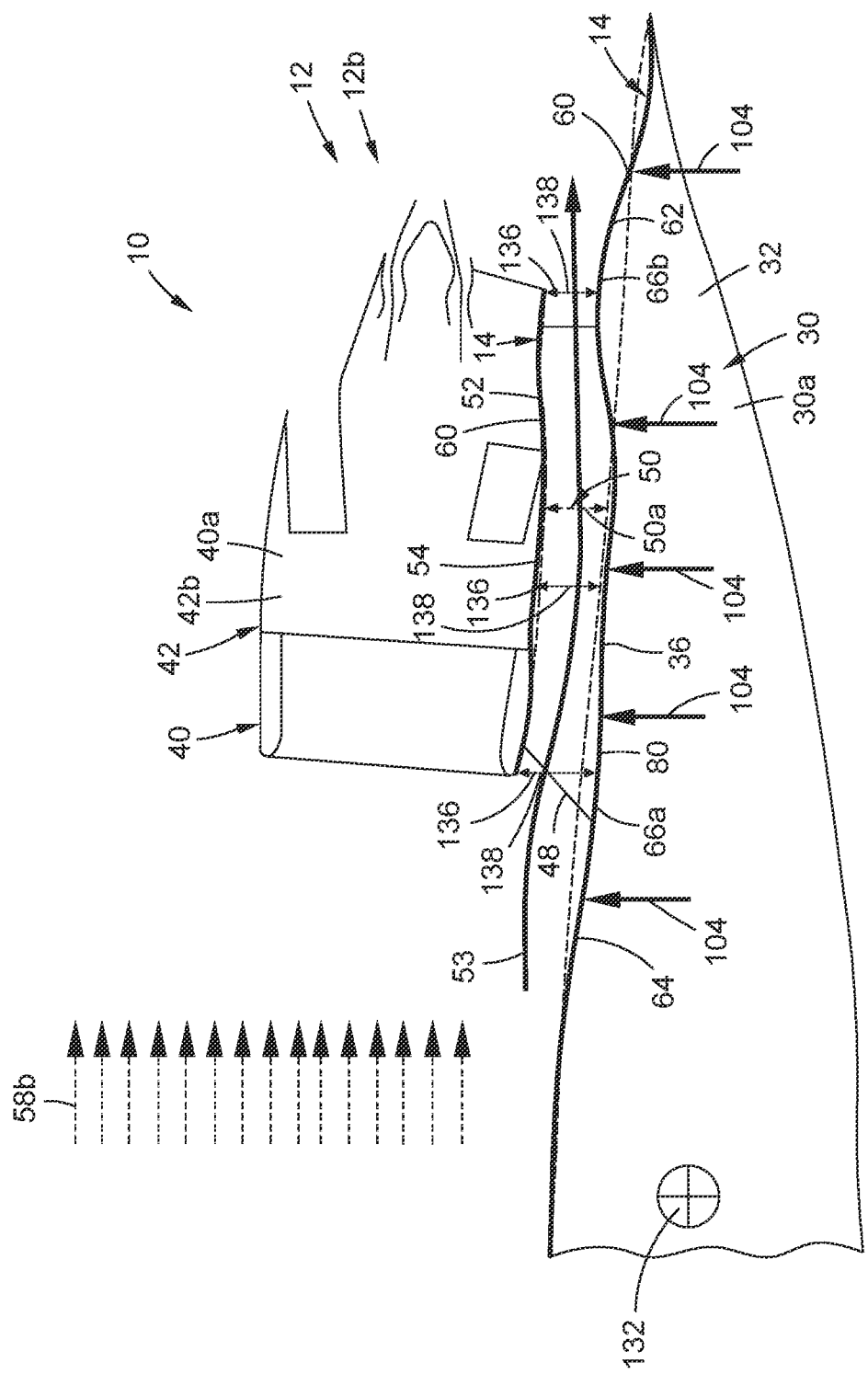
FIG. 4B is a schematic illustration of a side view of another version of an aerodynamic shaped vehicle configuration of the disclosure, having aerodynamic shaping of both an upper surface of a vehicle body and a lower surface of an auxiliary body.

Now referring to FIG. 4B, FIG. 4B is a schematic illustration of a side view of another version of a vehicle configuration 12, such as an aerodynamic shaped vehicle configuration 12b, for the vehicle 10, where the vehicle configuration 12 has the auxiliary body 40, such as the nacelle 42, for example, the top-mounted nacelle 42b, mounted, via the pylon 48, the distance 50, such as the optimal distance 50a, above the vehicle body 30, for example, the fuselage 32, and having aerodynamic shaping 14 of both the upper surface 36 of the vehicle body 30 and the lower surface 54 of the auxiliary body 40, such as the nacelle 42, for example, the top-mounted nacelle 42b, to obtain both an aerodynamic shaped vehicle body 30a, or shape optimized vehicle body, and an aerodynamic shaped auxiliary body 40a, or shape optimized auxiliary body.

FIG. 4B shows the exterior profile 60 of the upper surface 36 of the vehicle body 30 shaped with the aerodynamic shaping 14 to have concave shape portions 62 alternating, in series, in opposite concavities 64a (see FIG. 1B), or opposite directions, and the aerodynamic shaped contour 80. FIG. 4B further shows the exterior profile 60 of the lower surface 54 of the auxiliary body 40 shaped with the aerodynamic shaping 14 to have concave shape portions 62 alternating, in series, in opposite concavities 64a, or opposite directions, and the aerodynamic shaped contour 80. The concave shape portions 62 of the exterior profiles 60 include concave-up portions 66a and concave-down portions 66b. FIG. 4B further shows curvature inflection points 104, denoted by arrows, along the exterior profile 60 of the upper surface 36 of the vehicle body 30. The curvature inflection points 104 indicate where the concavity 64 is reversed from the concave-up portion 66a to the concave-down portion 66b, longitudinally along the exterior profile 60 of the upper surface 36 of the vehicle body 30.

With the aerodynamic shaped vehicle configuration 12b of FIG. 4B, a compromise in the amount of aerodynamic shaping 14 may be made between the lower surface 54 of the auxiliary body 40 and the upper surface 36 of the vehicle body 30, to avoid constriction of the channel 52. The aerodynamic shaping 14 of the lower surface 54 of the auxiliary body 40, such as the nacelle 42, may be similar to the aerodynamic shaping 14 of the upper surface 36 of the vehicle body 30. However, less aerodynamic shaping 14 of the auxiliary body 40, such as the nacelle 42, may be made due to compact packing of internal sub-systems near the lower surface 54.

FIG. 4B further shows the first location 136a, the second location 136b, and the third location 136c, having the first channel height 138a, the second channel height 138b, and the third channel height 138c, respectively, that provide a height distribution through the channel 52 that is sufficient or effective to obtain reduced shock wave strength 124a (see FIG. 2) and reduced aft recirculation 126b (see FIG. 2) with the aerodynamic shaping 14. FIG. 4B further shows the upstream air flow 58b, the center of gravity 132 of the vehicle 10, and the channel flow 53 through the channel 52. The aerodynamic shaping 14 and shape optimization 109 (see FIG. 2) of both the upper surface 36 of the vehicle body 30 and the lower surface 54 of the auxiliary body 40 optimize the channel flow 53 and result in reduced drag 16a (see FIG. 2), such as reduced interference drag 18a (see FIG. 2), and reduced aft recirculation 126b (see FIG. 2), and reduced likelihood of structural fatigue.

Figure 4C:
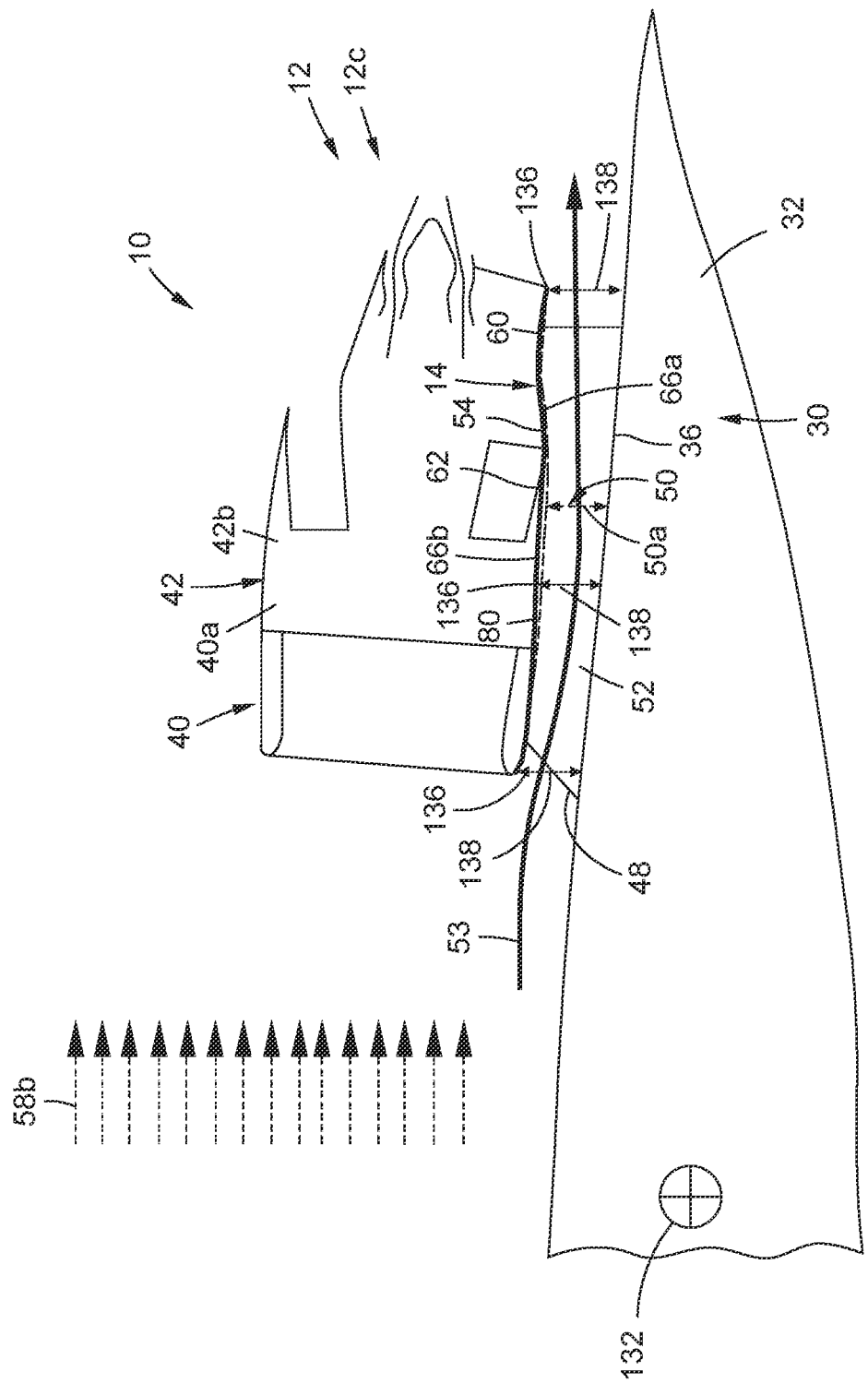
FIG. 4C is a schematic illustration of a side view of yet another version of an aerodynamic shaped vehicle configuration of the disclosure, having aerodynamic shaping of a lower surface of an auxiliary body.

Now referring to FIG. 4C, FIG. 4C is a schematic illustration of a side view of yet another version of a vehicle configuration 12, such as an aerodynamic shaped vehicle configuration 12c, for the vehicle 10, having the auxiliary body 40, such as the nacelle 42, for example, the top-mounted nacelle 42b, mounted, via the pylon 48, the distance 50, such as the optimal distance 50a, above the vehicle body 30, for example, the fuselage 32, and having aerodynamic shaping 14 of only the lower surface 54 of the auxiliary body 40, such as the nacelle 42, for example, the top-mounted nacelle 42b, to obtain the aerodynamic shaped auxiliary body 40a, or shape optimized auxiliary body. FIG. 4C shows the exterior profile 60 of the lower surface 54 of the auxiliary body 40 shaped with the aerodynamic shaping 14 to have concave shape portions 62 alternating, in series, in opposite concavities 64a (see FIG. 1B), or opposite directions, and the aerodynamic shaped contour 80. The concave shape portions 62 of the exterior profiles 60 include one or more concave-up portions 66a and one or more concave-down portions 66b. The aerodynamic shaping 14 of the lower surface 54 of the auxiliary body 40, such as the nacelle 42, may be minimized, or not as great as, the aerodynamic shaping 14 of the upper surface 36 of the vehicle body 30, due to compact packing of internal sub-systems near the lower surface 54.

FIG. 4C further shows the first location 136a, the second location 136b, and the third location 136c, having the first channel height 138a, the second channel height 138b, and the third channel height 138c, respectively, that provide a height distribution through the channel 52 that is sufficient, or effective, to obtain reduced shock wave strength 124a (see FIG. 2) and reduced aft recirculation 126b (see FIG. 2) with the aerodynamic shaping 14. FIG. 4B further shows the upstream air flow 58b, the center of gravity 132 of the vehicle 10, and the channel flow 53 through the channel 52. The aerodynamic shaping 14 and shape optimization 109 (see FIG. 2) of the lower surface 54 of the auxiliary body 40 optimize the channel flow 53 and result in reduced drag 16a (see FIG. 2), such as reduced interference drag 18a (see FIG. 2), and reduced likelihood of structural fatigue.

Figure 4D:
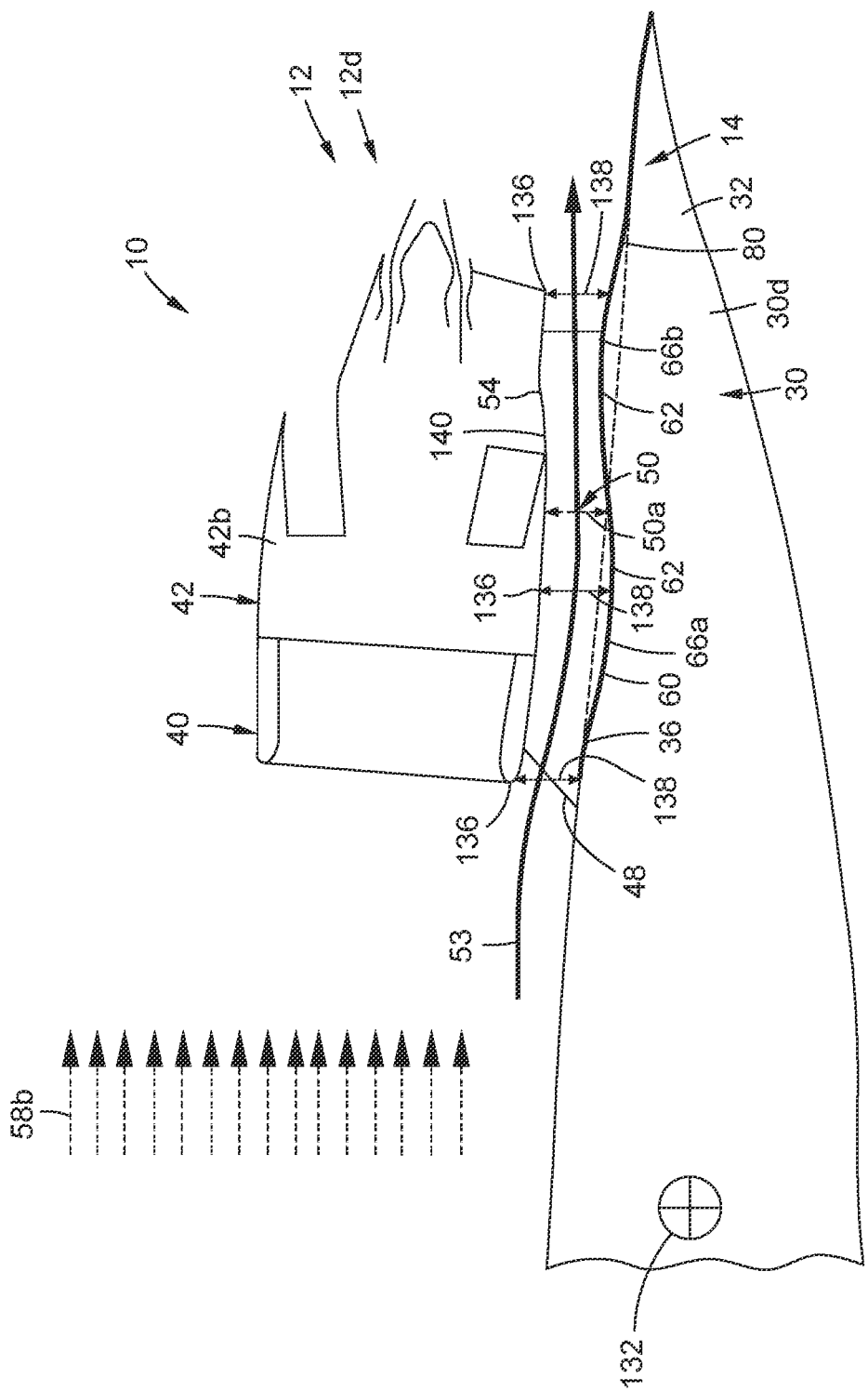
FIG. 4D is a schematic illustration of a side view of yet another version of an aerodynamic shaped vehicle configuration of the disclosure having aerodynamic shaping of a contoured profile of a lower surface of an auxiliary body carved into an upper surface of a vehicle body, to obtain an initial shape optimized vehicle body.

Now referring to FIG. 4D, FIG. 4D is a schematic illustration of a side view of yet another version of a vehicle configuration 12, such as an aerodynamic shaped vehicle configuration 12d, of the disclosure, having the auxiliary body 40, such as the nacelle 42, for example, the top-mounted nacelle 42b, mounted, via the pylon 48, a distance 50, such as an optimal distance 50a, above the vehicle body 30, for example, the fuselage 32. In this version, the upper surface 36 of the vehicle body 30 undergoes an initial shape optimization 109a (see FIG. 2), to obtain the initial shape optimized vehicle body 30d.

In this version of initializing the vehicle configuration 12, such as the aerodynamic shaped vehicle configuration 12d, a contoured profile 140 (see FIG. 4D) of the lower surface 54 of the auxiliary body 40, such as the nacelle 42, for example, the top-mounted nacelle 42b, is carved out, or cut out, or removed, from the upper surface 36 of the vehicle body 30, such as the fuselage 32, so that the exterior profile 60 of the upper surface 36 of the vehicle body 30 with the aerodynamic shaping 14 is the same, or similar, to the contoured profile 140 of the lower surface 54 of the auxiliary body 40 that does not have aerodynamic shaping 14. In other words, the contoured profile 140 of the lower surface 54 of the nacelle 42 is carved or cut into the upper surface 36 of the vehicle body 30, so that the exterior profile 60 of the upper surface 36 of the vehicle body 30 matches the contoured profile 140 of the original auxiliary body 40, or nacelle 42.

FIG. 4D shows the exterior profile 60 of the upper surface 36 of the vehicle body 30, such as the initial shape optimized vehicle body 30d, shaped with the aerodynamic shaping 14 to have concave shape portions 62 alternating, in series, in opposite concavities 64a (see FIG. 1B), or opposite directions, and the aerodynamic shaped contour 80. The concave shape portions 62 include one or more concave-up portions 66a and one or more concave-down portions 66b.

FIG. 4D further shows the first location 136a, the second location 136b, and the third location 136c, having the first channel height 138a, the second channel height 138b, and the third channel height 138c, respectively, that provide a height distribution through the channel 52 that is sufficient, or effective, to obtain reduced shock wave strength 124a (see FIG. 2) and reduced aft recirculation 126b (see FIG. 2) with the aerodynamic shaping 14. FIG. 4D further shows the upstream air flow 58b, the center of gravity 132 of the vehicle 10, and the channel flow 53 through the channel 52. The aerodynamic shaping 14 and the initial shape optimization 109a (see FIG. 2), of the upper surface 36 of the vehicle body 30 optimize the channel flow 53 and result in reduced drag 16a (see FIG. 2), such as reduced interference drag 18a (see FIG. 2), and reduced aft recirculation 126b (see FIG. 2), and reduced likelihood of structural fatigue.

Now referring to FIG. 5A, FIG. 5A is a schematic illustration of a front perspective partial view of a vehicle 10, such as an air vehicle 10a, showing a structural attachment element 46, such as in the form of a pylon 48, suspending an auxiliary body 40, such as a nacelle 42, for example, a top-mounted nacelle 42b, above a vehicle body 30, such as a fuselage 32, and attaching the auxiliary body 40, such as the nacelle 42, for example, the top-mounted nacelle 42b, to an upper surface section 36d of the upper surface 36 of the vehicle body 30. The pylon 48 contains internal structures (not shown) connecting and attaching the auxiliary body 40, such as the nacelle 42, and/or attaching the engine 44, or other structure, housed within the nacelle 42, to the upper surface section 36d of the upper surface 36 of the vehicle body 30, and/or to structures within the vehicle body 30, or fuselage 32. The internal structures in the pylon 48 may include beams, ribs, frames, or other suitable internal structures.

FIG. 5A further shows the channels 52 on each side of the auxiliary body 40. The channels 52 are formed between the lower surface 54 of the auxiliary body 40, such as the nacelle 42, for example, the top-mounted nacelle 42b, and the upper surface 36 of the vehicle body 30, such as the fuselage 32. The pylon may also be referred to as an aero fairing. Since the pylon 48 is like a stubby wing, it has a similar aerodynamic effect on the channel flow 53 (see FIG. 2) through the channels 52, as the auxiliary body 40, such as the nacelle 42, has, and as the vehicle body 30, such as the fuselage 32, has as well.

Now referring to FIG. 5B, FIG. 5B is a schematic illustration of a front perspective view of the structural attachment element 46, such as in the form of the pylon 48, of FIG. 5A, where the pylon 48 has no aerodynamic shaping 14 (see FIG. 2), and is in the form of an unshaped pylon 48b, or non-optimized pylon. FIG. 5B shows the structural attachment element 46, such as the pylon 48, attached to the upper surface section 36d of the upper surface 36 (see FIG. 5A) of the vehicle body 30 (see FIG. 5A). As shown in FIG. 5B, the structural attachment element 46, such as the pylon 48, comprises a top end 142a, a bottom end 142b, an outboard side 144a (see also FIG. 5A), an inboard side 144b, a leading edge 145a, and a trailing edge 145b. The leading edge 145a and the trailing edge 145b are airfoil shaped. As further shown in FIG. 5B, the outboard side 144a has an outboard exterior profile 146, including an outboard exterior profile top end 146a and an outboard exterior profile bottom end 146b. As further shown in FIG. 5B, the inboard side 144b has an inboard exterior profile 148, including an inboard exterior profile top end 148a and an inboard exterior profile bottom end 148b.

Now referring to FIG. 5C, FIG. 5C is a schematic illustration of a front perspective view of the structural attachment element 46, such as in the form of the pylon 48, of FIG. 5A, where the pylon 48 is shaped with a version of the aerodynamic shaping 14 of the disclosure. FIG. 5C shows the structural attachment element 46, such as the pylon 48, attached to the upper surface section 36d of the upper surface 36 (see FIG. 5A) of the vehicle body 30 (see FIG. 5A). FIG. 5C further shows the top end 142a, the bottom end 142b, the outboard side 144a, the inboard side 144b, the leading edge 145a, and the trailing edge 145b. FIG. 5C further shows the outboard side 144a shaped with the aerodynamic shaping 14, including the outboard exterior profile 146 with the outboard exterior profile top end 146a and the outboard exterior profile bottom end 146b shaped with the aerodynamic shaping 14. FIG. 5C further shows the inboard side 144b with no aerodynamic shaping 14 (see FIG. 2), including the inboard exterior profile 148 with the inboard exterior profile top end 148a and the inboard exterior profile bottom end 148b having no aerodynamic shaping 14 (see FIG. 2).

As shown in FIG. 5C, in this version, the structural attachment element 46, such as the pylon 48, is shaped with the aerodynamic shaping 14, to obtain an aerodynamic shaped pylon 48a, or shape optimized pylon. The aerodynamic shaping 14 of the pylon 48 may include the aerodynamic shaping 14 of, only the outboard side 144a, including the outboard exterior profile 146, only the inboard side 144b, including the inboard exterior profile 148, or both the outboard side 144a, including the outboard exterior profile 146, and the inboard side 144b, including the inboard exterior profile 148. Further, the aerodynamic shaping 14 of the pylon 48 does not have to be the same or uniform from the outboard exterior profile top end 146a, down the outboard side 144a, to the outboard exterior profile bottom end 146b, and the aerodynamic shaping 14 may be longitudinal and lateral. Further, the aerodynamic shaping 14 of the pylon 48 does not have to be the same or uniform from the inboard exterior profile top end 148a, down the inboard side 144b, to the inboard exterior profile bottom end 148b, and the aerodynamic shaping 14 may be longitudinal and lateral. The aerodynamic shaping 14 of the pylon 48 may or may not be symmetric, or a mirror image, about a centerline 150 (see FIG. 5D) of the pylon 48. As shown in FIGS. 5C-5D, the aerodynamic shaping 14 of the pylon 48 is not symmetric, and only the outboard side 144a, including the outboard exterior profile 146, is shaped with the aerodynamic shaping 14, and not the inboard side 144b, including the inboard exterior profile 148. In another version, the inboard side 144b, including the inboard exterior profile 148, may be shaped with the aerodynamic shaping 14, and the outboard side 144a, including the outboard exterior profile 146, may not be shaped. In yet another version, both the outboard side 144a, including the outboard exterior profile 146, and the inboard side 144b, including the inboard exterior profile 148, may be shaped with the aerodynamic shaping 14, as a mirror image to each other, or differently shaped from each other. For example, the outboard side 144a may be solely shaped, or differently shaped than the inboard side 144b, or the inboard side 144b may be solely shaped, or differently shaped than the outboard side 144a, due to the three-dimensional nature of the field of fluid flow 56 (see FIG. 2), such as air flow 58 (see FIG. 2), along the outboard side 144a and the inboard side 144b of the pylon 48, and through the channels 52 (see FIG. 5A). Further, the structural attachment element 46, such as the pylon 48, may be shaped with the aerodynamic shaping 14 alone, or in combination with, one or more of, the vehicle body 30, and the auxiliary body 40, as discussed above.

As further shown in FIG. 5C, the outboard exterior profile 146, including the outboard exterior profile top end 146a and the outboard exterior profile bottom end 146b comprises concave shape portions 62 alternating, in series, in opposite concavities 64a, or opposite directions, with one or more concave-up portions 66a and one or more concave-down portions 66b. As shown in FIG. 5C, the outboard exterior profile 146 of the pylon 48 shaped with the aerodynamic shaping 14 comprises a lateral contour 152, such as a pylon lateral contour 152a, with the concave shape portions 62 formed laterally with respect to the pylon 48. Similarly, the inboard exterior profile 148 of the pylon 48 shaped with the aerodynamic shaping 14 would comprise the lateral contour 152, such as the pylon lateral contour 152a, with concave shape portions 62 formed laterally with respect to the pylon 48. As shown in FIG. 5C, the concavity 64 of the lateral contour 152, such as the pylon lateral contour 152a, changes at locations 65c.

Now referring to FIG. 5D, FIG. 5D is a schematic illustration of a top view of the structural attachment element 46, such as in the form of the pylon 48, of FIG. 5C, showing the aerodynamic shaping 14 of the aerodynamic shaped pylon 48a, of FIG. 5C, as compared to no aerodynamic shaping 14 (see FIG. 2) of the unshaped pylon 48b, or non-optimized pylon, of FIG. 5B. For the aerodynamic shaped pylon 48a, FIG. 5D shows the outboard side 144a, the inboard side 144b, the leading edge 145a, and the trailing edge 145b. FIG. 5D further shows the outboard side 144a of the aerodynamic shaped pylon 48a shaped with the aerodynamic shaping 14, including the outboard exterior profile top end 146a of the outboard exterior profile 146. FIG. 5D shows an exterior profile 60a of the pylon 48 shaped with the aerodynamic shaping 14, so that the exterior profile 60 comprises one or more concave shape portions 62.

FIG. 5D further shows the inboard side 144b of the aerodynamic shaped pylon 48a with no aerodynamic shaping 14, including the inboard exterior profile top end 148a of the inboard exterior profile 148. As shown in FIG. 5D, the aerodynamic shaping 14 of the pylon 48 is not symmetric about the centerline 150 of the pylon 48. FIG. 5D further shows upstream air flow 58b that flows towards the leading edge 145a of the pylon 48 and is configured to flow over the outboard side 144a and the inboard side 144b of the pylon 48.

The vehicle configuration 12 with the aerodynamic shaping 14 may have one or more of the following structures shaped with the aerodynamic shaping 14: only the upper surface 36, or outer surface 37, of the vehicle body 30; only the lower surface 54, or first side surface 94a (see FIG. 6A), of the auxiliary body 40; only the outboard side 144a of the structural attachment element 46, such as the pylon 48; only the inboard side 144b of the structural attachment element 46, such as the pylon 48; both the outboard side 144a and the inboard side 144b of the structural attachment element 46, such as the pylon 48; a combination of the upper surface 36, or outer surface 37, of the vehicle body 30, and the lower surface 54 of the auxiliary body 40; a combination of the upper surface 36, or outer surface 37, of the vehicle body 30, and the outboard side 144a of the structural attachment element 46, such as the pylon 48; a combination of the upper surface 36, or outer surface 37, of the vehicle body 30, and the inboard side 144b of the structural attachment element 46, such as the pylon 48; a combination of the upper surface 36, or outer surface 37, of the vehicle body 30, and both the outboard side 144a and the inboard side 144b of the structural attachment element 46, such as the pylon 48; a combination of the lower surface 54 of the auxiliary body 40, and the outboard side 144a of the structural attachment element 46, such as the pylon 48; a combination of the lower surface 54 of the auxiliary body 40, and the inboard side 144b of the structural attachment element 46, such as the pylon 48; a combination of the lower surface 54 of the auxiliary body 40, and both the outboard side 144a and the inboard side 144b of the structural attachment element 46, such as the pylon 48; a combination of the upper surface 36, or outer surface 37, of the vehicle body 30, the lower surface 54 of the auxiliary body 40, and the outboard side 144a of the structural attachment element 46, such as the pylon 48; a combination of the upper surface 36, or outer surface 37, of the vehicle body 30, the lower surface 54 of the auxiliary body 40, and the inboard side 144b of the structural attachment element 46, such as the pylon 48; and, a combination of the upper surface 36, or outer surface 37, of the vehicle body 30, the lower surface 54 of the auxiliary body 40, and both the outboard side 144a of the structural attachment element 46, such as the pylon 48, and the inboard side 144b of the structural attachment element 46, such as the pylon 48.

Now referring to FIGS. 6A-6D, FIGS. 6A-6D show a vehicle 10, such as an air vehicle 10a, in the form of an exemplary launch vehicle 86, for example, a rocket-propelled vehicle 88, having a vehicle configuration 12. As shown in FIGS. 6A-6D, the vehicle configuration 12 of the launch vehicle 86, such as the rocket-propelled vehicle 88, comprises a vehicle body 30, such as a main body 92, with an outer surface 37, and auxiliary bodies 40, in the form of boosters 100, such as side-mounted boosters 100a, for example, rocket boosters 100b, mounted to the outer surface 37 of the vehicle body 30, such as the main body 92.

Now referring to FIG. 6A, FIG. 6A is a schematic illustration of a front partial view of the exemplary launch vehicle 86, in the form of the rocket-propelled vehicle 88, with an outer surface portion 37a of the vehicle body 30, such as the main body 92, having aerodynamic shaping 14 of the disclosure, to obtain an aerodynamic shaped vehicle body 30a, or shape optimized vehicle body. As shown in FIG. 6A, the vehicle body 30, such as the main body 92, comprises a first side 154a, a second side 154b, and a centerline 155. As further shown in FIG. 6A, the launch vehicle 86, in the form of the rocket-propelled vehicle 88, has a forward end 156a, an aft end 156b, and a nose cone 158 at the aft end 156b that is coupled to the main body 92.

As further shown in FIG. 6A, the launch vehicle 86, in the form of the rocket-propelled vehicle 88, comprises auxiliary bodies 40, in the form of boosters 100, such as side-mounted boosters 100a, for example, rocket boosters 100b, mounted, via structural attachment elements 46, to the outer surface 37 of the vehicle body 30, such as the main body 92. The boosters 100, such as the side-mounted boosters 100a, comprise a first booster 100c (see FIG. 6A) and a second booster 100d (see FIG. 6A), each attached to the vehicle body 30, such as the main body 92, via the structural attachment elements 46. Thus, the auxiliary bodies 40, such as the boosters 100, are in structural communication, via the structural attachment elements 46 with the vehicle body 30, such as the main body 92.

As shown in FIG. 6A, the first booster 100c and the second booster 100d each comprises side surfaces 94, including a first side surface 94a, such as the lower surface 54, or an inner side surface, facing the outer surface 37 of the vehicle body 30, and a second side surface 94b, or outer side surface. As shown in FIG. 6A, the first booster 100c and the second booster 100d each further comprises a forward end 160a, an aft end 160b, a nose portion 162 at the aft end 160b, and a body portion 164 coupled to the nose portion 162.

The boosters 100, such as the rocket boosters 100b, are designed to augment the launch vehicle's 86 takeoff thrust and payload capacity and are designed to assist in launching the launch vehicle 86 into low Earth orbit, Earth orbit, or beyond Earth orbit. As shown in FIG. 6A, the auxiliary bodies 40, such as the boosters 100, in the form of side-mounted boosters 100a, are each positioned, or offset, a distance 50 (see FIG. 2), from the vehicle body 30, such as the main body 92, to form a channel 52 (see also FIGS. 6B-6D) between the first side surface 94a, or inner side surface, (or lower surface 54), of each auxiliary body 40, such as the booster 100, and the outer surface 37 of the vehicle body 30, such as the main body 92. The first side surface 94a, or inner side surface (or lower surface 54), of each auxiliary body 40, such as the booster 100, is positioned opposite to, and faces, the outer surface 37, or exterior surface, of the vehicle body 30, such as the main body 92.

Now referring to FIG. 6B, FIG. 6B is a schematic illustration of a close-up partial front view of the launch vehicle 86, in the form of a rocket-propelled vehicle 88, of box 6B of FIG. 6A, showing the outer surface portion 37a of the outer surface 37 of the vehicle body 30, such as the main body 92, having the aerodynamic shaping 14. The aerodynamic shaping 14 of the outer surface portion 37a of the outer surface 37 of the vehicle body 30, such as the main body 92, optimizes and improves the channel flow 53 (see FIG. 2) between the vehicle body 30, such as the main body 92, which is in close proximity to the auxiliary bodies 40, such as the boosters 100, for example, the rocket boosters 100b, to result in reduced drag 16a (see FIG. 2), such as reduced interference drag 18a (see FIG. 2).

As shown in FIG. 6B, the vehicle configuration 12, such as the aerodynamic shaped vehicle configuration 12e, comprises the exterior profile 60 of the outer surface portion 37a of the outer surface 37 of the vehicle body 30, such as the main body 92, shaped with the aerodynamic shaping 14, to have concave shape portions 62 alternating, in series, in opposite concavities 64a, or opposite directions, with the concave shape portions 62 comprising one or more concave-up portions 66a, and one or more concave-down portions 66b. As shown in FIG. 6B, the exterior profile 60 shaped with the aerodynamic shaping 14 comprises a longitudinal contour 68 formed longitudinally in a longitudinal direction. As shown in FIG. 6B, the concavity 64 of each longitudinal contour 68 comprises a longitudinal concavity 64b that changes in one or more locations 65a. The aerodynamic shaping 14 provides an aerodynamic shaped contour 80 (see FIG. 6B) having the exterior profile 60 and a three-dimensional (3D) shape 82 (see FIG. 2).

Although FIG. 6B only shows the first side 154a of the main body 92 with the aerodynamic shaping 14, the second side 154b (see FIG. 6A) of the main body 92 is also preferably shaped with the aerodynamic shaping 14 to mirror the aerodynamic shaping 14 and the aerodynamic shaped contour 80 of the first side 154a. Both the first side 154a and the second side 154b of the main body 92, on each side of the centerline 155 (see FIG. 6A) of the main body 92, are similarly shaped and mirror each other with the aerodynamic shaping 14.

Now referring to FIG. 6C, FIG. 6C is a schematic illustration of a close-up partial front view of the launch vehicle 86, in the form of a rocket-propelled vehicle 88, of FIG. 6B, showing aerodynamic shaping 14 for both the outer surface portion 37a of the outer surface 37 of the vehicle body 30 and a first side surface portion 94c of the first side surface 94a of the auxiliary body 40, in the form of the booster 100, such as the side-mounted booster 100a, for example, the first booster 100c. FIG. 6C shows an aerodynamic shaped vehicle body 30a and an aerodynamic shaped auxiliary body 40a. Although FIG. 6C only shows the first side 154a of the main body 92 with the aerodynamic shaping 14, the second side 154b (see FIG. 6A) of the main body 92 is preferably also shaped with the aerodynamic shaping 14 to mirror the aerodynamic shaping 14 and the aerodynamic shaped contour 80 of the first side 154a. Further, although FIG. 6C only shows the first side surface 94a of the first booster 100c with the aerodynamic shaping 14, the first side surface 94a (see FIG. 6A) of the second booster 100d (see FIG. 6A) is also preferably shaped with the aerodynamic shaping 14 to mirror the aerodynamic shaping 14 and the aerodynamic shaped contour 80 of the first side surface 94a of the first booster 100c. The aerodynamic shaping 14 of the outer surface portion 37a of the outer surface 37 of the vehicle body 30, such as the main body 92, and the aerodynamic shaping 14 of the first side surface 94a, of the auxiliary bodies 40, such as the boosters 100, optimize and improve the channel flow 53 (see FIG. 2) between the vehicle body 30, such as the main body 92, and the auxiliary bodies 40, such as the boosters 100, for example, the rocket boosters 100b, to result in reduced drag 16a (see FIG. 2), such as reduced interference drag 18a (see FIG. 2).

As shown in FIG. 6C, the vehicle configuration 12, such as an aerodynamic shaped vehicle configuration 12f, comprises the exterior profile 60 of the outer surface portion 37a of the outer surface 37 of the vehicle body 30, such as the main body 92, shaped with the aerodynamic shaping 14, to form the longitudinal contour 68 with the concave shape portions 62 alternating, in series, in opposite concavities 64a, or opposite directions, and the concave shape portions 62 comprising concave-up portions 66a, and concave-down portions 66b. FIG. 6C further shows the exterior profile 60 of the first side surface 94a of the auxiliary body 40, such as the booster 100, for example, the first booster 100c, shaped with the aerodynamic shaping 14, to form the longitudinal contour 68 with one concave shape portion 62 comprising a concave-down portion 66b. The exterior profile 60 of the vehicle body 30, such as the main body 92, faces opposite the exterior profile 60 of the auxiliary body 40, such as the first booster 100c, and is a substantially similar length but the exterior profile 60 of the vehicle body 30, such as the main body 92, is a different shape with a greater number of concave shape portions 62 than the exterior profile 60 of the auxiliary body 40, such as the first booster 100c.

Now referring to FIG. 6D, FIG. 6D is a schematic illustration of a close-up partial front view of the launch vehicle 86, in the form of a rocket-propelled vehicle 88, of FIG. 6B, showing only the first side surface portion 94c of the first side surface 94a of the auxiliary body 40, in the form of the booster 100, such as the side-mounted booster 100a, for example, the first booster 100c, having the aerodynamic shaping 14 of the disclosure, and showing the outer surface 37 of the vehicle body 30, such as the main body 92, with no aerodynamic shaping 14 (see FIG. 2). FIG. 6D shows an aerodynamic shaped auxiliary body 40a.

Although FIG. 6D only shows the first side surface portion 94c of the first side surface 94a of the first booster 100c having the aerodynamic shaping 14, the first side surface 94a (see FIG. 6A) of the second booster 100d (see FIG. 6A) is also preferably shaped with the aerodynamic shaping 14 to mirror the aerodynamic shaping 14 and the aerodynamic shaped contour 80 of the first side surface 94a of the first booster 100c. The aerodynamic shaping 14 of the first side surface 94a, of the auxiliary bodies 40, such as the boosters 100, optimizes and improves the channel flow 53 (see FIG. 2) between the vehicle body 30, such as the main body 92, and the auxiliary bodies 40, such as the boosters 100, for example, the rocket boosters 100b, to result in reduced drag 16a (see FIG. 2), such as reduced interference drag 18a (see FIG. 2), and/or reduced likelihood of structural fatigue. As shown in FIG. 6D, the vehicle configuration 12, such as an aerodynamic shaped vehicle configuration 12g, comprises the exterior profile 60 of the first side surface portion 94c of the first side surface 94a of the auxiliary body 40, such as the booster 100, for example, the first booster 100c, shaped with the aerodynamic shaping 14, to form the longitudinal contour 68 with one concave shape portion 62 comprising a concave-down portion 66b.

Now referring to FIGS. 7A-7B and 8A-8B, FIGS. 7A-7B and 8A-8B show pressure coefficient ($C_P$) results 166 (see FIGS. 7A, 8A) and Mach number contour results 168 (see FIGS. 7B, 8B) of flow simulations, using a CFD (computational fluid dynamics) program, and performed on three-dimensional (3D) models 106, such as modeled in a CAD (computer-aided design) software program, including an original non-optimized three-dimensional (3D) model 106a (see FIGS. 7A-7B) and a shape optimized three-dimensional (3D) model 106b (see FIGS. 8A-8B), optimized with shape optimization 109 (see FIG. 2) using an optimization approach 108 (see FIG. 2). As shown in FIGS. 7A-7B and 8A-8B, the 3D model 106 is an auxiliary body 40, such as a nacelle 42, for example, an engine nacelle 42a, mounted on a vehicle body 30, such as a fuselage 32. For the shape optimized 3D model 106b, the upper surface 36 of the vehicle body 30, such as the fuselage 32, was optimized with the shape optimization 109 and aerodynamic shaping 14 of the disclosure. As used herein, "pressure coefficient ($C_P$)" means a dimensionless number which describes the relative pressures throughout a flow field in fluid dynamics with respect to ambient, static, or dynamic pressure.

Now referring to FIG. 7A, FIG. 7A is an illustration of a back perspective view of the 3D model 106, such as the original non-optimized 3D model 106a, showing pressure coefficient ($C_P$) results 166, such as pressure coefficient ($C_P$) results 166a, of a flow simulation performed on the original non-optimized 3D model 106a. The original non-optimized 3D model 106a was formed with a CAD (computer-aided design) software program, and the flow simulation was performed using a CFD (computational fluid dynamics) program. The flow simulation was carried out at transonic speed 24 (see FIG. 2), or velocity, at a transonic cruise Mach number of 0.85.

FIG. 7A shows pressure coefficient ($C_P$) results 166, such as pressure coefficient ($C_P$) results 166a, of pressure coefficient ($C_P$) regions 170, or contours, on the original non-optimized 3D model 106a. As shown in FIG. 7A, the geometry of the original non-optimized 3D model 106a includes the auxiliary body 40, such as the nacelle 42, for example, the engine nacelle 42a, housing an engine 44, and mounted on the vehicle body 30, such as the fuselage 32, and suspended above the vehicle body 30. FIG. 7A further shows the channel 52 between the lower surface 54 of the auxiliary body 40, such as the nacelle 42, and the upper surface 36 of the vehicle body 30, such as the fuselage 32.

FIG. 7A shows the pressure coefficient ($C_P$) regions 170 of pressure coefficient ($C_P$) 172, such as the surface pressure coefficient ($C_P$), on the original non-optimized 3D model 106a, where the pressure coefficient ($C_P$) regions 170 correspond to a legend 174 of the pressure coefficient ($C_P$) regions 170 at various pressure coefficient ($C_P$) ranges 176. As shown in FIG. 7A, a first pressure coefficient ($C_P$) region 170a corresponds to a first pressure coefficient ($C_P$) range 176a between 0.50 $C_P$ and 0.25 $C_P$; a second pressure coefficient ($C_P$) region 170b corresponds to a second pressure coefficient ($C_P$) range 176b between 0.25 $C_P$ and 0.00 $C_P$; a third pressure coefficient ($C_P$) region 170c corresponds to a third pressure coefficient ($C_P$) range 176c between 0.00 $C_P$ and −0.25 $C_P$; and a fourth pressure coefficient ($C_P$) region 170d corresponds to a fourth pressure coefficient ($C_P$) range 176d between −0.25 $C_P$ and −0.50 $C_P$. As shown in FIG. 7A, an upper surface portion 36e of the upper surface 36 of the vehicle body 30, such as the fuselage 32, and the leading edge 43a of the nacelle 42 and a cowling portion 177 of the nacelle 42, and a portion 178 of the vehicle body 30, such as the fuselage 32, all showed a fourth pressure coefficient ($C_P$) region 170d corresponding to the fourth pressure coefficient ($C_P$) range 176d between −0.25 $C_P$ and −0.50 $C_P$, which indicated a large amount of drag 16 (see FIG. 2), such as interference drag 18 (see FIG. 2) in those regions, or contours.

Now referring to FIG. 7B, FIG. 7B is an illustration of a cross-sectional side view through a symmetry plane 180a, such as a nacelle symmetry plane 181a, of the three-dimensional (3D) model 106, such as the original non-optimized three-dimensional (3D) model 106a, of FIG. 7A, showing Mach number contour results 168, such as Mach number contour results 168a, of the flow simulation performed on the original non-optimized 3D model 106a, and carried out at transonic speed 24 (see FIG. 2), or velocity.

FIG. 7B shows Mach number contour results 168, such as Mach number contour results 168a, of Mach number contour regions 182, on the original non-optimized 3D model 106a. As shown in FIG. 7B, the geometry of the original non-optimized 3D model 106a includes the auxiliary body 40, such as the nacelle 42, for example, the engine nacelle 42a, having the leading edge 43a and the trailing edge 43b, an inlet 184, and housing the engine 44, and mounted on the vehicle body 30, such as the fuselage 32, and suspended above the vehicle body 30. FIG. 7B further shows the channel 52 between the lower surface 54 of the auxiliary body 40, such as the nacelle 42, and the upper surface 36 of the vehicle body 30, such as the fuselage 32.

FIG. 7B shows the Mach number contour regions 182 of the speed, or velocity, of the fluid flow 56 (see FIG. 2), or air flow 58 (see FIG. 2), over the original non-optimized 3D model 106a, where the Mach number contour regions 182 correspond to a legend 186 of the Mach number contour regions 182 at various Mach number ranges 188. As shown in FIG. 7B, a first Mach number contour region 182a corresponds to a first Mach number range 188a between 0.1 and 0.4; a second Mach number contour region 182b corresponds to a second Mach number range 188b between 0.4 and 0.7; a third Mach number contour region 182c corresponds to a third Mach number range 188c between 0.7 and 1.0; and a fourth Mach number contour region 182d corresponds to a fourth Mach number range 188d between 1.0 and 1.3.

FIG. 7B shows fourth Mach number contour regions 182d corresponding to the fourth Mach number range 188d between 1.0 and 1.3, at a forward area 190 above the inlet 184 of the auxiliary body 40, such as the nacelle 42, at an aft area 192 above the auxiliary body 40, such as the nacelle 42, and in a forward channel area 194 in the channel 52 between the auxiliary body 40, such as the nacelle 42, and the vehicle body 30, such as the fuselage 32, which indicated the presence of shock waves 122 (see FIG. 2), such as strong shock waves 122a (see FIG. 2), occurring at those areas. The formation of the shock waves 122, such as the strong shock waves 122a, caused an increase in drag 16 (see FIG. 2), such as interference drag 18 (see FIG. 2), and in particular, an increased compressibility drag 112 (see FIG. 2). The drag 16 incurred in the transonic region due to formation of the shock wave 122, and separation of the air flow 58 is referred to as "compressibility drag." When speed exceeds the speed of sound critical Mach number of 1.0 by about 10 percent, compressibility drag increases sharply.

Now referring to FIG. 8A, FIG. 8A is an illustration of a back perspective view of the 3D model 106, such as the shape optimized three-dimensional (3D) model 106b, showing pressure coefficient ($C_P$) results 166, such as pressure coefficient ($C_P$) results 166b, of a flow simulation after shape optimization 109 (see FIG. 2) and aerodynamic shaping 14 (see FIG. 2). The shape optimized 3D model 106b was formed with a mesh morphing software program, and was shape optimized, so that the upper surface 36 of the vehicle body 30, such as the fuselage 32, across the upper surface portion 36e on each side of the channel 52 formed between the lower surface 54 of the auxiliary body 40, such as the nacelle 42, and the upper surface portion 36e of the upper surface 36 of the vehicle body 30, such as the fuselage 32, was shaped with aerodynamic shaping 14, to obtain the aerodynamic shaped vehicle body 30a. The aerodynamic shaping 14 including shaping the exterior profiles 60 comprising longitudinal contours 68 and lateral contours 70 with the shape optimization 109 (see FIG. 2).

Once the shape optimized 3D model 106b was achieved through CFD (computational fluid dynamics) flow simulations combined with the mesh morphing software program (i.e., CFD based optimization), the performance of the shape optimized 3D model 106b was noted. The flow simulations were carried out at transonic speed 24 (see FIG. 2), or velocity, at a transonic cruise Mach number of 0.85.

FIG. 8A shows pressure coefficient ($C_P$) results 166, such as pressure coefficient ($C_P$) results 166b, of pressure coefficient ($C_P$) regions 170, or contours, on the shape optimized 3D model 106b. As shown in FIG. 8A, the geometry of the shape optimized 3D model 106b includes the auxiliary body 40, such as the nacelle 42, for example, the engine nacelle 42a, housing the engine 44, and mounted on the vehicle body 30, such as the fuselage 32, and suspended above the vehicle body 30.

FIG. 8A shows the pressure coefficient ($C_P$) regions 170 of pressure coefficient ($C_P$) 172, such as surface pressure coefficient ($C_P$), on the shape optimized 3D model 106b, where the pressure coefficient ($C_P$) regions 170 correspond to the legend 174 of the pressure coefficient ($C_P$) regions 170 at various pressure coefficient ($C_P$) ranges 176. As shown in FIG. 8A, the first pressure coefficient ($C_P$) region 170a corresponds to the first pressure coefficient ($C_P$) range 176a between 0.50 $C_P$ and 0.25 $C_P$; the second pressure coefficient ($C_P$) region 170b corresponds to the second pressure coefficient ($C_P$) range 176b between 0.25 $C_P$ and 0.00 $C_P$; the third pressure coefficient ($C_P$) region 170c corresponds to the third pressure coefficient ($C_P$) range 176c between 0.00 $C_P$ and −0.25 $C_P$; and the fourth pressure coefficient ($C_P$) region 170d corresponds to the fourth pressure coefficient ($C_P$) range 176d between −0.25 $C_P$ and −0.50 $C_P$.

As shown in FIG. 8A, the upper surface portion 36e of the upper surface 36 of the vehicle body 30, such as the fuselage 32, no longer had the fourth pressure coefficient ($C_P$) region 170d corresponding to the fourth pressure coefficient ($C_P$) range 176d between −0.25 $C_P$ and −0.50 $C_P$, as compared to the original non-optimized 3D model 106a (see FIG. 7A), and now had mainly the second pressure coefficient ($C_P$) region 170b corresponding to the second pressure coefficient ($C_P$) range 176b between 0.25 $C_P$ and 0.00 $C_P$, with only a small portion of the third pressure coefficient ($C_P$) region 170c corresponding to the third pressure coefficient ($C_P$) range 176c between 0.00 $C_P$ and −0.25 $C_P$. In addition, as shown in FIG. 8A, the cowling portion 177 of the nacelle 42 no longer had the fourth pressure coefficient ($C_P$) region 170d corresponding to the fourth pressure coefficient ($C_P$) range 176d between −0.25 $C_P$ and −0.50 $C_P$, as compared to the original non-optimized 3D model 106a (see FIG. 7A), and now had mainly the second pressure coefficient ($C_P$) region 170b corresponding to the second pressure coefficient ($C_P$) range 176b between 0.25 $C_P$ and 0.00 $C_P$, and only a small portion of the leading edge 43a of the nacelle 42 still had the fourth pressure coefficient ($C_P$) region 170d corresponding to the fourth pressure coefficient ($C_P$) range 176d between −0.25 $C_P$ and −0.50 $C_P$. In addition, as shown in FIG. 8A, the portion 178 of the vehicle body 30, such as the fuselage 32, no longer had the fourth pressure coefficient ($C_P$) region 170d corresponding to the fourth pressure coefficient ($C_P$) range 176d between −0.25 $C_P$ and −0.50 $C_P$, as compared to the original non-optimized 3D model 106a (see FIG. 7A), and now had mainly the third pressure coefficient ($C_P$) region 170c corresponding to the third pressure coefficient ($C_P$) range 176c between 0.00 $C_P$ and −0.25 $C_P$.

The decrease in the fourth pressure coefficient ($C_P$) regions 170d corresponding to the fourth pressure coefficient ($C_P$) range 176d in the shape optimized 3D model 106b indicated a reduced drag 16a, such as a reduced interference drag 18a, in those regions, or contours, as compared to the same regions in the original non-optimized 3D model 106a (see FIG. 7A). In particular, the pressure coefficients ($C_P$) 172, such as the surface pressure coefficients ($C_P$), from the upper surface portion 36e and the upper surface 36, where the shape optimization 109 (see FIG. 2) and aerodynamic shaping 14 occurred with the shape optimized 3D model 106b, showed a reduced streamwise pressure gradient after optimization and showed the reduced drag 16a (see FIG. 2), such as the reduced interference drag 18a (see FIG. 2), and also showed improved pitching moment (i.e, torque produced by an aerodynamic force on the vehicle if that aerodynamic force is considered to be applied, not at a center of pressure, but at an aerodynamic center of the vehicle).

Figure 8B:
FIG. 8B is an illustration of a cross-sectional side view through a symmetry plane of the shape optimized three-dimensional (3D) model of FIG. 8A, showing Mach number contour results after shape optimization.

Now referring to FIG. 8B, FIG. 8B is an illustration of a cross-sectional side view through a symmetry plane 180b, such as a nacelle symmetry plane 181b, of a three-dimensional (3D) model 106, such as a the shape optimized three-dimensional (3D) model 106b, of FIG. 8A, showing Mach number contour results 168, such as Mach number contour results 168b, of the flow simulation after shape optimization 109 (see FIG. 2) and the aerodynamic shaping 14 (see FIG. 2) of the upper surface portion 36e and the upper surface 36 of the vehicle body 30, such as the fuselage 32, and carried out at transonic speed 24 (see FIG. 2), or velocity.

FIG. 8B shows Mach number contour results 168, such as Mach number contour results 168a, of Mach number contour regions 182, on the shape optimized 3D model 106b. As shown in FIG. 7B, the geometry of the shape optimized 3D model 106b includes the auxiliary body 40, such as the nacelle 42, for example, the engine nacelle 42a, having the leading edge 43a and the trailing edge 43b, the inlet 184, and housing the engine 44, and mounted on the vehicle body 30, such as the aerodynamic shaped vehicle body 30a, in the form of fuselage 32. FIG. 8B further shows the channel 52 between the lower surface 54 of the auxiliary body 40, such as the nacelle 42, and the upper surface 36 of the vehicle body 30, such as the fuselage 32.

FIG. 8B shows the Mach number contour regions 182 of the speed, or velocity, of fluid flow 56 (see FIG. 2), or air flow 58 (see FIG. 2), over the shape optimized 3D model 106b, where the Mach number contour regions 182 correspond to the legend 186 of the Mach number contour regions 182 at various Mach number ranges 188. As shown in FIG. 8B, the first Mach number contour region 182a corresponds to the first Mach number range 188a between 0.1 and 0.4; the second Mach number contour region 182b corresponds to the second Mach number range 188b between 0.4 and 0.7; the third Mach number contour region 182c corresponds to the third Mach number range 188c between 0.7 and 1.0; and the fourth Mach number contour region 182d corresponds to the fourth Mach number range 188d between 1.0 and 1.3.

As shown in FIG. 8B, the forward channel area 194 in the channel 52 no longer had the fourth Mach number contour region 182d corresponding to the fourth Mach number range 188d between 1.0 and 1.3, as compared to the original non-optimized 3D model 106a (see FIG. 7A), and now had the third Mach number contour region 182c corresponding to the third Mach number range 188c between 0.7 and 1.0. In addition, as shown in FIG. 8B, the forward area 190 above the inlet 184 of the auxiliary body 40, such as the nacelle 42, now had mainly the second Mach number contour region 182b corresponding to the second Mach number range 188b between 0.4 and 0.7, and had some of the third Mach number contour region 182c corresponding to the third Mach number range 188c between 0.7 and 1.0, and had a reduced fourth Mach number contour region 182d corresponding to the fourth Mach number range 188d between 1.0 and 1.3. The reduced amount of fourth Mach number contour regions 182d corresponding to the fourth Mach number range 188d between 1.0 and 1.3 in the shape optimized 3D model 106b indicated reduced shock wave strength 124a (see FIG. 2), and reduced drag 16a (see FIG. 2), such as reduced interference drag 18a (see FIG. 2), and in particular, reduced compressibility drag 112a (see FIG. 2). In particular, the stronger and larger initial shock waves 122 exhibited in the channel 52 in the original non-optimized 3D model 106a, of FIG. 7B, were diminished into one or two smaller shock waves 122 in the shape optimized 3D model 106b (see FIG. 8B).

FIG. 8B further shows a vehicle body aft surface 30e of the exterior profile 60 that was shaped with the aerodynamic shaping 14 (see FIG. 2) and raised in height and curved upwardly, as compared to the exterior profile 60 of the vehicle body 30 in FIG. 7B, to reduce the area or region aft of the auxiliary body 40, such as the nacelle 42. Shaping of the vehicle body aft surface 30e located aft of the auxiliary body 40, such as the nacelle 42, decreased the aft recirculation 126 (see FIG. 11A) and aft recirculation zones 126a (see FIG. 11A) of separated air flow 58f (see FIG. 11A) formed in the area or region aft of the auxiliary body 40, such as the nacelle 42, and resulted in a reduced aft recirculation 126b (see FIG. 2), or reduced the potential for formation of the aft recirculation 126 and aft recirculation zones 126a. The desired height or distance that the vehicle body aft surface 30e of the exterior profile 60 of the vehicle body 30 is raised upward may depend on the velocity and shape of the exhaust air flow 58c (see FIGS. 2, 11B), or exhaust plume, or exhaust stream, that flows from the channel 52 and that flows aft of the auxiliary body 40, such as the nacelle 42, and may also depend on other factors, such as the distance from the raised height and the vehicle trailing edge and the height distribution of the surface that connects them.

Figure 9:
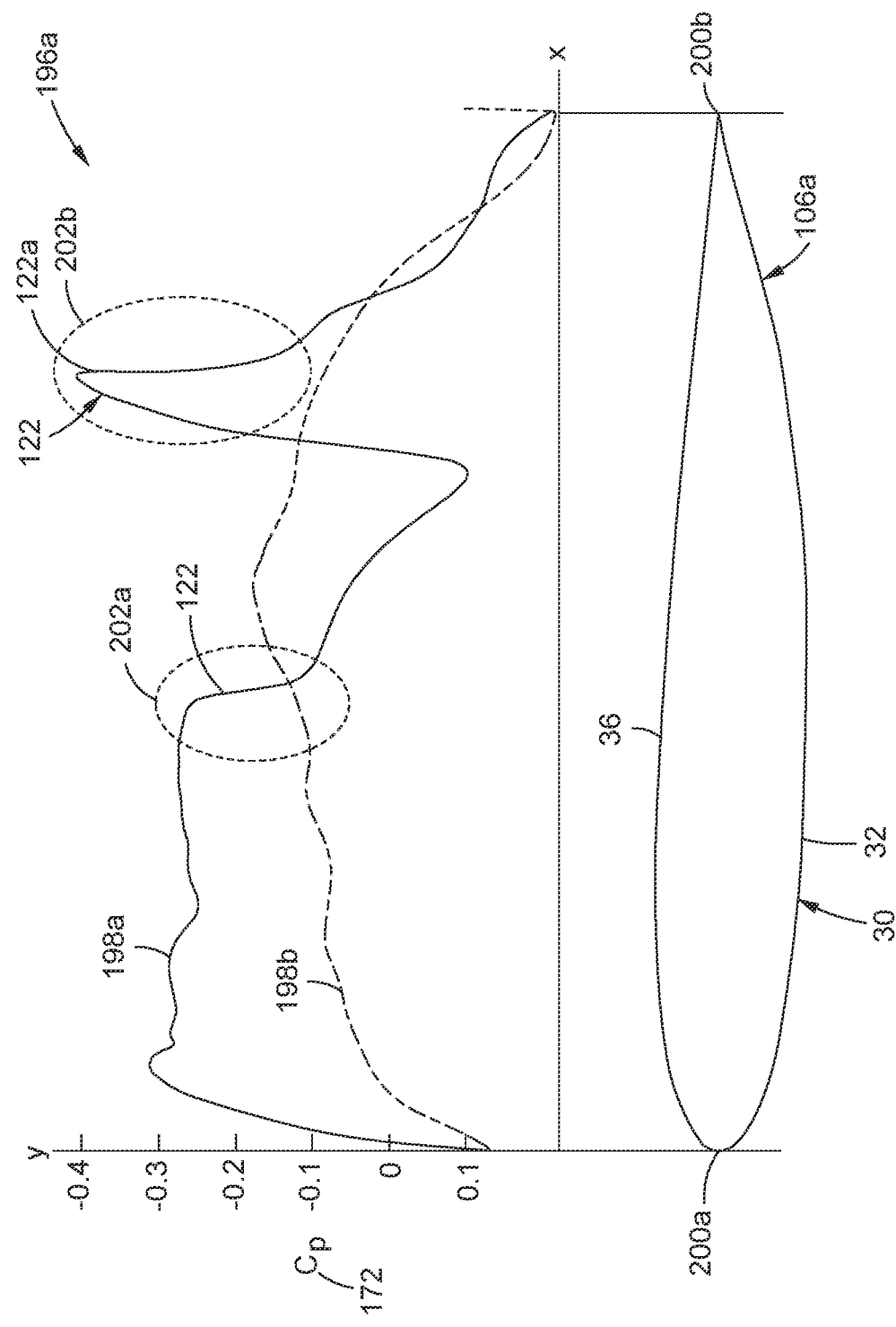
FIG. 9 is an illustration of a pressure distribution graph showing pressure distribution slice plots along a vehicle body of the original non-optimized three-dimensional (3D) model of FIG. 7B.

Now referring to FIG. 9, FIG. 9 is an illustration of a pressure distribution graph 196a showing a first pressure distribution slice plot 198a and a second pressure distribution slice plot 198b, along the vehicle body 30 on the symmetry plane 180a (see FIG. 7B), such as the nacelle symmetry plane 181a (see FIG. 7B), of the original non-optimized three-dimensional (3D) model 106a (see also FIG. 7B). FIG. 9 shows the pressure coefficient ($C_P$) 172 along the y-axis, and shows a cross-section of the vehicle body 30, such as the fuselage 32, of the original non-optimized 3D model 106a, along the x-axis. As shown in FIG. 9, the vehicle body 30, such as the fuselage 32, has a leading edge 200a and a trailing edge 200b. The first pressure distribution slice plot 198a represents pressure distribution slices taken along the upper surface 36 (see also FIG. 7B) of the vehicle body 30, such as the fuselage 32, of the original non-optimized 3D model 106a. The second pressure distribution slice plot 198b represents pressure distribution slices taken along the lower surface 54 (see FIG. 7B) of the auxiliary body 40 (see FIG. 7B), such as the nacelle 42 (see FIG. 7B), of the original non-optimized 3D model 106a.

FIG. 9 further shows a first region 202a and a second region 202b on the pressure distribution graph 196a, indicating the presence of shock waves 122 (see FIGS. 2, 7B). The first region 202a indicated a shock wave 122 occurred upstream of the channel 52 (see FIG. 7B) between the vehicle body 30 and the auxiliary body 40 of the original non-optimized 3D model 106a. The second region 202b indicated a shock wave 122, such as a strong shock wave 122a (see also FIG. 7B), occurred in the channel 52 between the vehicle body 30 and the auxiliary body 40 of the original non-optimized 3D model 106a. The shock waves 122 resulted in drag 16 (see FIG. 2), such as interference drag 18 (see FIG. 2), and in particular, resulted in an increase in compressibility drag 112 (see FIG. 2). As indicated by the second region 202b, in particular, the pressure coefficient ($C_P$) 172 of the second pressure distribution slice plot 198b became much more negative to −0.4 pressure coefficient ($C_P$) 172, and created the shock wave 122, such as the strong shock wave 122a, which was a very large shock wave.

Figure 10:
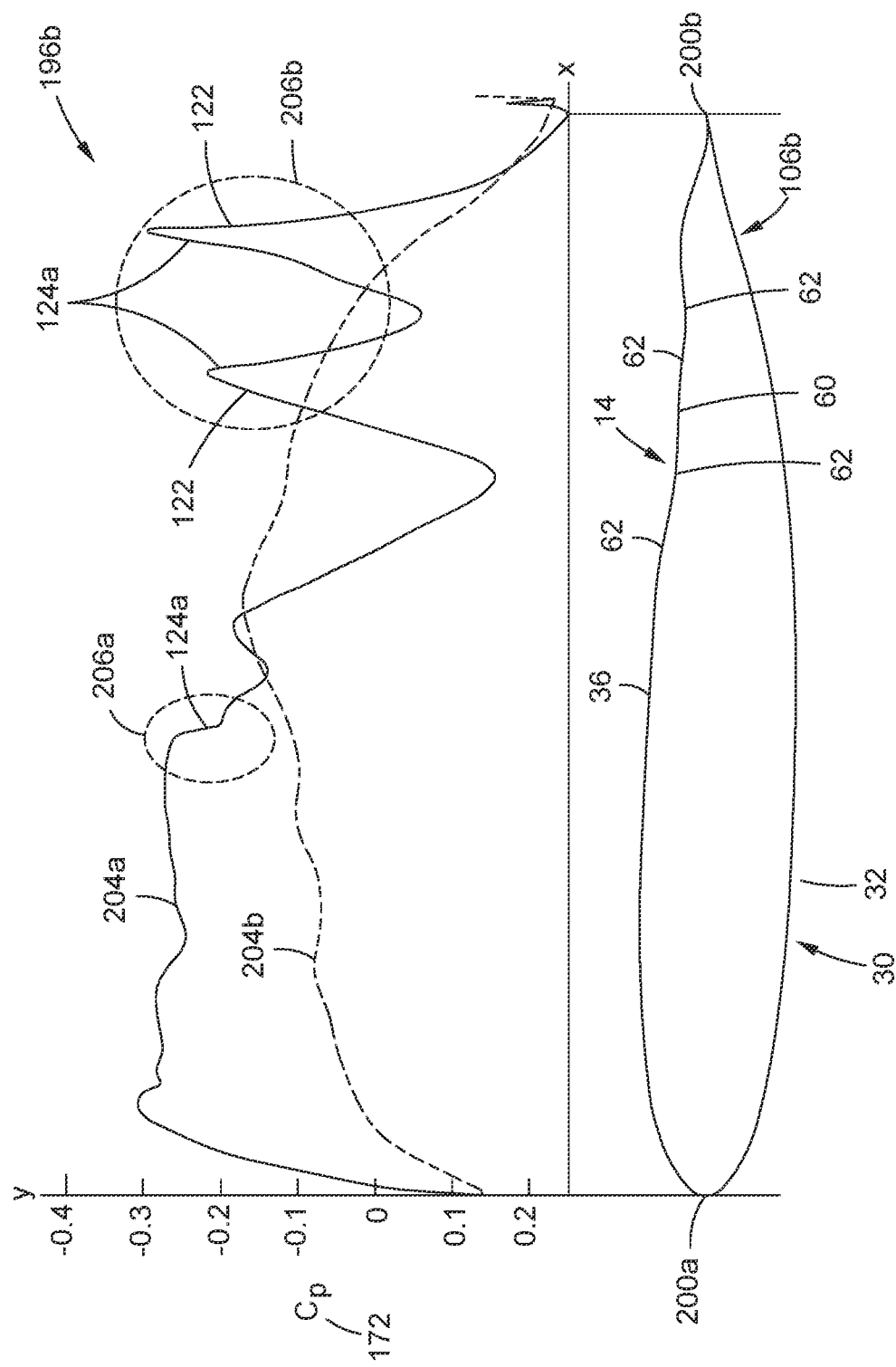
FIG. 10 is an illustration of a pressure distribution graph showing pressure distribution slice plots along a vehicle body of the shape optimized three-dimensional (3D) model of FIG. 8B.

Now referring to FIG. 10, FIG. 10 is an illustration of a pressure distribution graph 196b showing a first pressure distribution slice plot 204a and a second pressure distribution slice plot 204b, along the vehicle body 30 on the symmetry plane 180b (see FIG. 8B), such as the nacelle symmetry plane 181b (see FIG. 8B), of the shape optimized three-dimensional (3D) model 106b (see also FIG. 8B). FIG. 10 shows the pressure coefficient ($C_P$) 172 along the y-axis, and shows a cross-section of the vehicle body 30, such as the fuselage 32, of the shape optimized 3D model 106b, along the x-axis. As shown in FIG. 10, the vehicle body 30, such as the fuselage 32, has the leading edge 200a, the trailing edge 200b, and the aerodynamic shaping 14 of the exterior profile 60 with the concave shape portions 62. The first pressure distribution slice plot 204a represents pressure distribution slices taken along the upper surface 36 (see also FIG. 8B) of the vehicle body 30, such as the fuselage 32, of the shape optimized 3D model 106b. The second pressure distribution slice plot 204b represents pressure distribution slices taken along the lower surface 54 (see FIG. 8B) of the auxiliary body 40 (see FIG. 8B), such as the nacelle 42 (see FIG. 8B), of the shape optimized 3D model 106b.

FIG. 10 further shows a first region 206a and a second region 206b on the pressure distribution graph 196b, indicating a reduced shock wave strength 124a, and the shock waves 122 (see FIG. 9) were made weaker with the shape optimization 109 (see FIG. 2) of the upper surface 36 of the vehicle body 30, along the channel 52 (see FIG. 8B) between the vehicle body 30 and the auxiliary body 40, such as the nacelle 42. As indicated by the first region 206a, shown in FIG. 10, the reduced shock wave strength 124a indicated that the shock wave 122 (see FIG. 9) that occurred upstream of the channel 52 (see FIG. 8B) was made weaker by improving the channel flow 53 (see FIG. 2) with the shape optimized 3D model 106b. As indicated by the second region 206b, shown in FIG. 10, the reduced shock wave strength 124a indicated that the shock wave 122 (see FIG. 9), such as the strong shock wave 122a (see FIG. 9), that occurred in the channel 52 (see FIG. 8B) between the vehicle body 30 and the auxiliary body 40, was diminished into two smaller shock waves 122 with the shape optimized 3D model 106b. This example had two smaller shock waves 122, but in other cases, the shape optimization 109 may lead to zero shock waves, one weaker shock wave, or more than two even weaker shock waves. The shape optimization 109 of the shape optimized 3D model 106b provided reduced shock wave strength 124a (see FIG. 10), and reduced drag 16a (see FIG. 2), such as reduced interference drag 18a (see FIG. 2), and in particular, reduced compressibility drag 112a (see FIG. 2).

Figure 11A:
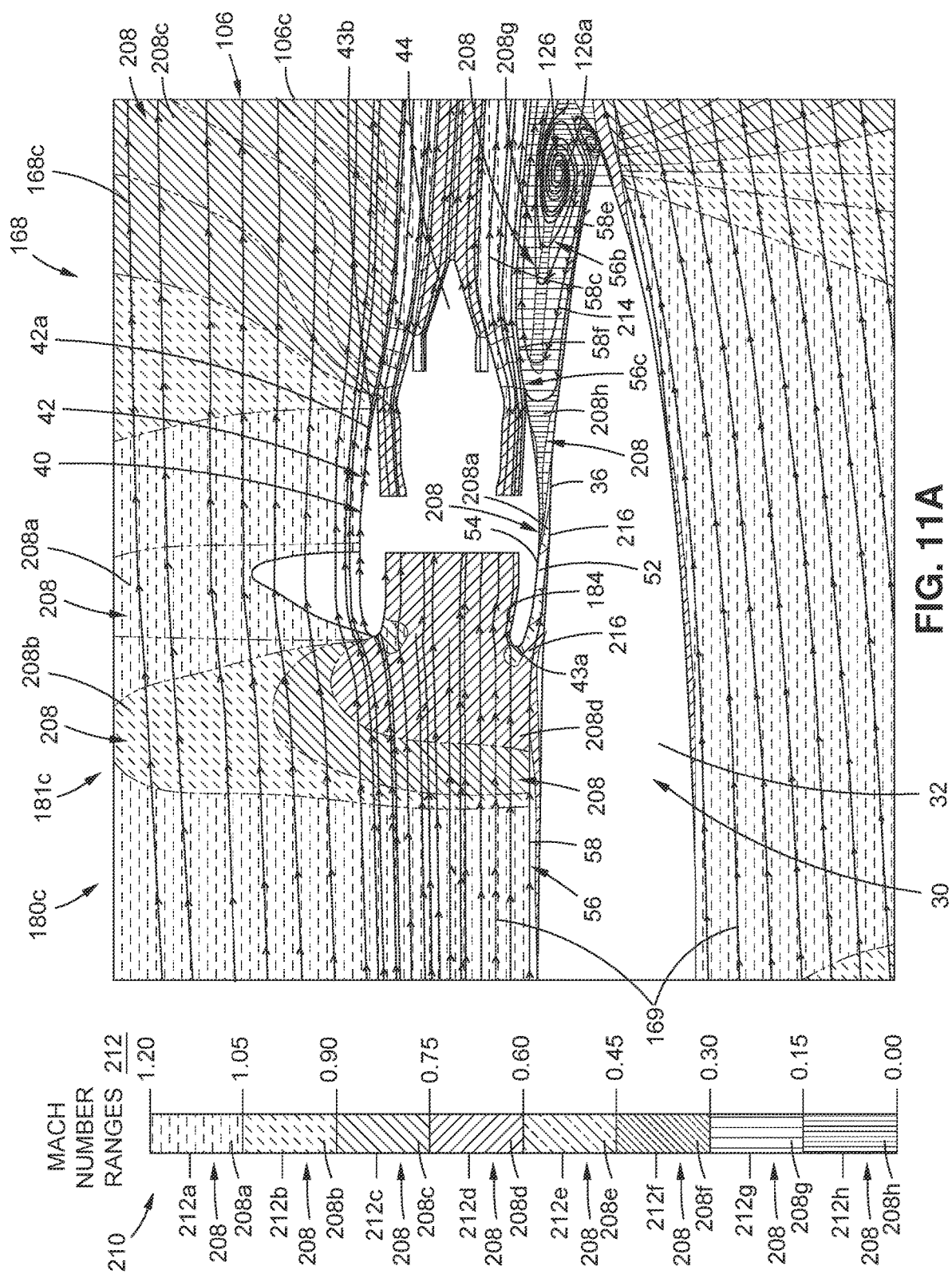
FIG. 11A is an illustration of a cross-sectional side view through a symmetry plane of an original non-optimized three-dimensional (3D) model, showing Mach number contour results and streamlines of a flow simulation.

Now referring to FIG. 11A, FIG. 11A is an illustration of a cross-sectional side view through a symmetry plane 180c, such as a nacelle symmetry plane 181c, of a three-dimensional (3D) model 106, such as an original non-optimized three-dimensional (3D) model 106c, showing Mach number contour results 168, such as Mach number contour results 168c, and streamlines 169 of a flow simulation performed on the original non-optimized 3D model 106c, and carried out at transonic speed 24 (see FIG. 2), or velocity.

FIG. 11A shows Mach number contour results 168, such as Mach number contour results 168c, of Mach number contour regions 208, on the original non-optimized 3D model 106c. As shown in FIG. 11A, the geometry of the original non-optimized 3D model 106c includes the auxiliary body 40, such as the nacelle 42, for example, the engine nacelle 42a, having the leading edge 43a and the trailing edge 43b, the inlet 184, and housing the engine 44, and suspended above the vehicle body 30, such as the fuselage 32. FIG. 11A further shows the channel 52 between the lower surface 54 of the auxiliary body 40, such as the nacelle 42, and the upper surface 36 of the vehicle body 30, such as the fuselage 32.

FIG. 11A shows the Mach number contour regions 208 of the speed or velocity of fluid flow 56, or air flow 58, over the original non-optimized 3D model 106c, where the Mach number contour regions 208 correspond to a legend 210 of the Mach number contour regions 208 at various Mach number ranges 212. As shown in FIG. 11A, a first Mach number contour region 208a corresponds to a first Mach number range 212a between 1.20 and 1.05; a second Mach number contour region 208b corresponds to a second Mach number range 212b between 1.05 and 0.90 a third Mach number contour region 208c corresponds to a third Mach number range 212c between 0.90 and 0.75; a fourth Mach number contour region 208d corresponds to a fourth Mach number range 212d between 0.75 and 0.60; a fifth Mach number contour region 208e corresponds to a fifth Mach number range 212e between 0.60 and 0.45; a sixth Mach number contour region 208f corresponds to a sixth Mach number range 212f between 0.45 and 0.30; a seventh Mach number contour region 208g corresponds to a seventh Mach number range 212g between 0.30 and 0.15; and an eighth Mach number contour region 208h corresponds to an eighth Mach number range 212h between 0.15 and 0.00.

FIG. 11A shows eight Mach number contour regions 208h corresponding to the eighth Mach number range 212h between 0.15 and 0.00, at an aft area 214 with aft recirculation 126 and aft recirculation zones 126a. FIG. 11A shows recirculation fluid flow 56b, such as recirculation air flow 58e, that results in separated fluid flow 56c, such as separated air flow 58f. FIG. 11A shows the aft recirculation 126 and aft recirculation zones 126a at the aft area 214, where the fluid flow 56, or air flow 58, depicted by lines with arrows, curled back on itself in an aft-to-forward direction relative to the forward-to-aft direction 130 (see FIG. 4A) of the fluid flow 56, or air flow 58 far upstream, for example, the upstream air flow 58b (see FIG. 4A). FIG. 11A further shows first Mach number contour regions 208a corresponding to the first Mach number range 212a between 1.20 and 1.05, at channel areas 216 that showed potential for stronger channel shock, or shock waves 122.

Figure 11B:
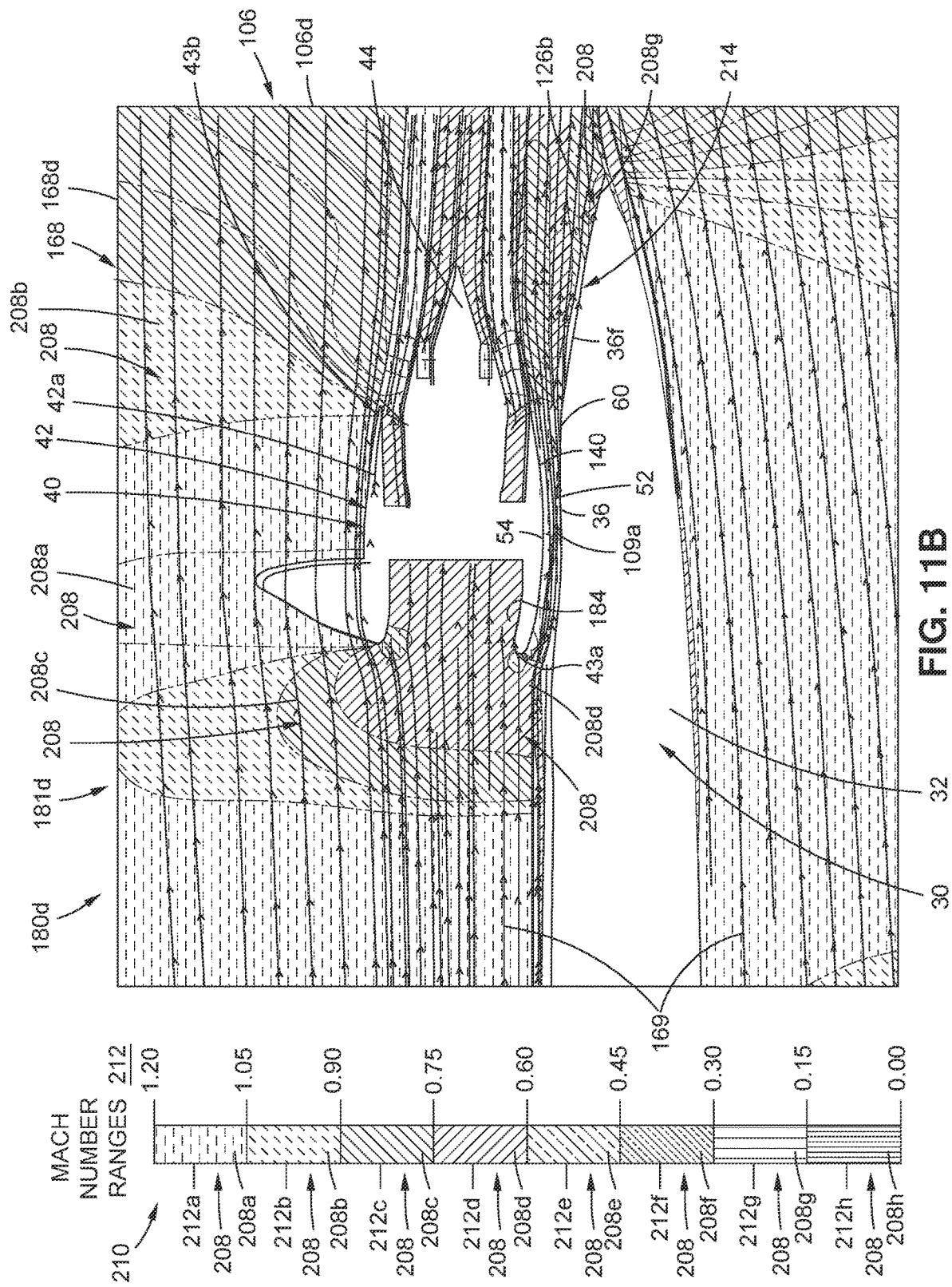
FIG. 11B is an illustration of a cross-sectional side view through a symmetry plane of an initial shape optimized three-dimensional (3D) model, showing Mach number contour results and streamlines of a flow simulation after an initial shape optimization.

Now referring to FIG. 11B, FIG. 11B is an illustration of a cross-sectional side view through a symmetry plane 180d, such as a nacelle symmetry plane 181d, of a three-dimensional (3D) model 106, such as an initial shape optimized three-dimensional (3D) model 106d, showing Mach number contour results 168, such as Mach number contour results 168d, and streamlines 169 of a flow simulation after an initial shape optimization 109a (see FIG. 2), performed on the initial shape optimized 3D model 106d, and carried out at transonic speed 24 (see FIG. 2), or velocity.

FIG. 11B shows Mach number contour results 168, such as Mach number contour results 168d, of Mach number contour regions 208, on the initial shape optimized 3D model 106d. As shown in FIG. 11B, the geometry of the initial shape optimized 3D model 106d includes the auxiliary body 40, such as the nacelle 42, for example, the engine nacelle 42a, having the leading edge 43a and the trailing edge 43b, the inlet 184, and housing the engine 44, and suspended above the vehicle body 30, such as the fuselage 32. FIG. 11B further shows the channel 52 between the lower surface 54 of the auxiliary body 40, such as the nacelle 42, and the upper surface 36 of the vehicle body 30, such as the fuselage 32. The upper surface 36 of the vehicle body 30, such as the fuselage 32, is initially shaped by carving or cutting the contoured profile 140 of the lower surface 54 of the auxiliary body 40, such as the nacelle 42, into the upper surface 36 of the vehicle body 30, such as the fuselage 32 with sufficient z displacement 220 (see FIG. 11D) to minimize strength 124 (see FIG. 2) of the shock wave 122 (see FIG. 2) and the aft recirculation 126. Thus, the contoured profile 140 of the nacelle 42 is cut or carved into the upper surface 36 of the vehicle body 30, so that the exterior profile 60 of the upper surface 36 of the vehicle body 30 matches the contoured profile 140 of the original auxiliary body 40, or nacelle 42, to obtain an initial shape optimized vehicle body 30d (see FIG. 11B). This carving or cutting of the contoured profile 140 of the auxiliary body 40, such as the nacelle 42, into the upper surface 36 of the vehicle body 30, such as the fuselage 32, may be used to initialize the aerodynamic shaping 14 (see FIG. 2) and shape optimization 109 (see FIG. 2). With the initial shape optimization 109a (see FIGS. 2, 11A), the upper surface 36 of the vehicle body 30 is carved out to mimic the contoured profile 140 of the auxiliary body 40, such as the nacelle 42. For the initial shape optimized 3D model 106d, about 8 (eight) inches, that is, an 8-inch maximum depth, was cut out of the upper surface 36 of the vehicle body 30, such as the fuselage 32, in the channel 52 between the vehicle body 30 and the auxiliary body 40, such as the nacelle 42. Although an 8-inch maximum depth cut was made in this example, other cuts of less than 8 inches, or greater than 8 inches, may be made, depending on the channel flow 53 (see FIG. 2). The 8-inch maximum depth is merely exemplary and not a general height for all scenarios.

FIG. 11B shows the Mach number contour regions 208 of the speed or velocity of fluid flow 56, or air flow 58, over the initial shape optimized 3D model 106d, where the Mach number contour regions 208 correspond to the legend 210 of the Mach number contour regions 208 at the various Mach number ranges 212. As shown in FIG. 11B, the first Mach number contour region 208a corresponds to the first Mach number range 212a between 1.20 and 1.05; the second Mach number contour region 208b corresponds to the second Mach number range 212b between 1.05 and 0.90; the third Mach number contour region 208c corresponds to the third Mach number range 212c between 0.90 and 0.75; the fourth Mach number contour region 208d corresponds to the fourth Mach number range 212d between 0.75 and 0.60; the fifth Mach number contour region 208e corresponds to the fifth Mach number range 212e between 0.60 and 0.45; the sixth Mach number contour region 208f corresponds to the sixth Mach number range 212f between 0.45 and 0.30; the seventh Mach number contour region 208g corresponds to the seventh Mach number range 212g between 0.30 and 0.15; and the eighth Mach number contour region 208h corresponds to the eighth Mach number range 212h between 0.15 and 0.00.

FIG. 11B shows that the initial shape optimized 3D model 106d reduced the eighth Mach number contour regions 208h corresponding to the eighth Mach number range 212h between 0.15 and 0.00, at the aft area 214 and reduced the aft recirculation 126 (see FIG. 11A) and the aft recirculation zones 126a (see FIG. 11A), to obtain a reduced aft recirculation 126b. With the initial shape optimized 3D model 106d, the recirculation fluid flow 56b (see FIG. 11A), such as the recirculation air flow 58e (see FIG. 11A), and the separated fluid flow 56c (see FIG. 11A), such as the separated air flow 58f (see FIG. 11A), was also reduced. In addition, the initial shape optimized 3D model 106d created a better initial flow field with weaker channel shock and provided the reduced aft recirculation 126b, which could then be used to commence a more detailed shape optimization 109 (see FIG. 2) and aerodynamic shaping 14 (see FIG. 2). The initial shape optimized 3D model 106d showed reduced aft recirculation 126b, as compared to the original non-optimized 3D model 106c, due to the shaping at an upper surface aft end portion 36f (see FIG. 11B).

Figure 11C:
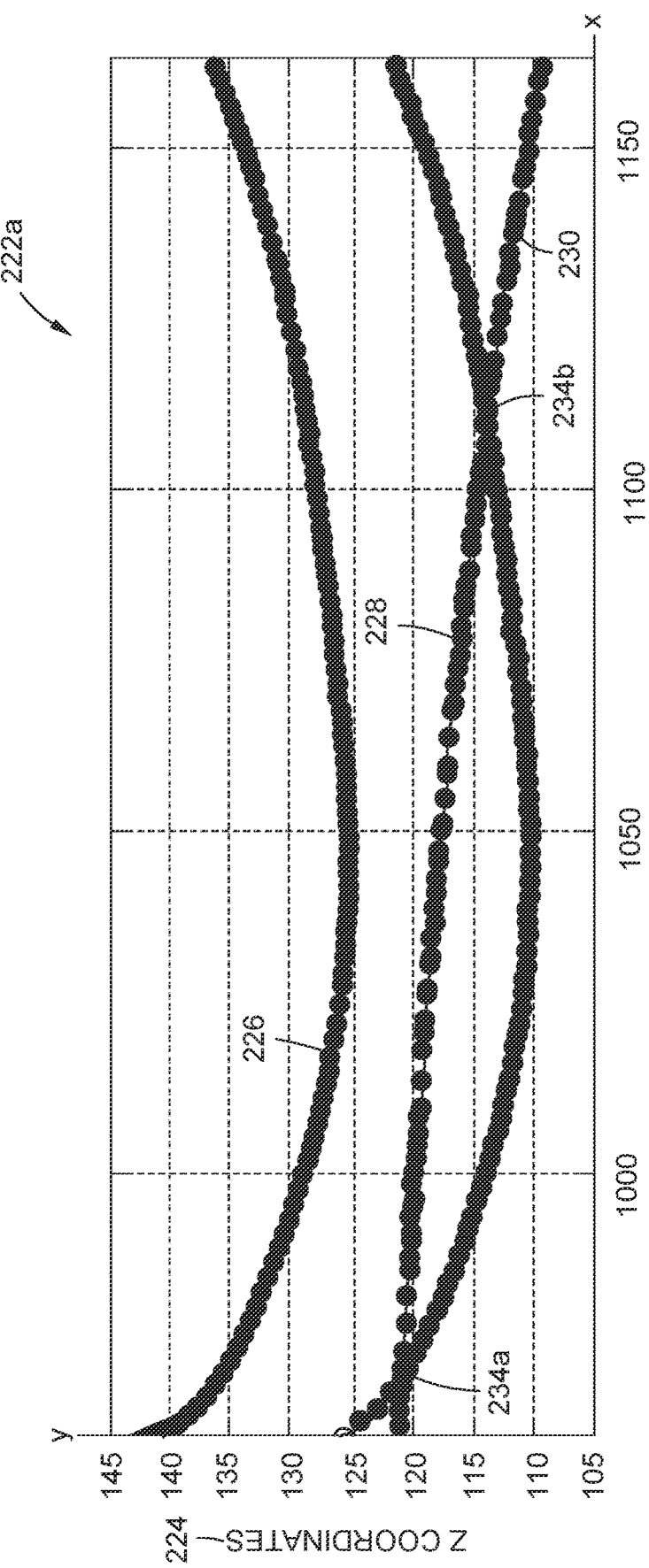
FIG. 11C is an illustration of a displacement graph comparing z coordinates of a plot of a lower surface of a nacelle, a plot of an original non-optimized three-dimensional (3D) model of a vehicle body, and a plot of an initial shape optimized three-dimensional (3D) model of a vehicle body.

FIG. 11C is an illustration of a displacement graph 222a comparing z coordinates 224, or z values, of a plot 226 of a lower surface 54 of the nacelle 42 of FIGS. 11A-11B, a plot 228 of the original non-optimized 3D model 106c of FIG. 11A, of the vehicle body 30 with no aerodynamic shaping 14, or the unshaped vehicle body, and a plot 230 of the initial shape optimized 3D model 106d of FIG. 11B, of the vehicle body 30 that is initially shape optimized by carving or cutting the contoured profile 140 of the nacelle 42 into the upper surface 36 of the vehicle body 30, such as the fuselage 32. The displacement graph 222a shows z coordinates 224, or z values, along the y-axis, and shows geometric coordinates 232 along the x-axis. The geometric coordinates 232 were relative to the scale of the vehicle model analyzed. For different sized vehicles, the geometric coordinates 232 would be different depending on the size. As shown in FIG. 11C, where the plot 228 crosses the plot 230 at a first crossover point 234a is the starting point for shaping the upper surface 36 of the vehicle body 30, such as the fuselage 32. As further shown in FIG. 11C, where the plot 228 crosses the plot 230 at a second crossover point 234b is the ending point for shaping the upper surface 36 of the vehicle body 30, such as the fuselage 32.

Figure 11D:
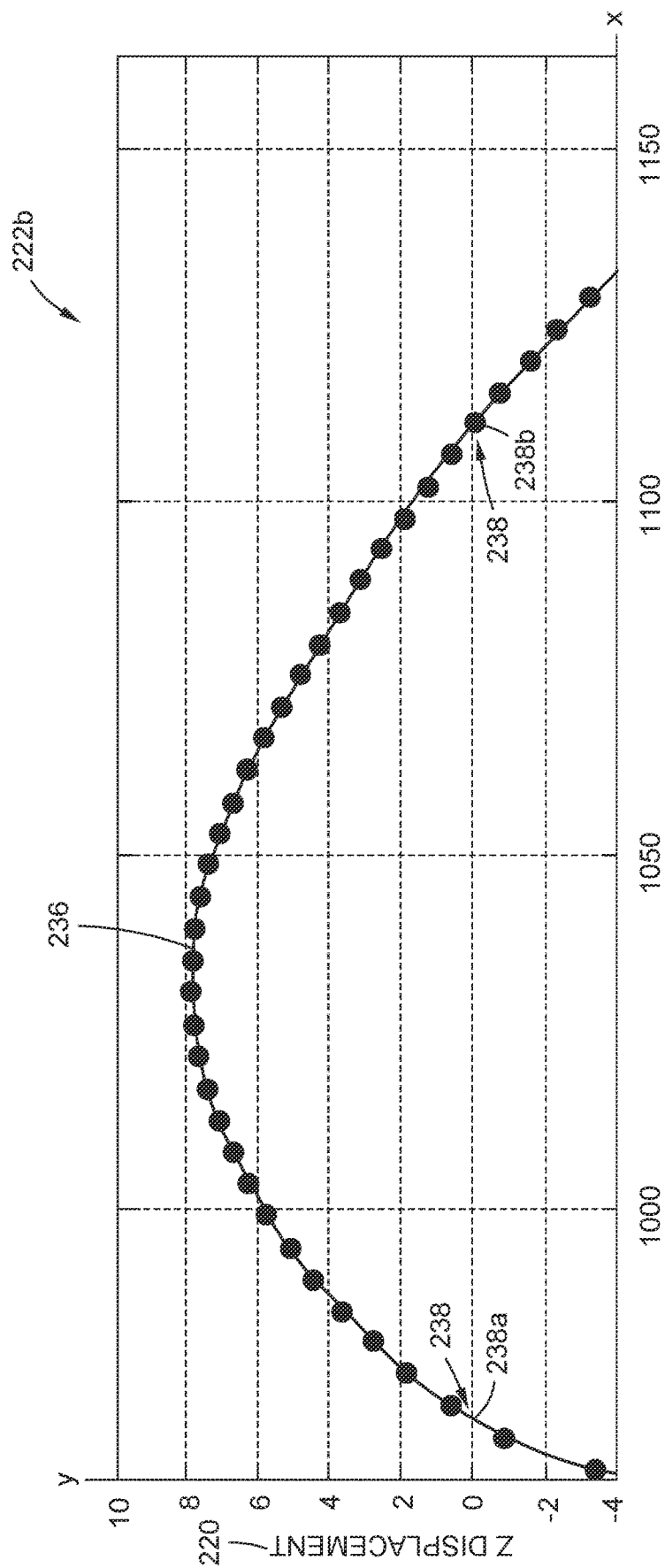
FIG. 11D is an illustration of a displacement graph showing a difference between z coordinates of the plot of the original non-optimized three-dimensional (3D) model of FIG. 11C, and z coordinates of the plot of the initial shape optimized three-dimensional (3D) model of FIG. 11C.

Now referring to FIG. 11D, FIG. 11D is an illustration of a displacement graph 222b showing a difference between the z coordinates 224 (see FIG. 11C), or z values, of a plot 236 representing the plot 228 (see FIG. 11C) of the original non-optimized 3D model 106c of FIG. 11A, of the vehicle body 30 with no aerodynamic shaping 14, or the unshaped vehicle body, and the z coordinates 224, or z values, of the plot 230 (see FIG. 11C) of the initial shape optimized 3D model 106d of FIG. 11B, of the vehicle body 30 that is initially shaped. The displacement graph 222b shows z displacement 220 along the y-axis, and shows geometric coordinates 232 along the x-axis, where the geometric coordinates 232 were relative to the scale of the vehicle model analyzed. For different sized vehicles, the geometric coordinates 232 would be different depending on the size. As shown in FIG. 11D, at points 238 where the plot 236 crosses the zero (0) z coordinate 224 at first point 238a and at second point 238b, correspond to the first crossover point 234a and second crossover point 234b, respectively, in displacement graph 222a.

Figure 12:
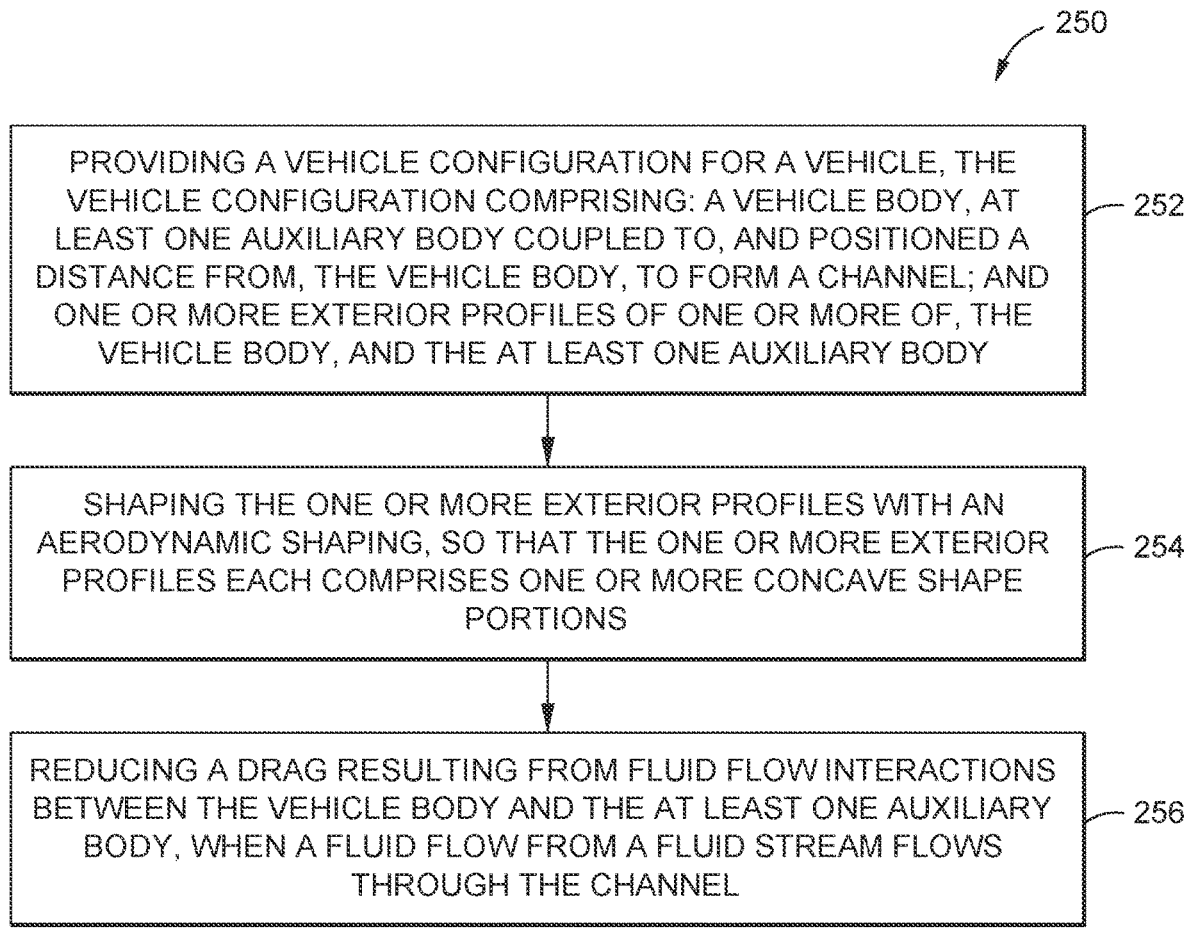
FIG. 12 is an illustration of a flow diagram of an exemplary version of a method of the disclosure.

Now referring to FIG. 12, FIG. 12 is an illustration of a flow diagram of an exemplary version of a method 250 of the disclosure. In another version of the disclosure, there is provided the method 250 to reduce drag 16 (see FIG. 2), such as interference drag 18 (see FIG. 2), of a vehicle 10 (see FIG. 2), such as an air vehicle 10a (see FIG. 2), in a fluid stream 20 (see FIG. 2), such as an air stream 22 (see FIG. 2). As further shown in FIG. 2, the vehicle 10 may comprise the blended wing body (BWB) aircraft 28, the aircraft 72, such as the commercial aircraft 72a, 72b (see also FIGS. 1F, 1G), or the military aircraft 72c, the launch vehicle 86 (see FIG. 6A), such as the rocket-propelled vehicle 88 (see FIG. 6A), the spacecraft 90, or another suitable vehicle. The aerodynamic shaping 14 is particularly suitable for the propulsion airframe integration (PAI) 91 (see FIG. 2) of the top-mounted nacelle 42b (see FIGS. 2, 4A-4D) with the pylon 48 (see FIGS. 2, 4A-4D) on the BWB aircraft 28. The interference drag 18 may include compressibility drag 112 (see FIG. 2). Further, the vehicle configuration 12 with the aerodynamic shaping 14 is designed to reduce compressibility drag 112, to obtain a reduced compressibility drag 112a (see FIG. 2).

The blocks in FIG. 12 represent operations and/or portions thereof, or elements, and lines connecting the various blocks do not imply any particular order or dependency of the operations or portions thereof, or elements. FIG. 12 and the disclosure of the steps of the method 250 set forth herein should not be interpreted as necessarily determining a sequence in which the steps are to be performed. Rather, although one illustrative order is indicated, it is to be understood that the sequence of the steps may be modified when appropriate. Accordingly, certain operations may be performed in a different order or simultaneously.

As shown in FIG. 12, the method 250 comprises providing 252 a vehicle configuration 12 (see FIGS. 2, 4A-4D), such as an aerodynamic shaped vehicle configuration 12a (see FIG. 2), or shape optimized vehicle configuration, for the vehicle 10, such as the air vehicle 10a. The vehicle configuration 12 comprises the vehicle body 30 (see FIG. 2). As discussed in detail above, the vehicle body 30, in one version, such as for the BWB aircraft 28 and aircraft 72, comprises the airframe 31 (see FIG. 2), including the fuselage 32 (see FIG. 2), one or more wings 34 (see FIG. 2), a tail 74 (see FIG. 1B), or other suitable structures, and in another version, such as for the launch vehicle 86 (see FIGS. 2, 6A) comprises the main body 92 (see FIGS. 2, 6A), or another suitable body structure.

The vehicle configuration 12 further comprises at least one auxiliary body 40 (see FIG. 2), or one or more auxiliary bodies 40, each coupled to, and positioned, or offset, a distance 50 (see FIGS. 4A-4D), such as an optimal distance 50a (see FIGS. 2, 4A-4D) from, the vehicle body 30, to form the channel 52 (see FIGS. 2, 4A-4D), or gap, between the at least one auxiliary body 40 and the vehicle body 30. As discussed in detail above, in one version, such as for the BWB aircraft 28 and aircraft 72, the lower surface 54 (see FIGS. 4A-4D) of the auxiliary body 40 is positioned opposite to, and faces, the upper surface 36 (see FIGS. 4A-4D) of the vehicle body 30. In another version, such as for the launch vehicle 86, the rocket-propelled vehicle 88, or the spacecraft 90, the lower surface 54 (see FIGS. 2, 6A), such as the side surface 94 (see FIGS. 2, 6A), for example, the first side surface 94a, of the auxiliary body 40 is positioned opposite to, and faces, the outer surface 37 (see FIGS. 2, 6A), or exterior surface, of the vehicle body 30. As FIG. 2, the auxiliary body 40 may comprise the nacelle 42, the engine nacelle 42a, the top-mounted nacelle 42b, the fuel tank 96, the pod 98, such as the sensor pod 98a, the booster 100, the missile 102, or another suitable body in close proximity to the vehicle body 30. As shown in FIG. 1C, the auxiliary body 40 may also comprise the bottom-mounted nacelle 42c. The auxiliary body 40 is in structural communication, for example, via the structural attachment element 46 (see FIGS. 1A, 2), such as the pylon 48 (see FIGS. 1A, 2), with the vehicle body 30.

The vehicle configuration 12 further comprises one or more exterior profiles 60 (see FIGS. 2, 4A-4D) of one or more of, the vehicle body 30, and the at least one auxiliary body 40, where each of the one or more exterior profiles 60 is positioned in proximity to the channel 52.

Providing 252 the vehicle configuration 12 may further comprise, providing the vehicle configuration 12 wherein the at least one auxiliary body 40 is in structural communication, via a pylon 48, with the vehicle body 30, and the pylon 48 (see FIG. 5C) has an outboard exterior profile 146 (see FIG. 5C) and an inboard exterior profile 148 (see FIG. 5C), wherein one or more of, the outboard exterior profile 146 and the inboard exterior profile 148, are shaped with the aerodynamic shaping 14 (see FIG. 5C). Details of the aerodynamic shaping 14 of the pylon 48 are discussed above with respect to FIGS. 5C-5D.

As shown in FIG. 12, the method 250 further comprises shaping 254, such as external shaping, of the one or more exterior profiles 60 with the aerodynamic shaping 14 (see FIGS. 2, 4A-4D), so that the one or more exterior profiles 60 each comprises one or more concave shape portions 62 (see FIGS. 1B-1D, 4A-4D), and the one or more exterior profiles 60 comprise one or more of, a longitudinal contour 68 (see FIGS. 1A-1B, 2, 4A-4D) with a longitudinal concavity 64b (see FIG. 1B), and a lateral contour 70 (see FIGS. 1A, 1C, 1D, 2) with a lateral concavity 64c (see FIG. 1C). The aerodynamic shaping 14 provides aerodynamic shaped contours 80 (see FIGS. 1E, 2) each having the exterior profile 60 and the three-dimensional (3D) shape 82 (see FIGS. 1E, 2).

As discussed above, where the exterior profile 60 comprises two or more concave shape portions 62, the two or more concave shape portions 62 alternate, in series, in opposite concavities 64a (see FIG. 2), or directions. The concave shape portions 62 include one or more concave-up portions 66a (see FIGS. 1A, 2), and/or one or more concave-down portions 66b (see FIGS. 1A, 2). The concave shape portions 62 and the concavity 64 are reversed from the concave-up portion 66a to the concave-down portion 66b longitudinally, and reversal of the concavity 64 also occurs laterally between the exterior profiles 60. Each exterior profile 60, such as the exterior profile 60 of the upper surface 36 of the vehicle body 30, has one or more curvature inflection points 104 (see FIG. 4A).

In one version, such as shown in FIG. 4A, only the exterior profile 60 of the upper surface 36 or the outer surface 37 of the vehicle body 30 is shaped, such as externally shaped, with the aerodynamic shaping 14 to obtain the aerodynamic shaped vehicle body 30a, or shape optimized vehicle body. In another version, such as shown in FIG. 4C, only the exterior profile 60 of the lower surface 54 of the auxiliary body 40, such as the nacelle 42, is shaped, such as externally shaped, with the aerodynamic shaping 14 to obtain the aerodynamic shaped auxiliary body 40a, or shape optimized auxiliary body. In another version, as shown in FIG. 4B, both the exterior profile 60 of the upper surface 36 of the vehicle body 30, and the exterior profile 60 of the lower surface 54 of the auxiliary body 40 are shaped, such as externally shaped, with the aerodynamic shaping 14. Further, if the structural attachment element 46, such as the pylon 48, is present, the structural attachment element 46, such as the pylon 48, may be shaped, such as externally shaped, with the aerodynamic shaping 14, alone, or in combination with one of, the aerodynamic shaped vehicle body 30a, the aerodynamic shaped auxiliary body 40a, or both the aerodynamic shaped vehicle body 30a and the aerodynamic shaped auxiliary body 40a.

The shaping 254 of the one or more exterior profiles 60, may further comprise, initializing the shaping 254 of the exterior profile 60 (see FIGS. 1A, 4D) of an upper surface 36 (see FIGS. 1A, 4D) of the vehicle body 30, by carving a contoured profile 140 (see FIG. 4D) of the lower surface 54 (see FIG. 4D) of the auxiliary body 40 into the upper surface 36 (see FIG. 4D) of the vehicle body 30, to obtain an initial shape optimized vehicle body 30d (see FIG. 4D). The upper surface 36 of the vehicle body 30 undergoes an initial shape optimization 109a (see FIG. 2), to obtain the initial shape optimized vehicle body 30d. In this version of initializing the vehicle configuration 12, such as the aerodynamic shaped vehicle configuration 12d (see FIG. 4D), the contoured profile 140 (see FIG. 4D), or cut-out, of the lower surface 54 (see FIG. 4D) of the auxiliary body 40 (see FIG. 4D), such as the nacelle 42, for example, the top-mounted nacelle 42b (see FIG. 4D), is carved out, or cut out, or removed, from the upper surface 36 of the vehicle body 30, such as the fuselage 32, so that the exterior profile 60 (see FIG. 4D) of the upper surface 36 of the vehicle body 30 with the aerodynamic shaping 14 is matched to the contoured profile 140 of the lower surface 54 of the auxiliary body 40 that does not have aerodynamic shaping 14. As shown in FIG. 4D, the initial shape optimized vehicle body 30d is shaped with the aerodynamic shaping 14 to have concave shape portions 62, such as one or more concave-up portions 66a and one or more concave-down portions 66b, alternating, in series, in opposite concavities 64a (see FIG. 1B), or opposite directions, and to have the aerodynamic shaped contour 80. A more detailed and further shape optimization 109 may be made after obtaining the initial shape optimized vehicle body 30d.

The shaping 254 of the one or more exterior profiles 60, may further comprise, modeling the vehicle configuration 12, such as using a computer-aided design (CAD) software program, or a mesh morphing software program, to obtain a three-dimensional (3D) model 106 (see FIG. 2), and optimizing the three-dimensional (3D) model 106 using an optimization approach 108 (see FIG. 2), to obtain an optimized channel flow 53a (see FIG. 2) through the channel 52 (see FIG. 2).

The vehicle configuration 12 and the aerodynamic shaping 14 may be modeled with a computer modeling software, program, or system, such as the CAD software program, for example, a parametric CAD software program, or a mesh morphing software program, to obtain the 3D model 106 (see FIG. 2). Other suitable modeling software programs or systems may also be used. Further, the 3D model 106 and the aerodynamic shaping 14 may be optimized with the optimization approach 108 (see FIG. 2), or process or method, to perform the shape optimization 109 (see FIG. 2), including, for example, the initial shape optimization 109a (see FIG. 2). The 3D model 106 with the aerodynamic shaping 14 may then be optimized and analyzed through flow simulations using a computational fluid dynamics (CFD) design optimization software program, or another suitable flow simulation software or program, to optimize the fluid flow 56, such as the air flow 58, in the channel 52, and/or to optimize the aerodynamic shaping 14 of the vehicle body 30 and the auxiliary body 40 forming the channel 52 for reduction of drag 16, such as interference drag 18, and/or to optimize the aerodynamic shaping 14 of the structural attachment element 46, such as the pylon 48, discussed below with respect to FIGS. 5C-5D.

The shaping 254 of the one or more exterior profiles 60, may further comprise, shaping 254 the exterior profile 60 of a vehicle body aft surface 30e (see FIG. 8B) of the vehicle body 30, to reduce aft recirculation zones 126a (see FIGS. 2, 11A) of separated fluid flow 56c (see FIGS. 2, 11A) formed aft of the auxiliary body 40. As shown in FIG. 8B, the vehicle body aft surface 30e of the exterior profile 60 of the vehicle body 30 is shaped aft of the auxiliary body 40 with the aerodynamic shaping 14, such as the aft aerodynamic shaping 14a, to reduce aft recirculation 126 (see FIG. 2) and aft recirculation zones 126a (see FIG. 2) of recirculation fluid flow (FF) 56b (see FIG. 2), or separated fluid flow (FF) 56c (see FIG. 2), for example, recirculation air flow (AF) 58e (see FIG. 2), or separated air flow (AF) 58f (see FIG. 2), formed aft of the auxiliary body 40. The aerodynamic shaping 14, such as the aft aerodynamic shaping 14a, of the vehicle body aft surface 30e of the exterior profile 60 of the vehicle body 30 aft of the auxiliary body 40 results in reduced aft recirculation 126b (see FIG. 2).

As shown in FIG. 12, the method 250 further comprises reducing 256, with the vehicle configuration 12 having the one or more exterior profiles 60 shaped with the aerodynamic shaping 14, the drag 16, such as the interference drag 18, resulting from fluid flow interactions 118 (see FIG. 2) between the vehicle body 30 and the at least one auxiliary body 40, when a fluid flow 56 (see FIG. 2) from the fluid stream 20, such as the air stream 22, flows through the channel 52.

Further, to avoid one or more shock waves 122 (see FIG. 2) or to reduce the strength 124 (see FIG. 2) of the one or more shock waves 122 that may be created within the channel 52 between the vehicle body 30 and the auxiliary body 40, during flight, or flight simulations, of the vehicle 10 at transonic speed 24, or velocity, or subsonic speed 26, or velocity, or supersonic speed 27, or velocity, the exterior profile 60 of one or more of, the vehicle body 30 and the auxiliary body 40, and optionally, the pylon 48, if present, are shaped with the aerodynamic shaping 14. Thus, the aerodynamic shaping 14 of the exterior profile 60 of one or more of, the vehicle body 30 and the auxiliary body 40, and optionally, the pylon 48, if present, results in a reduced shock wave strength 124a (see FIG. 2).

Figure 13:
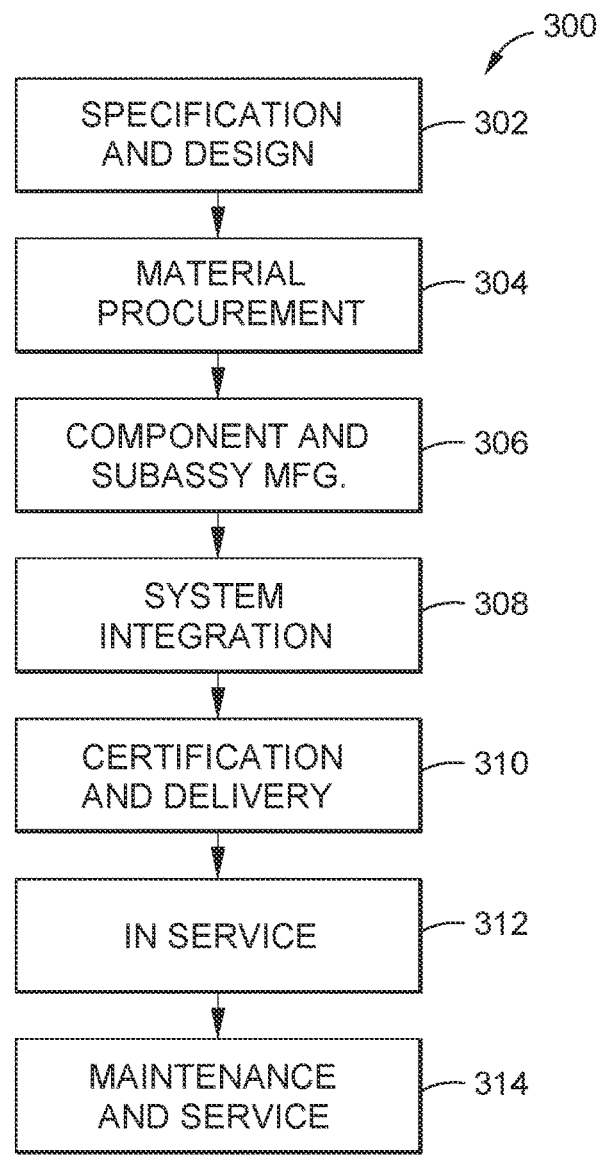
FIG. 13 is an illustration of a flow diagram of an exemplary aircraft manufacturing and service method.
Figure 14:
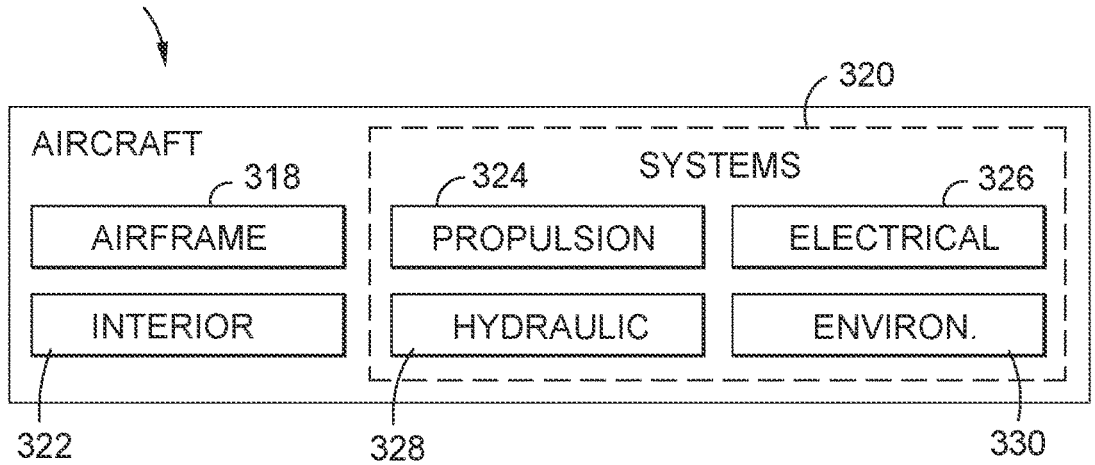
FIG. 14 is an illustration of an exemplary block diagram of an aircraft.

Now referring to FIGS. 13 and 14, FIG. 13 is an illustration of a flow diagram of an exemplary aircraft manufacturing and service method 300, and FIG. 14 is an illustration of an exemplary block diagram of an aircraft 316. Referring to FIGS. 13 and 14, versions of the disclosure may be described in the context of the aircraft manufacturing and service method 300 as shown in FIG. 13, and the aircraft 316 as shown in FIG. 14.

During pre-production, exemplary aircraft manufacturing and service method 300 may include specification and design 302 of the aircraft 316 and material procurement 304. During manufacturing, component and subassembly manufacturing 306 and system integration 308 of the aircraft 316 takes place. Thereafter, the aircraft 316 may go through certification and delivery 310 in order to be placed in service 312. While in service 312 by a customer, the aircraft 316 may be scheduled for routine maintenance and service 314 (which may also include modification, reconfiguration, refurbishment, and other suitable services).

Each of the processes of the aircraft manufacturing and service method 300 may be performed or carried out by a system integrator, a third party, and/or an operator (e.g., a customer). For the purposes of this description, a system integrator may include, without limitation, any number of aircraft manufacturers and major-system subcontractors. A third party may include, without limitation, any number of vendors, subcontractors, and suppliers. An operator may include an airline, leasing company, military entity, service organization, and other suitable operators.

As shown in FIG. 14, the aircraft 316 produced by the exemplary aircraft manufacturing and service method 300 may include an airframe 318 with a plurality of systems 320 and an interior 322. Examples of the plurality of systems 320 may include one or more of a propulsion system 324, an electrical system 326, a hydraulic system 328, and an environmental system 330. Any number of other systems may be included. Although an aerospace example is shown, the principles of the disclosure may be applied to other industries, such as the automotive industry.

Methods and systems embodied herein may be employed during any one or more of the stages of the aircraft manufacturing and service method 300. For example, components or subassemblies corresponding to component and subassembly manufacturing 306 may be fabricated or manufactured in a manner similar to components or subassemblies produced while the aircraft 316 is in service 312. Also, one or more apparatus embodiments, method embodiments, or a combination thereof, may be utilized during component and subassembly manufacturing 306 and system integration 308, for example, by substantially expediting assembly of or reducing the cost of the aircraft 316. Similarly, one or more of apparatus embodiments, method embodiments, or a combination thereof, may be utilized while the aircraft 316 is in service 312, for example and without limitation, to maintenance and service 314.

Disclosed versions of the vehicle 10 (see FIGS. 1A, 1E-1G, 2. 4A-4D) having the vehicle configuration 12 (see FIGS. 1A, 1E-1G, 2, 4A-4D), and the method 250 (see FIG. 12) provide for aerodynamic shaping 14 (see FIG. 2) and shape optimization 109 (see FIG. 2) of exterior profiles 60 (see FIG. 2) of one or more of, the vehicle body 30 (see FIGS. 1A, 2, 4A-4D), and the auxiliary body 40 (see FIGS. 1A, 2, 4A-4D), and optionally, the pylon 48 (see FIGS. 5C-5D), if present, where the exterior profiles 60 are in proximity to the channel 52 (see FIGS. 1A, 2, 4A-4D) formed between the upper surface 36 (see FIG. 1A) or outer surface 37 (see FIG. 6A), of the vehicle body 30, and the lower surface 54 (see FIG. 1A), such as the side surface 94 (see FIG. 6A), of the auxiliary body 40, to reduce drag 16 (see FIG. 2), such as interference drag 18 (see FIG. 2), in a fluid stream 20 (see FIGS. 2, 4A), such as an air stream 22 (see FIGS. 2, 4A), to obtain a reduced drag 16a (see FIG. 2), such as a reduced interference drag 18a (see FIG. 2) and/or reduced likelihood of structural fatigue. Further, the aerodynamic shaping 14 (see FIG. 2) and shape optimization 109 (see FIG. 2) of exterior profiles 60 (see FIG. 2) of one or more of, the vehicle body 30 (see FIGS. 1A, 2, 4A-4D), and the auxiliary body 40 (see FIGS. 1A, 2, 4A-4D), and optionally, the pylon 48 (see FIGS. 5C-5D), if present, are designed to reduce compressibility drag 112 (see FIG. 2) in the channel 52, to obtain a reduced compressibility drag 112a (see FIG. 2). The exterior profiles 60 are shaped with the aerodynamic shaping 14, so that each exterior profile 60 comprises one or more concave shape portions 62 (see FIGS. 1A-1E) comprising one or more concave-up portions 66a (see FIGS. 1B-1D) and one or more concave-down portions 66b (see FIGS. 1B-1D), alternating, in opposite concavities 64a (see FIGS. 1B-1D), or opposite directions. The one or more exterior profiles 60 comprise one or more of, a longitudinal contour 68 (see FIGS. 1A, 1B, 1E) with a longitudinal concavity 64b (see FIG. 1B), and a lateral contour 70 (see FIGS. 1A, 1C-1E) with a lateral concavity 64c (see FIG. 1C). The concave shape portions 62 may be the same size, and have the same height, or the concave shape portions 62 may be of different sizes and different heights. The exterior profiles 60 each have multiple curvature inflection points 104 (see FIG. 4A) longitudinally and laterally.

The aerodynamic shaping 14 and shape optimization 109 include both shaping of the exterior profiles 60 to have variations in concavity 64, in proximity to the channel 52, and also having the auxiliary body 40 positioned a distance 50, such as an optimal distance 50a (see FIG. 2) from the vehicle body 30 to provide a sufficient and effective distance 50, or gap, between the auxiliary body 40 and the vehicle body 30. The aerodynamic shaping 14 reduces the strength 124 (see FIG. 2) of a shock wave 122 (see FIG. 2) in the channel 52 between the vehicle body 30 and the auxiliary body 40. In particular, the z displacement 220 (see FIG. 11D) between the lower surface 54 of the auxiliary body 40, such as the nacelle 42, and the upper surface 36 of the vehicle body 30, varies longitudinally and with upstream Mach number, with at least three locations 136 (see FIG. 4A) having sufficient channel height 138 to reduce channel shock strength, to provide a reduced shock wave strength 124a (see FIG. 2), and to reduce aft recirculation 126.

The resulting flow paths through the channel 52, for example, channel flow 53 (see FIG. 2), do not suffer from compressibility effects that lead to interference drag 18, such as high interference drag. The aerodynamic shaping 14 provides a channel 52 that is tailored, so that at vehicle transonic speeds 24, or velocities, or at subsonic speeds 26, or velocities, or at supersonic speeds 27, or velocities, the strength 124 (see FIG. 2) of one or more shock waves 122 (see FIG. 2) between the auxiliary body 40, such as the nacelle 42, and the vehicle body 30, such as the fuselage 32, is minimized, to reduce shock induced drag and recirculation zones, such as aft recirculation zones 126a (see FIG. 11A).

In addition, disclosed versions of the vehicle 10 (see FIGS. 1A, 1E-1G, 2. 4A-4D) having the vehicle configuration 12 (see FIGS. 1A, 1E-1G, 2, 4A-4D) and the method 250 (see FIG. 12) provide for aerodynamic shaping 14 of the vehicle body aft surface 30e (see FIG. 8B) located aft of the auxiliary body 40, such as the nacelle 42, to decrease or avoid the aft recirculation 126 (see FIG. 11A) and aft recirculation zones 126a (see FIG. 11A) of separated air flow 58f (see FIG. 11A) that may form in the area or region aft of the auxiliary body 40, such as the nacelle 42, to obtain a reduced aft recirculation 126b (see FIG. 2), or to reduce the potential for formation of the aft recirculation 126 and aft recirculation zones 126a.

Moreover, disclosed versions of the vehicle 10 (see FIGS. 1A, 1E-1G, 2. 4A-4D) having the vehicle configuration 12 (see FIGS. 1A, 1E-1G, 2, 4A-4D) and the method 250 (see FIG. 12) provide for an initial shape optimization 109a (see FIG. 2) of the upper surface 36 of the vehicle body 30, to obtain the initial shape optimized vehicle body 30d (see FIG. 4D). In this version of initializing the vehicle configuration 12, such as the aerodynamic shaped vehicle configuration 12d (see FIG. 4D), the contoured profile 140 (see FIG. 4D) of the lower surface 54 (see FIG. 4D) of the auxiliary body 40 (see FIG. 4D), such as the nacelle 42 (see FIG. 4D), for example, the top-mounted nacelle 42b (see FIG. 4D), is carved out, or removed, from the upper surface 36 of the vehicle body 30, such as the fuselage 32, so that the exterior profile 60 (see FIG. 4D) of the upper surface 36 of the vehicle body 30 with the aerodynamic shaping 14 is matched to the contoured profile 140 of the lower surface 54 of the auxiliary body 40 that does not have aerodynamic shaping 14. As shown in FIG. 4D, the initial shape optimized vehicle body 30d is shaped with the aerodynamic shaping 14 to have concave shape portions 62, such as one or more concave-up portions 66a and one or more concave-down portions 66b, alternating, in series, in opposite concavities 64a (see FIG. 1B), or opposite directions, and to have the aerodynamic shaped contour 80. Initializing the aerodynamic shaping 14 of the combination or integration of the auxiliary body 40, such as the nacelle 42, and the vehicle body 30, allows this combination or integration to be modeled with a computer-aided design (CAD) software program, or another suitable design software program. A more detailed and further shape optimization 109 may be made after obtaining the initial shape optimized vehicle body 30d.

Further, disclosed versions of the vehicle 10 (see FIGS. 1A, 1E-1G, 2. 4A-4D) having the vehicle configuration 12 (see FIGS. 1A, 1E-1G, 2, 4A-4D) and the method 250 (see FIG. 12) provide for an improved pitching moment and improved channel flow 53 between the auxiliary body 40, such as the nacelle 42, and the upper surface 36, or outer surface 37, of the vehicle body 30. In particular, disclosed versions of the vehicle 10 (see FIGS. 1A, 1E-1G, 2. 4A-4D) having the vehicle configuration 12 (see FIGS. 1A, 1E-1G, 2, 4A-4D) and the method 250 (see FIG. 12) solve the problem of interference drag 18, such as strong interference drag, that may manifest itself via compressibility effects during cruise, resulting from, for example, a non-ideal propulsion airframe integration (PAI) of a top-mounted engine nacelle on a blended wing body (BWB) aircraft. The vehicle configuration 12 provides a height distribution of the channel 52 between the lower surface 54 of the auxiliary body 40, such as the nacelle 42, and the upper surface 36, or outer surface 37, of the vehicle body 30, to allow for optimized channel flow 53a through the channel 52, to avoid or minimize channel shock in the channel 52 and avoid or minimize any resulting interference drag 18, for example compressibility drag 112, thus maximizing the aerodynamic performance and flight efficiency during cruise of the vehicle 10, for example, the BWB aircraft 28.

Many modifications and other versions of the disclosure will come to mind to one skilled in the art to which this disclosure pertains having the benefit of the teachings presented in the foregoing descriptions and the associated drawings. The versions described herein are meant to be illustrative and are not intended to be limiting or exhaustive. Although specific terms are employed herein, they are used in a generic and descriptive sense only and not for purposes of limitation. Functionally equivalent methods and apparatuses within the scope of the disclosure, in addition to those enumerated herein, are possible from the foregoing descriptions. Such modifications and variations are intended to fall within the scope of the appended claims. The present disclosure is to be limited only by the terms of the appended claims, along with the full scope of equivalents to which such claims are entitled.

What is claimed is:

1. A vehicle configuration to reduce drag in a fluid stream, the vehicle configuration comprising:
    a vehicle body;
    at least one auxiliary body coupled to, and positioned a distance from, the vehicle body, to form a gap between a lower surface of the at least one auxiliary body and an upper surface of the vehicle body; and
    one or more carved out exterior profiles of one or more of, the upper surface of the vehicle body, and the lower surface of the at least one auxiliary body, the one or more carved out exterior profiles positioned in proximity to the gap, and externally shaped with an aerodynamic shaping to carve out the one or more carved out exterior profiles and to reduce a strength of a shock wave in the gap, so that the one or more carved out exterior profiles each comprises two or more concave shape portions alternating, in series, in opposite concavities,
    wherein when a fluid flow from the fluid stream flows through the gap, the drag resulting from fluid flow interactions between the vehicle body and the at least one auxiliary body is reduced, the fluid flow comprising a compressible fluid flow moving at one of, transonic speed, subsonic speed, or supersonic speed, and the drag comprising interference drag, and the aerodynamic shaping based on a Mach number of the fluid flow.

2. The vehicle configuration of claim 1, wherein the at least one auxiliary body is in structural communication with the vehicle body.

3. The vehicle configuration of claim 1, wherein the at least one auxiliary body comprises a nacelle, and the nacelle is in structural communication, via a pylon, with the vehicle body, and further wherein, the pylon has an outboard exterior profile and an inboard exterior profile, and one or more of, the outboard exterior profile, and the inboard exterior profile, are shaped with the aerodynamic shaping.

4. The vehicle configuration of claim 1, wherein the one or more carved out exterior profiles of the upper surface of the vehicle body are shaped aft of the at least one auxiliary body with the aerodynamic shaping, to reduce aft recirculation zones of separated fluid flow formed aft of the at least one auxiliary body.

5. The vehicle configuration of claim 1, wherein the one or more carved out exterior profiles comprise one or more of, a longitudinal contour with a longitudinal concavity, and a lateral contour with a lateral concavity.

6. The vehicle configuration of claim 1, wherein a threshold distance of the gap between the upper surface of the vehicle and the lower surface of the at least one auxiliary body is determined depending on a vehicle flight speed, the Mach number of the fluid flow, a Reynolds number, a length of the vehicle ahead of the auxiliary body, a vehicle boundary layer height at a start of the gap, and a vehicle angle of attack.

7. The vehicle configuration of claim 1, wherein the interference drag, including comprises compressibility drag.

8. The vehicle configuration of claim 1, wherein the at least one auxiliary body comprises a nacelle, an engine nacelle, a fuel tank, a pod, a sensor pod, a booster, or a missile.

9. The vehicle configuration of claim 8, wherein the at least one auxiliary body comprises the nacelle, and the nacelle is suspended at one of, above the vehicle body, or below the vehicle body.

10. The vehicle configuration of claim 1, wherein the comprise one or more concave-up portions and one or more concave-down portions.

11. The vehicle configuration of claim 10, wherein longitudinal spacing of curvature inflection points indicating where a concavity is reversed from each of the one or more concave-up portions to each of the one or more concave-down portions longitudinally along the one or more carved out exterior profiles depends on contours and the Mach number of an upstream air flow.

12. A vehicle comprising:
    a vehicle configuration to reduce drag in an air stream, the vehicle configuration comprising:
    a vehicle body;
    at least one auxiliary body coupled to, and positioned a distance from the vehicle body, to form a gap between a lower surface of the at least one auxiliary body and an upper surface of the vehicle body, wherein an air flow from the air stream comprises a compressible air flow moving at one of, transonic speed, subsonic speed, or supersonic speed, through the gap; and
    one or more carved out exterior profiles of one or more of, the upper surface of the vehicle body, and the lower surface of the at least one auxiliary body, the one or more carved out exterior profiles positioned in proximity to the gap, and externally shaped with an aerodynamic shaping to carve out the one or more carved out exterior profiles and to reduce a strength of a shock wave in the gap, so that the one or more carved out exterior profiles each comprises two or more concave shape portions alternating, in series, in opposite concavities,
    wherein when the air flow from the air stream flows through the gap, the drag resulting from air flow interactions between the vehicle body and the at least one auxiliary body is reduced, the air flow comprising a compressible air flow moving at one of, transonic speed, subsonic speed, or supersonic speed, and the drag comprising interference drag, and the aerodynamic shaping based on a Mach number of the air flow.

13. The vehicle of claim 12, wherein the vehicle comprises a blended wing body aircraft, a commercial aircraft, a military aircraft, a launch vehicle, a rocket-propelled vehicle, or a spacecraft.

14. The vehicle of claim 12, wherein the at least one auxiliary body comprises a nacelle, an engine nacelle, a fuel tank, a pod, a sensor pod, a booster, or a missile.

15. The vehicle of claim 12, wherein the at least one auxiliary body is in structural communication, via a pylon, with the vehicle body, and the pylon has an outboard exterior profile and an inboard exterior profile, wherein one or more of, the outboard exterior profile, and the inboard exterior profile, are shaped with the aerodynamic shaping.

16. A method to reduce drag of a vehicle in a fluid stream, the method comprising:
provides a vehicle configuration for the vehicle, the vehicle configuration comprising:
   a vehicle body;
   at least one auxiliary body coupled to, and positioned a distance from, the vehicle body, to form a gap between a lower surface of the at least one auxiliary body and an upper surface of the vehicle body; and
   one or more carved out exterior profiles of one or more of, the upper surface of the vehicle body, and the lower surface of the at least one auxiliary body, the one or more carved out exterior profiles positioned in proximity to the gap;
externally shaping the one or more carved out exterior profiles with an aerodynamic shaping to carve out the one or more carved out exterior profiles and to reduce a strength of a shock wave in the gap, so that the one or more carved out exterior profiles each comprises two or more concave shape portions alternating, in series, in opposite concavities, and the one or more carved out exterior profiles comprise one or more of, a longitudinal contour with a longitudinal concavity, and a lateral contour with a lateral concavity; and
reducing, with the vehicle configuration having the one or more carved out exterior profiles shaped with the aerodynamic shaping, the drag resulting from fluid flow interactions between the vehicle body and the at least one auxiliary body, when a fluid flow from the fluid stream flows through the gap, the fluid flow comprising a compressible fluid flow moving at one of, transonic speed, subsonic speed, or supersonic speed, and the drag comprising interference drag, and the aerodynamic shaping based on a Mach number of the fluid flow.

17. The method of claim 16, wherein providing the vehicle configuration further comprises, providing the vehicle configuration wherein the at least one auxiliary body is in structural communication, via a pylon, with the vehicle body, and the pylon has an outboard exterior profile and an inboard exterior profile, wherein one or more of, the outboard exterior profile, and the inboard exterior profile, are shaped with the aerodynamic shaping.

18. The method of claim 16, wherein shaping the one or more carved out exterior profiles, further comprises, initializing the shaping of the carved out exterior profile of the upper surface of the vehicle body, by carving a contoured profile of the lower surface of the at least one auxiliary body into the upper surface of the vehicle body, to obtain an initial shape optimized vehicle body.

19. The method of claim 16, wherein shaping the one or more carved out exterior profiles, further comprises, modeling the vehicle configuration, to obtain a three-dimensional model, and optimizing the three-dimensional model using an optimization approach, to obtain an optimized fluid flow through the gap.

20. The method of claim 16, wherein shaping the one or more carved out exterior profiles, further comprises, shaping the carved out exterior profile of the one or more carved out exterior profiles of a vehicle body aft surface of the vehicle body, to reduce aft recirculation zones of separated fluid flow formed aft of the at least one auxiliary body.

* * * * *

UNITED STATES PATENT AND TRADEMARK OFFICE
CERTIFICATE OF CORRECTION

| | |
|---|---|
| PATENT NO. | : 11,772,771 B2 |
| APPLICATION NO. | : 17/680252 |
| DATED | : October 3, 2023 |
| INVENTOR(S) | : David S. Lazzara and Dino L. Roman |

It is certified that error appears in the above-identified patent and that said Letters Patent is hereby corrected as shown below:

In the Claims

Column 44, Claim 10, Line 27: Please add the words --two or more concave shape portions-- before "comprise"

Signed and Sealed this
Fifth Day of March, 2024

*Katherine Kelly Vidal*

Katherine Kelly Vidal
*Director of the United States Patent and Trademark Office*